April 23, 1963

B. A. HARRIS 3,087,020

TOLL TICKETING ADAPTER CIRCUIT

Filed Sept. 21, 1956

30 Sheets-Sheet 1

Adapter-112

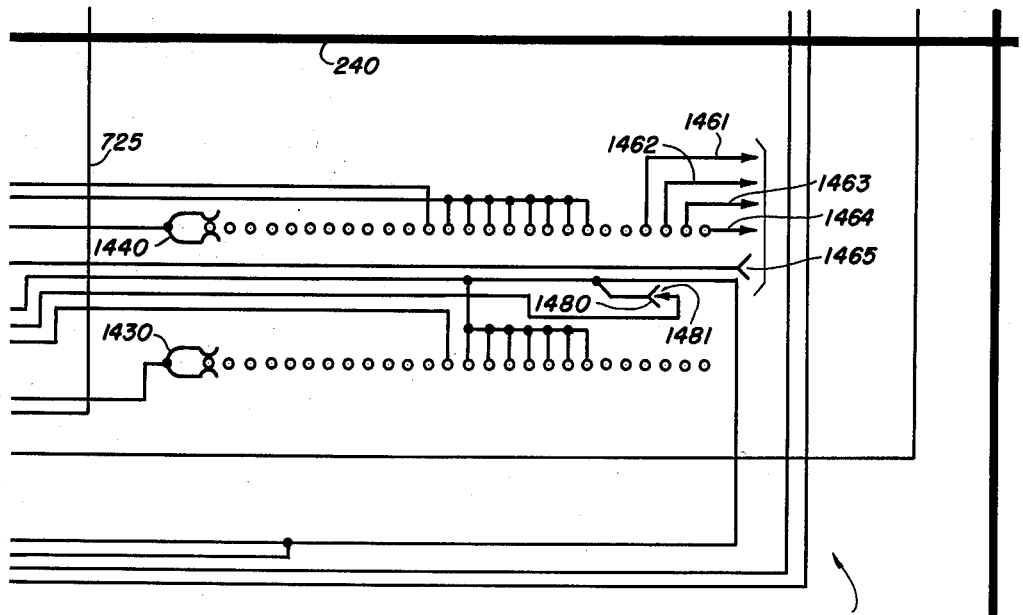
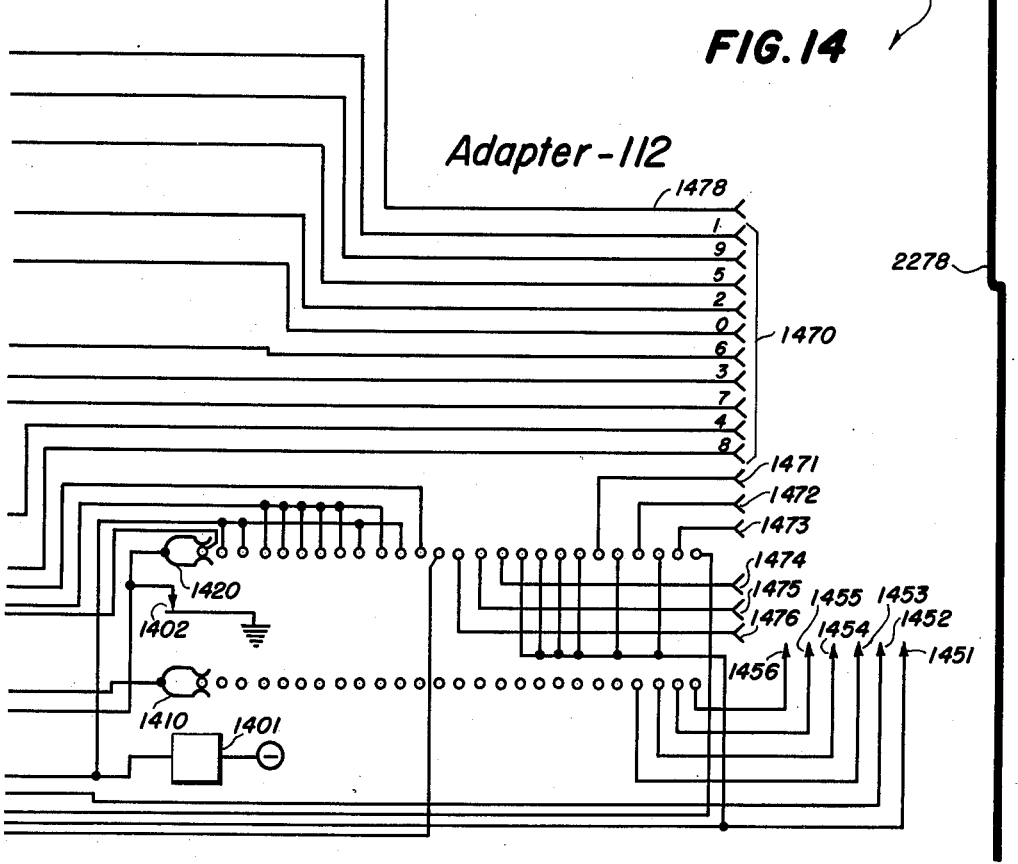
FIG. 14

April 23, 1963

B. A. HARRIS 3,087,020

TOLL TICKETING ADAPTER CIRCUIT

Filed Sept. 21, 1956

30 Sheets-Sheet 17

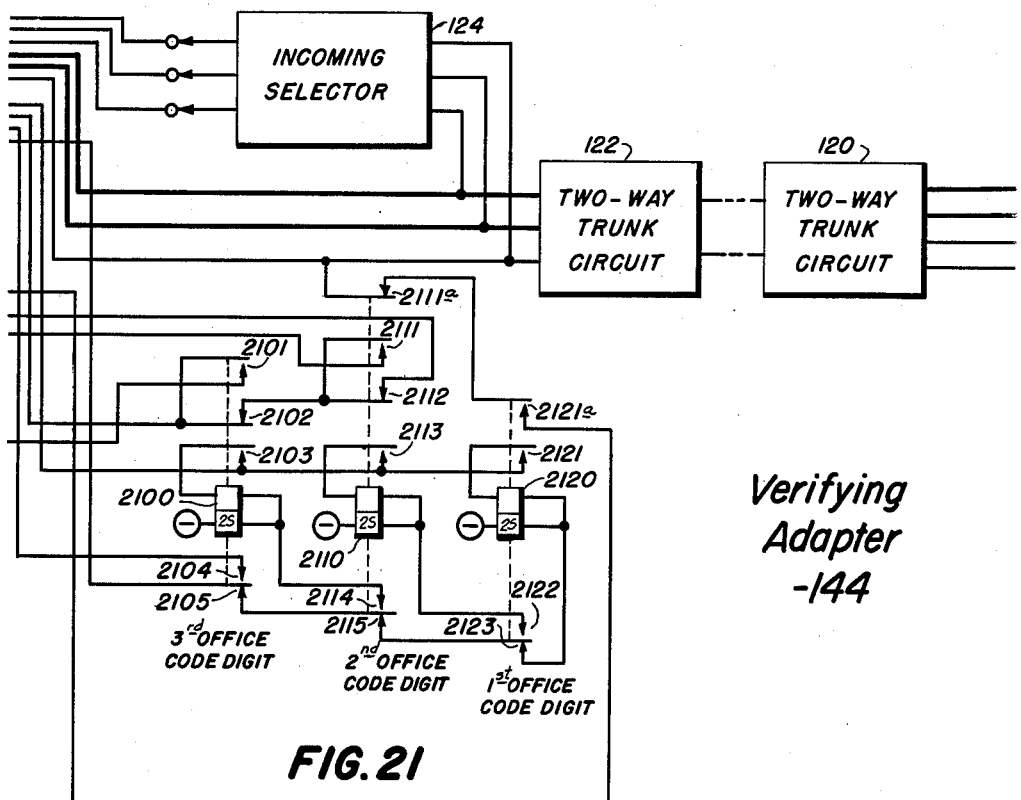
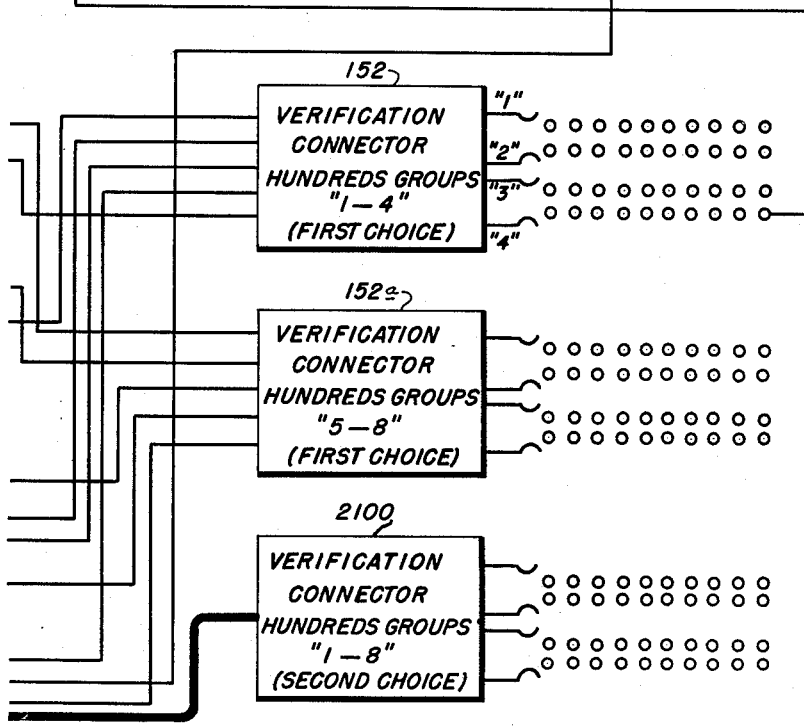
FIG. 21

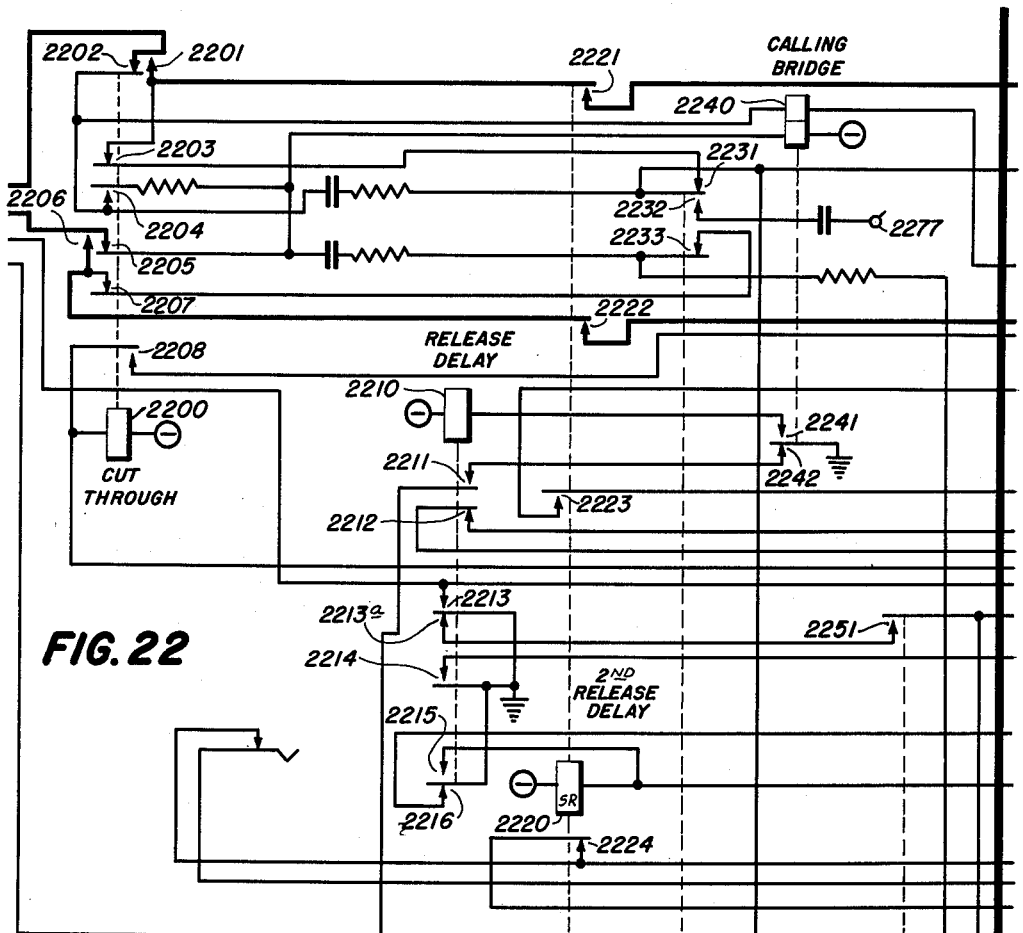
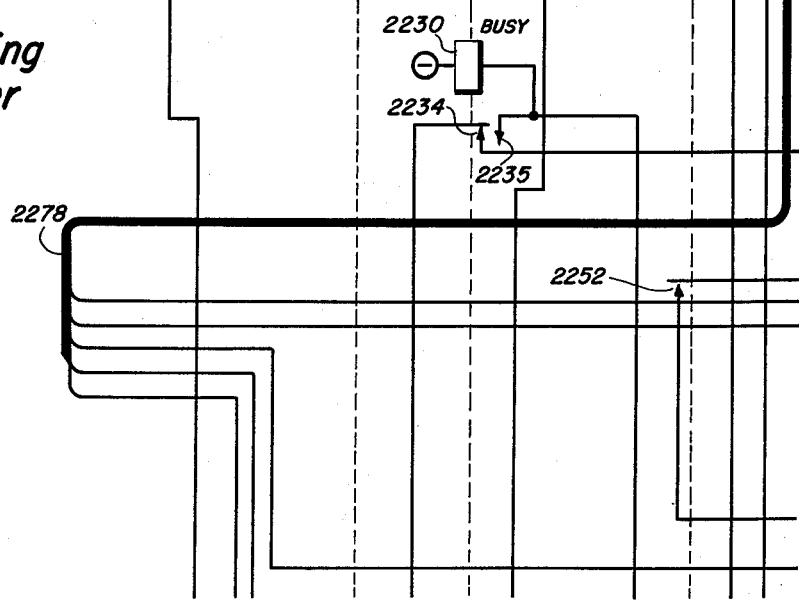
FIG. 22
Recording Adapter -146

April 23, 1963   B. A. HARRIS   3,087,020
TOLL TICKETING ADAPTER CIRCUIT
Filed Sept. 21, 1956   30 Sheets-Sheet 23

Figure 24:
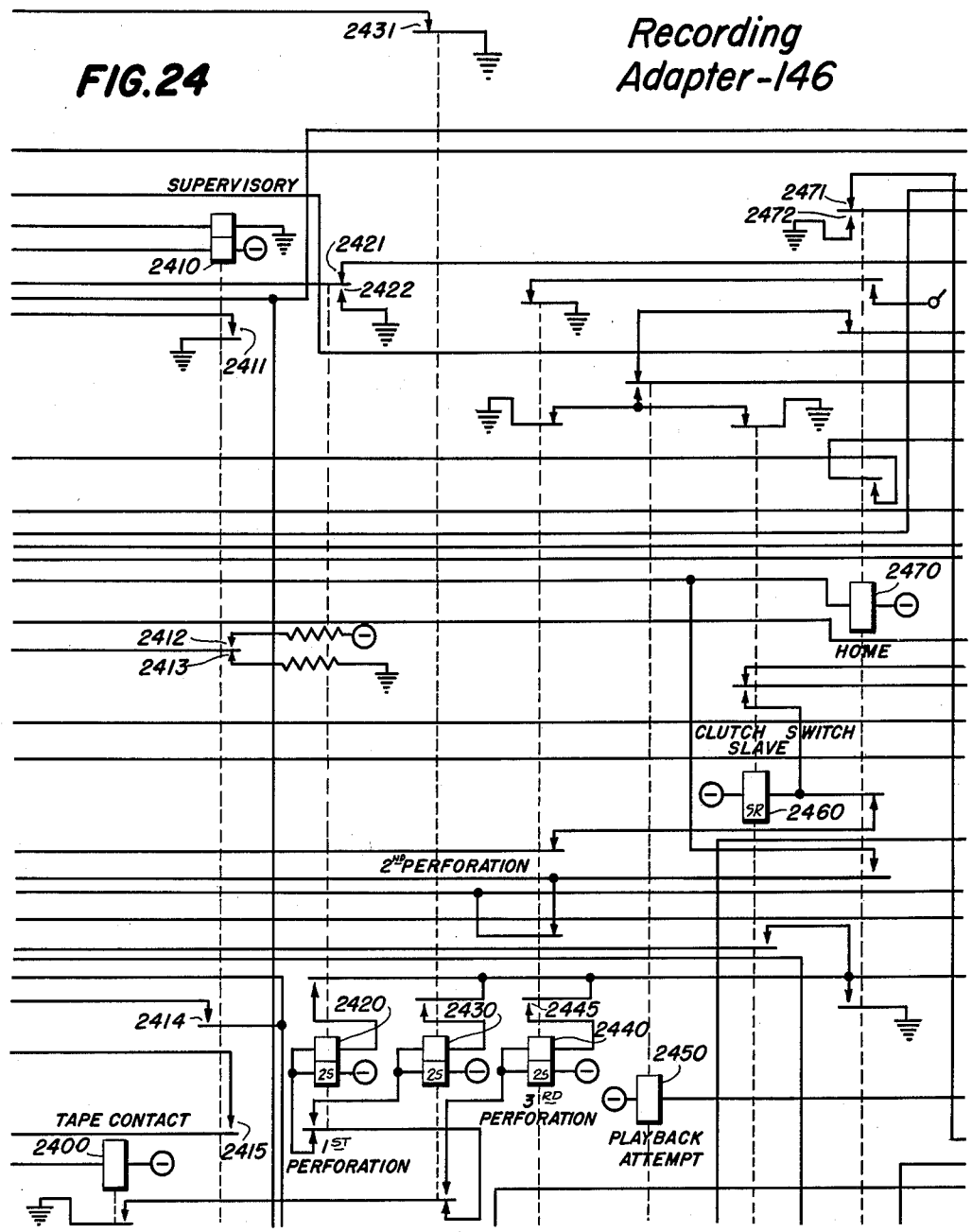

FIG.24 Recording Adapter-146

April 23, 1963   B. A. HARRIS   3,087,020
TOLL TICKETING ADAPTER CIRCUIT
Filed Sept. 21, 1956   30 Sheets-Sheet 30

Figure 2:
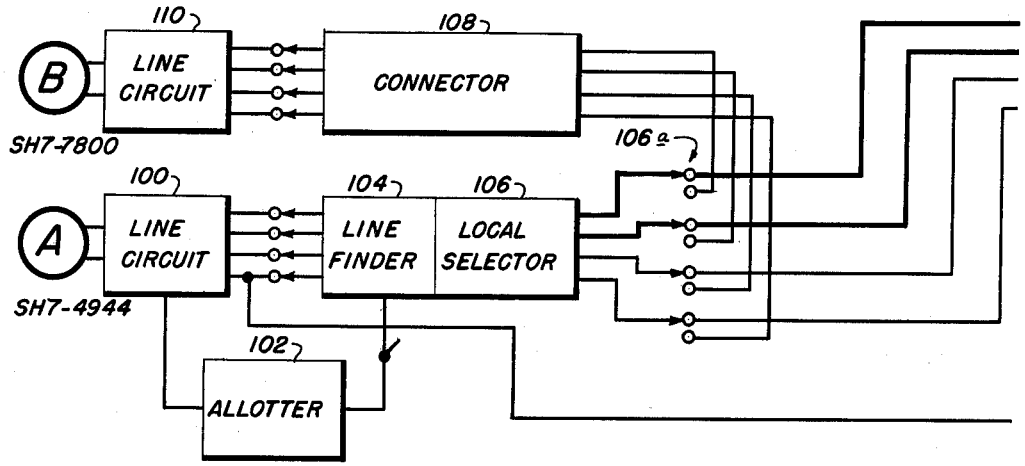
Figure 3:
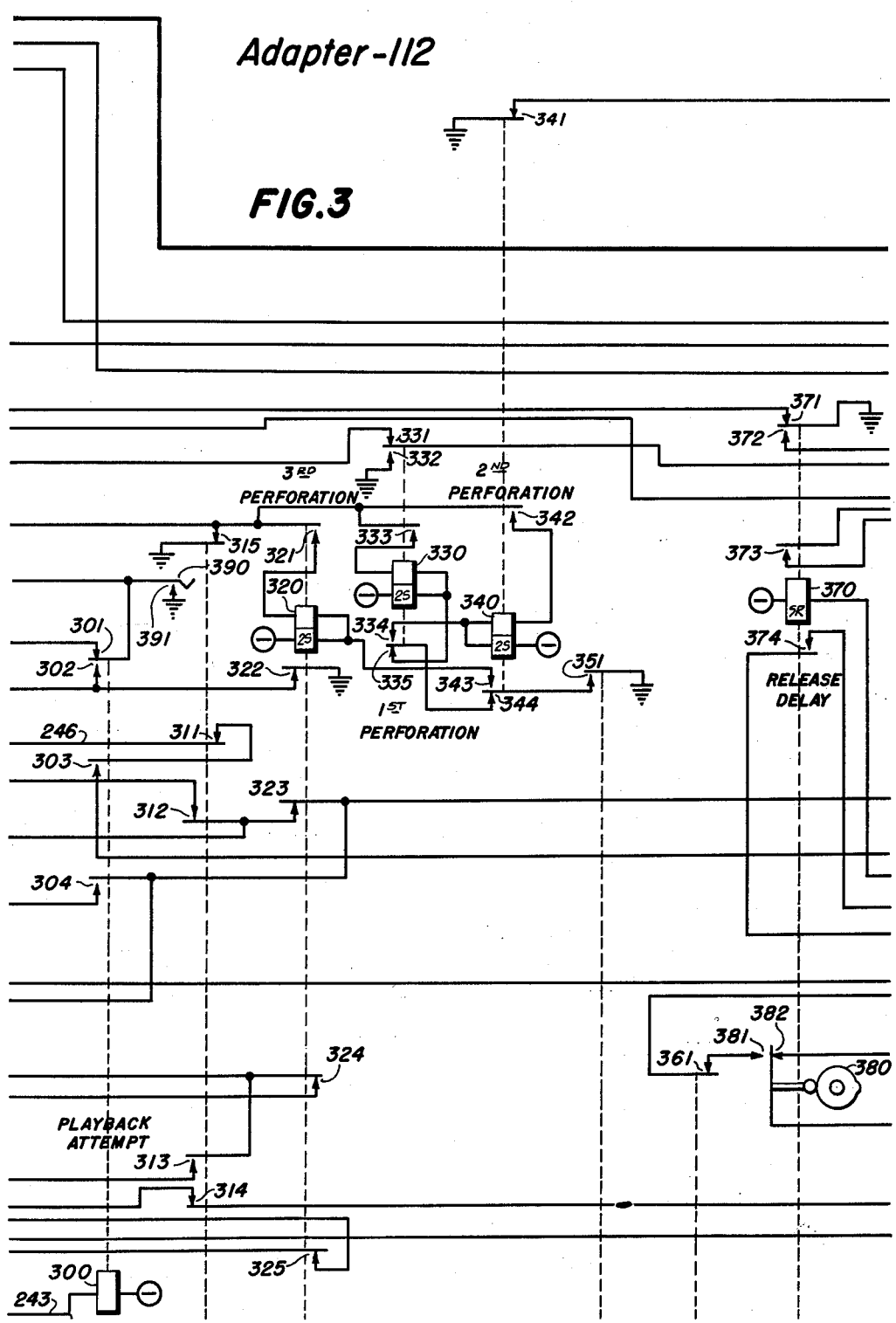
Figure 4:
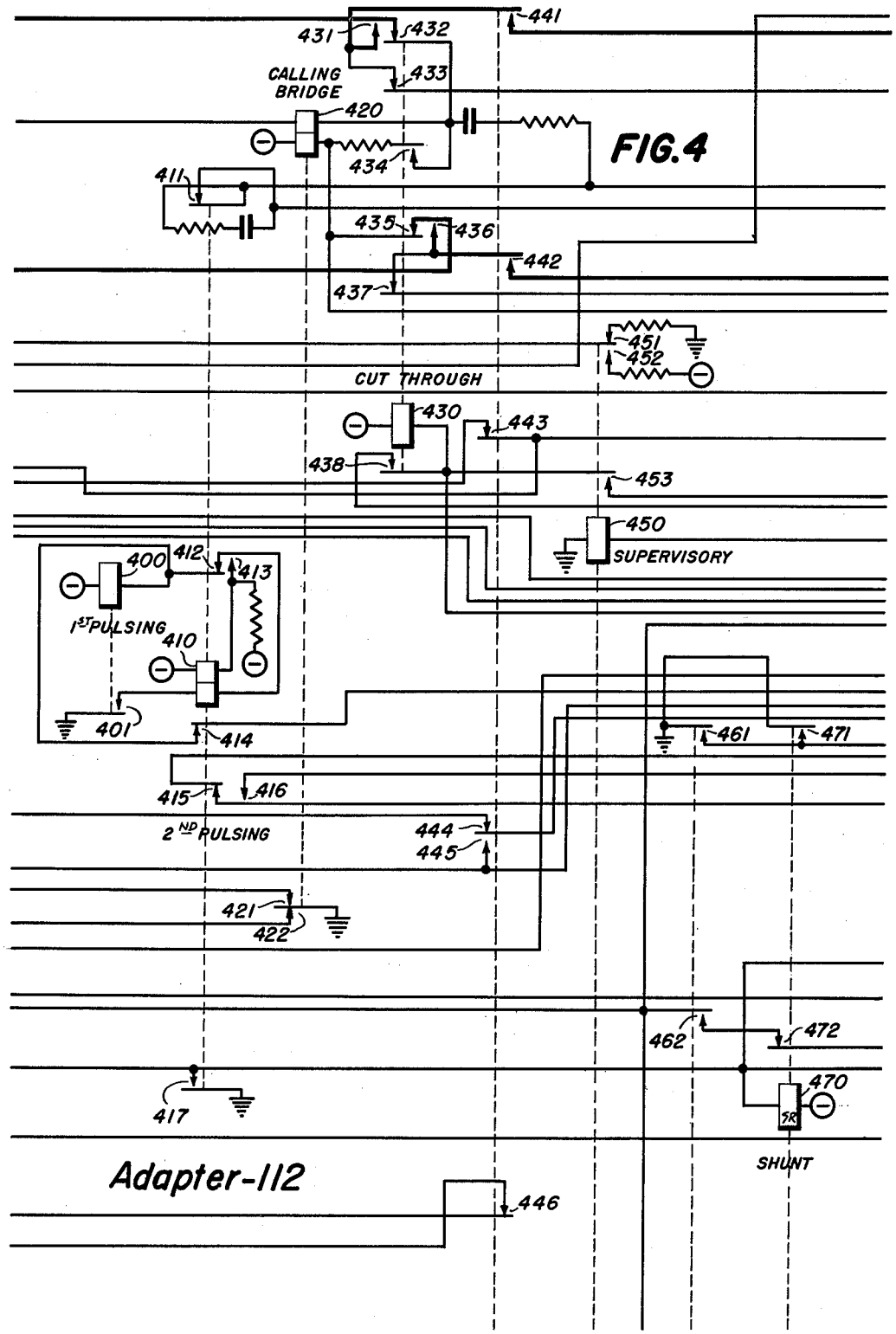
Figure 5:
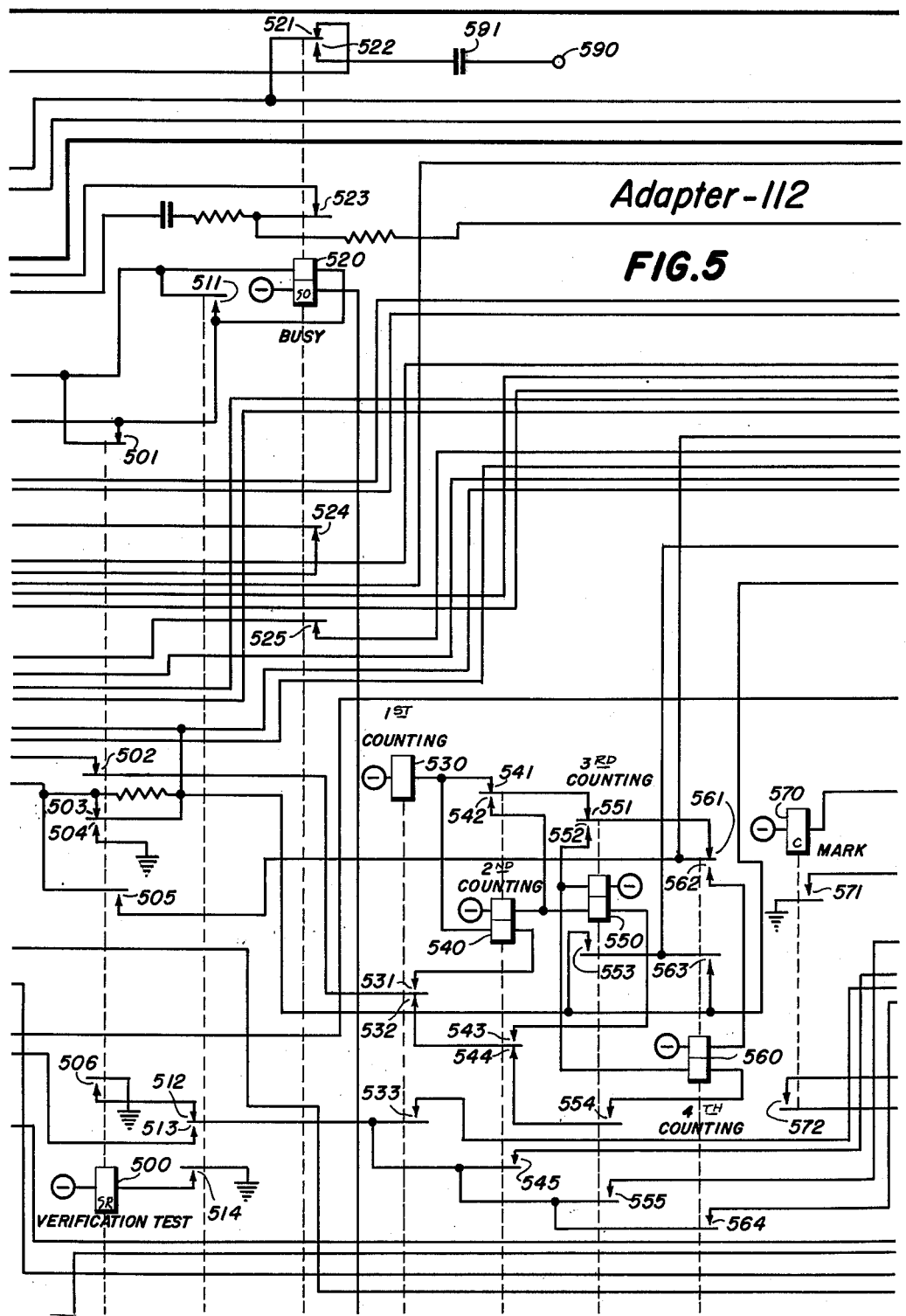
Figure 6:
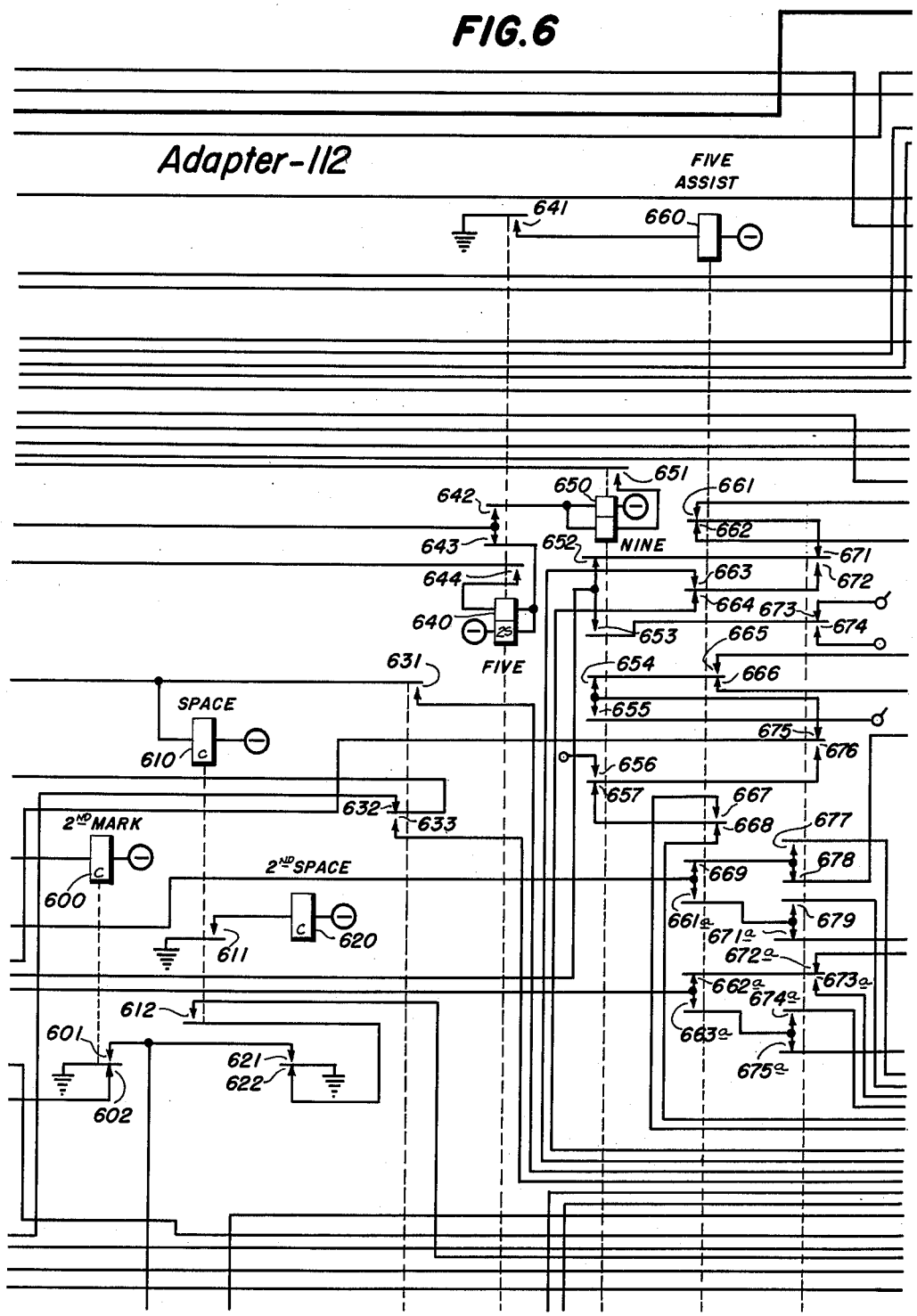
Figure 7:
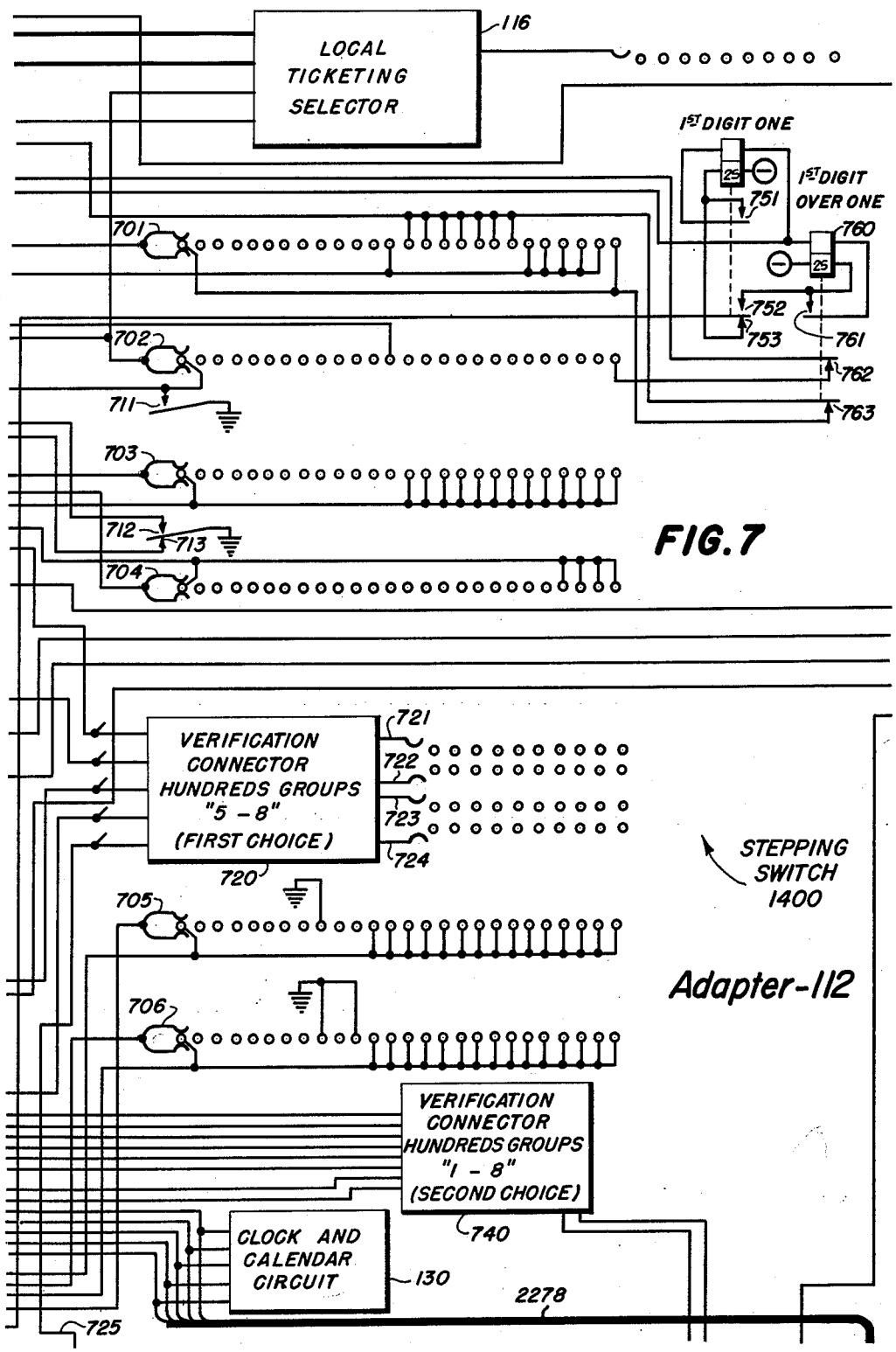
Figure 8:
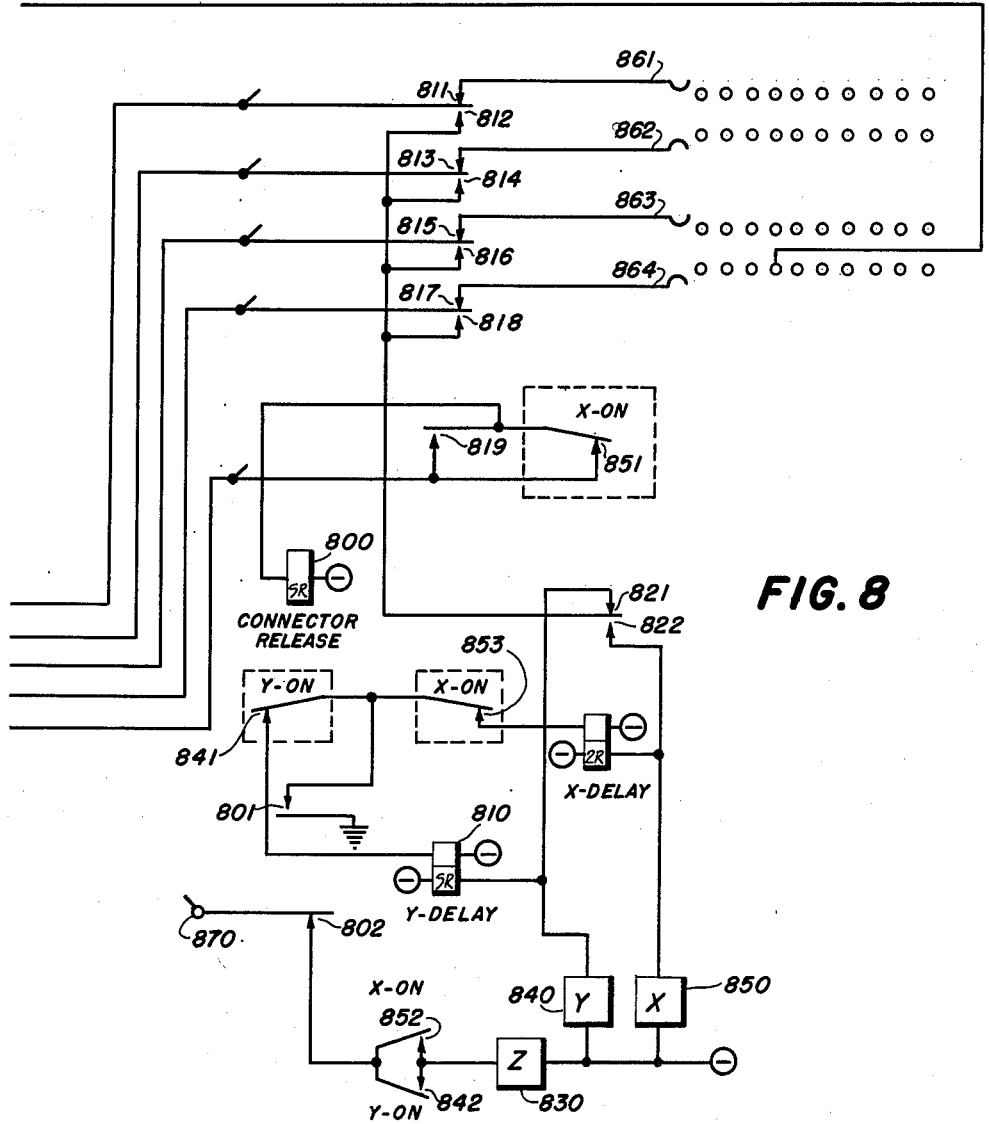
Figure 9:
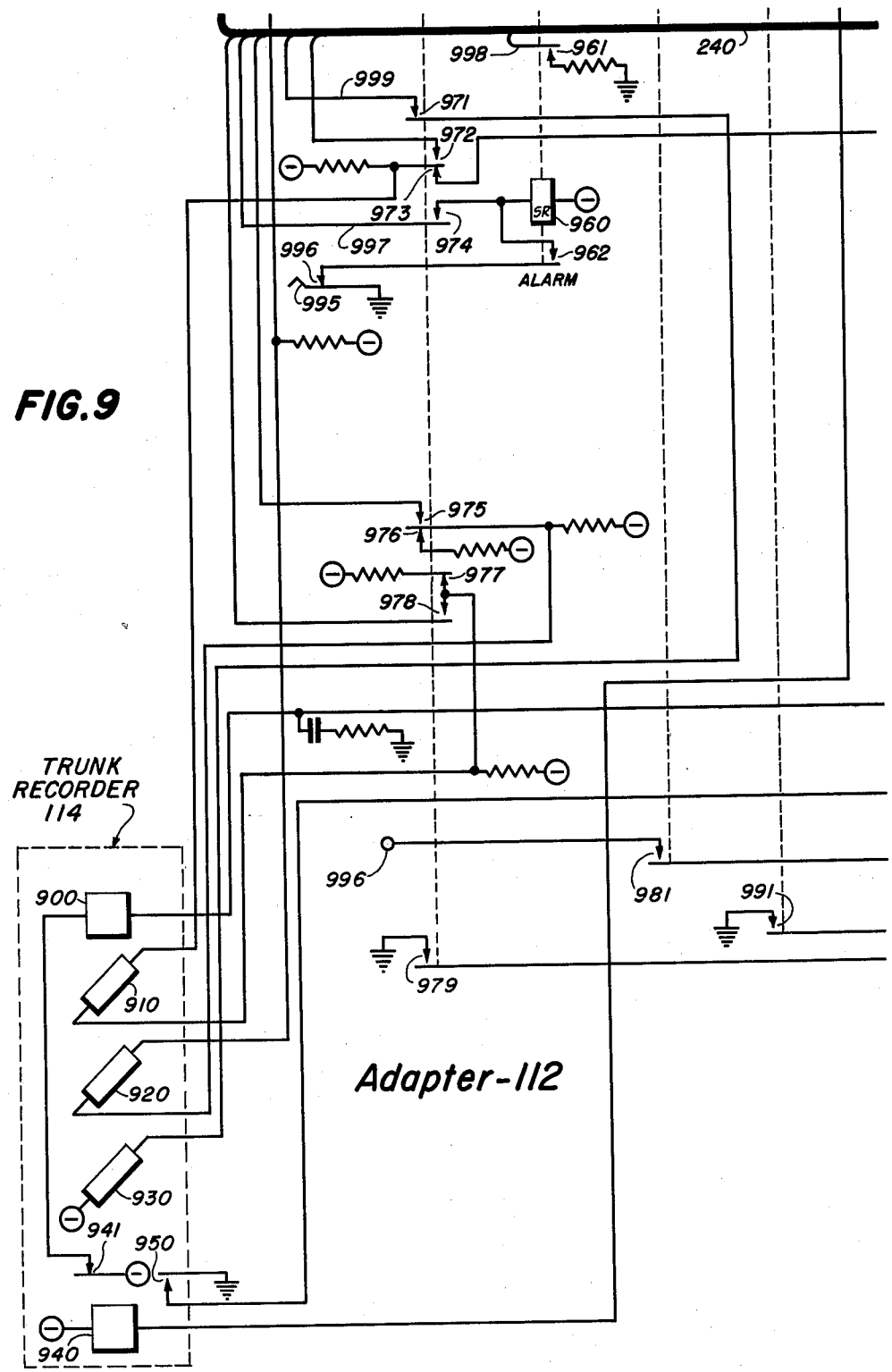
Figure 10:
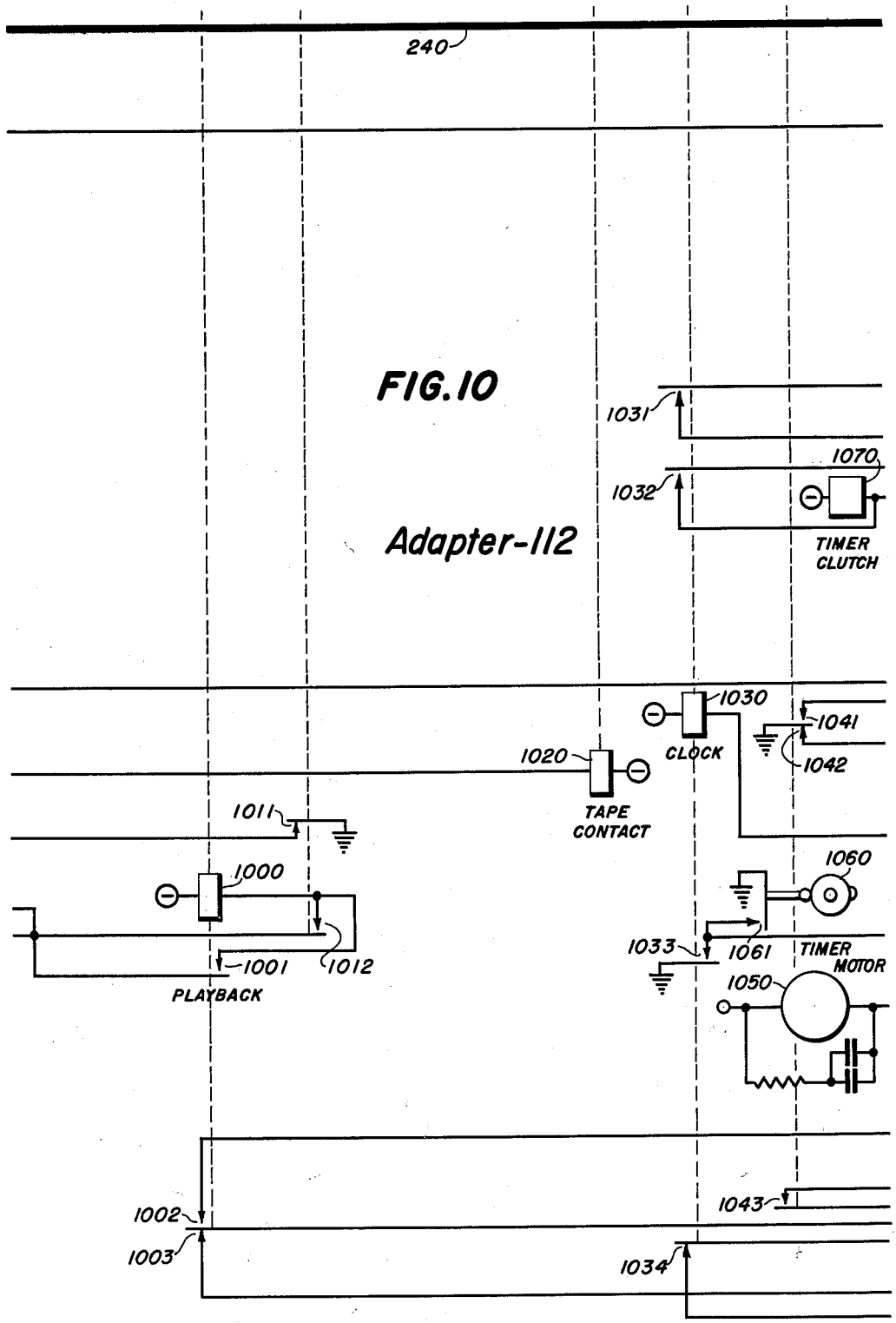
Figure 11:
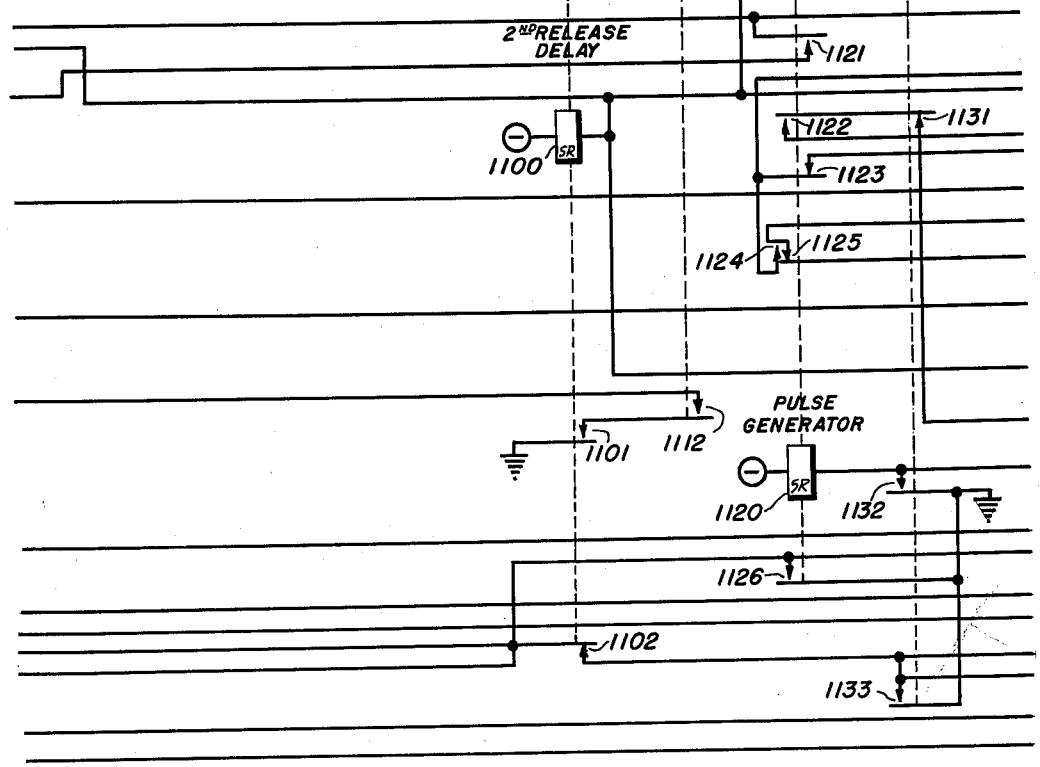
Figure 12:
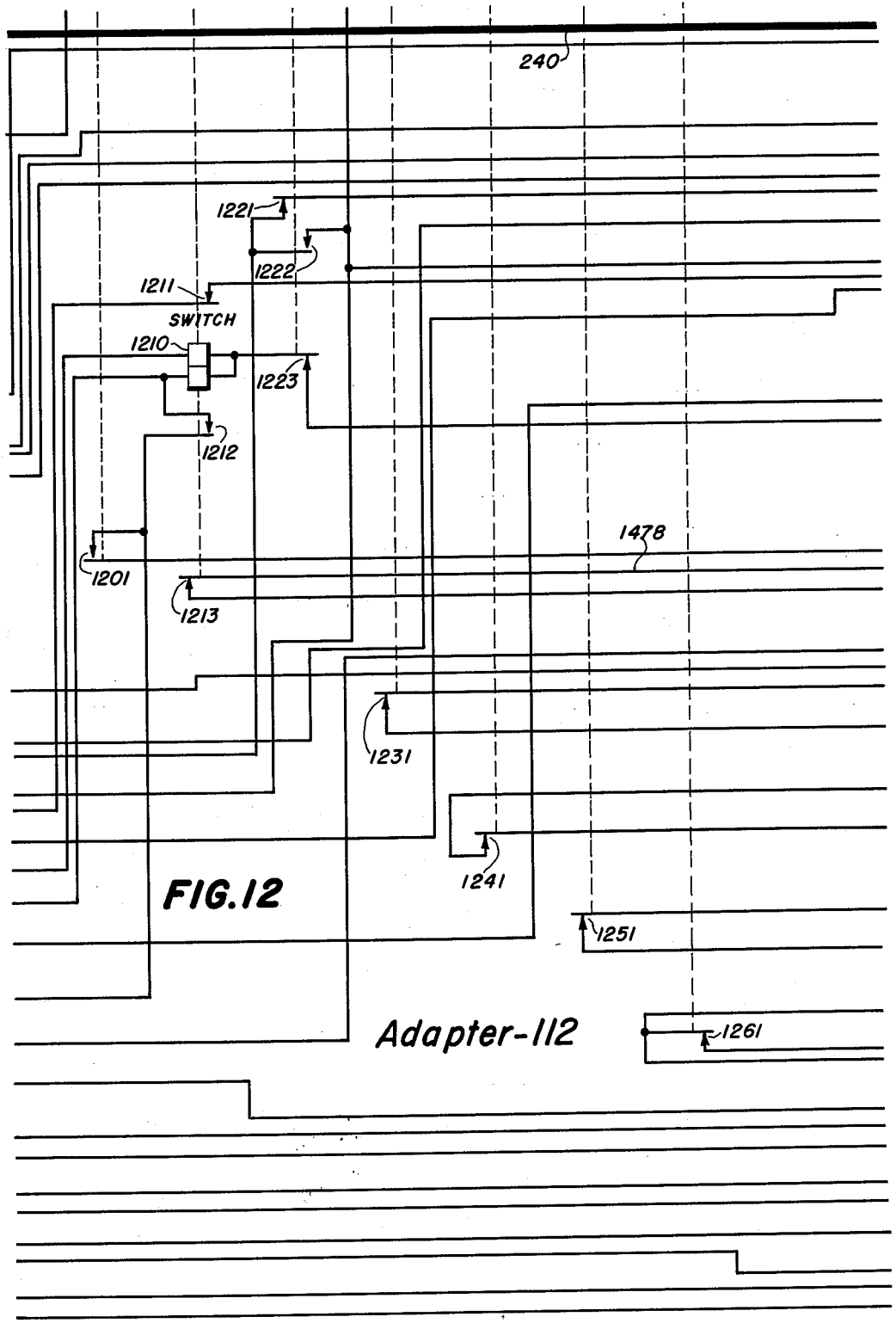
Figure 13:
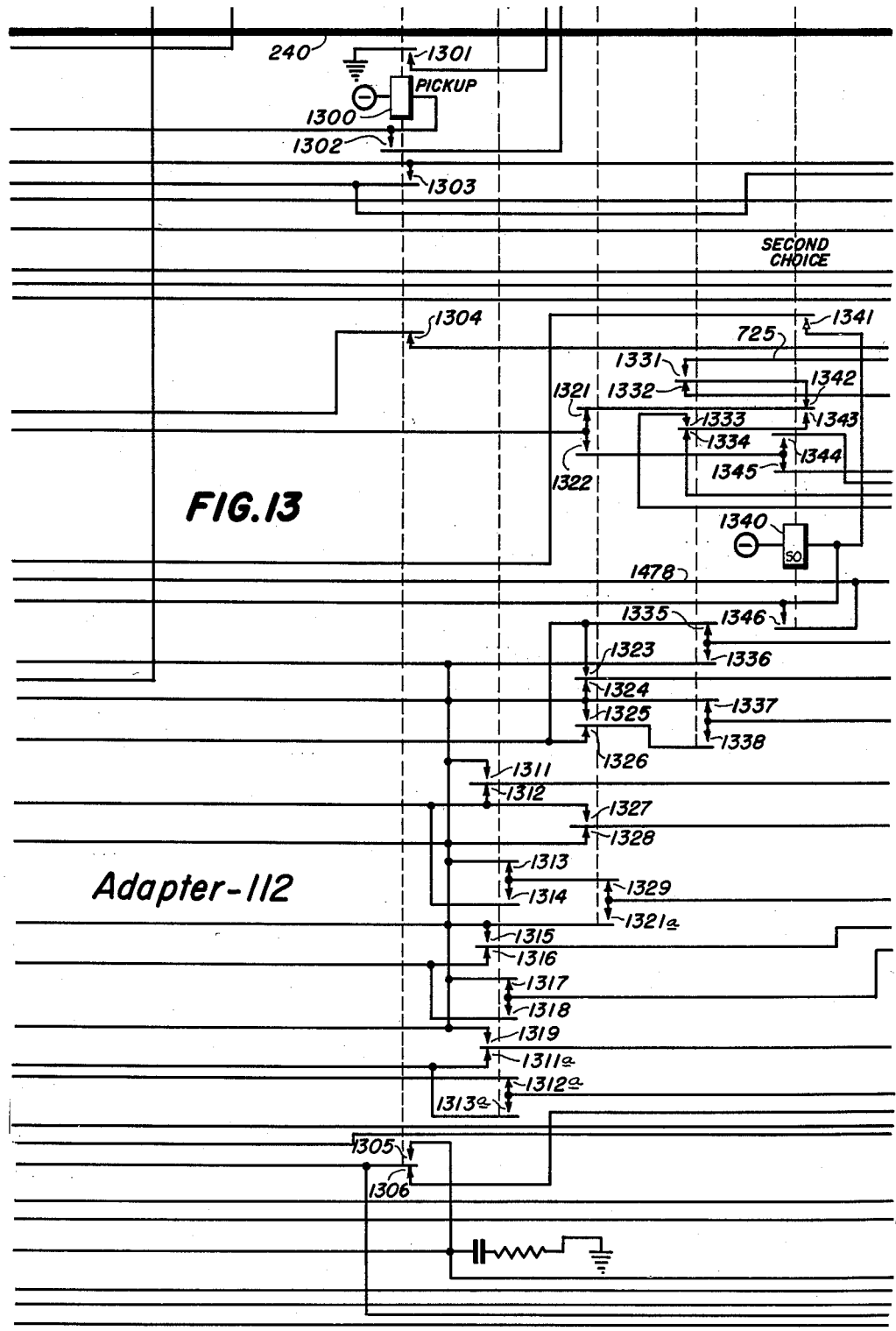
Figure 15:
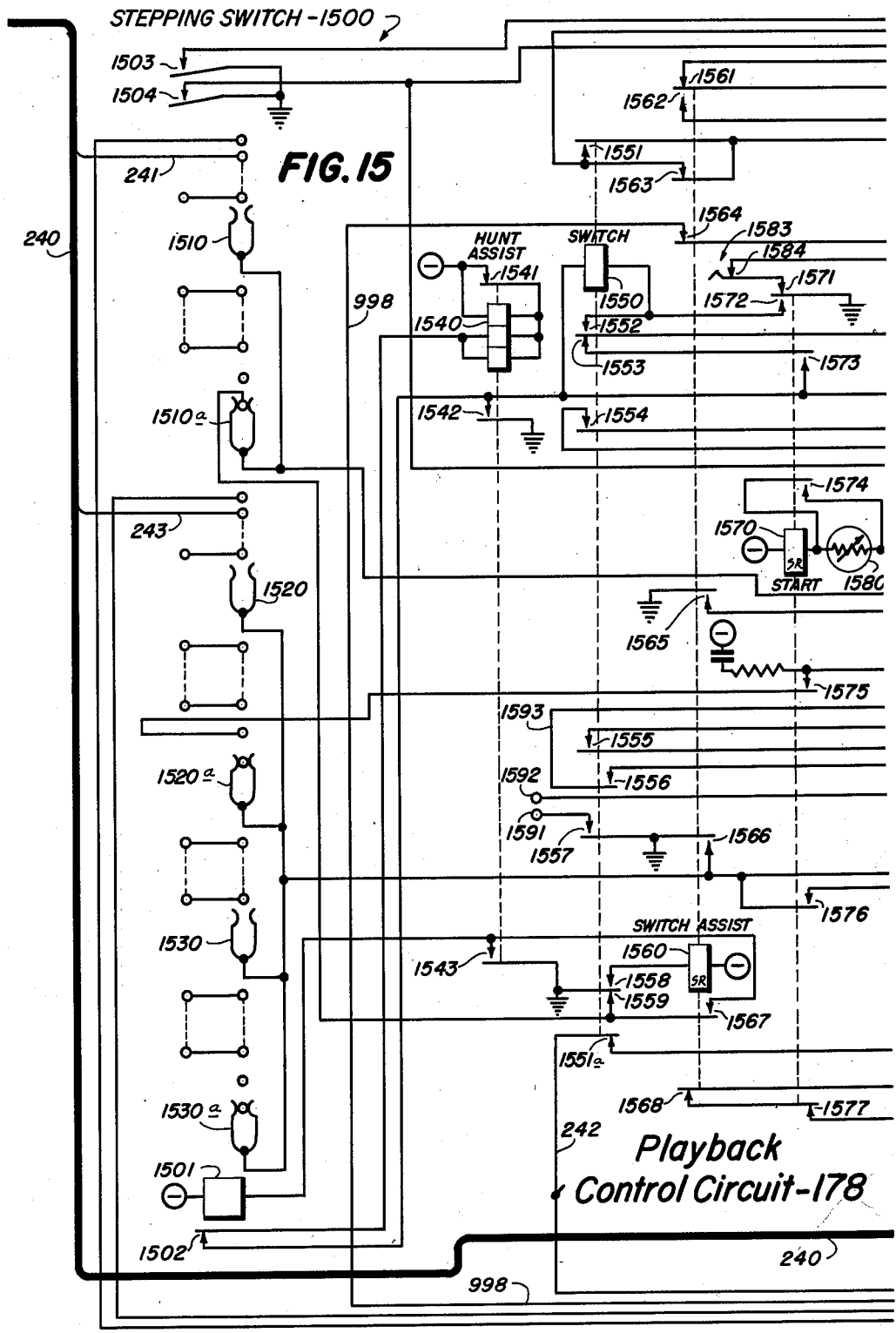
Figure 16:
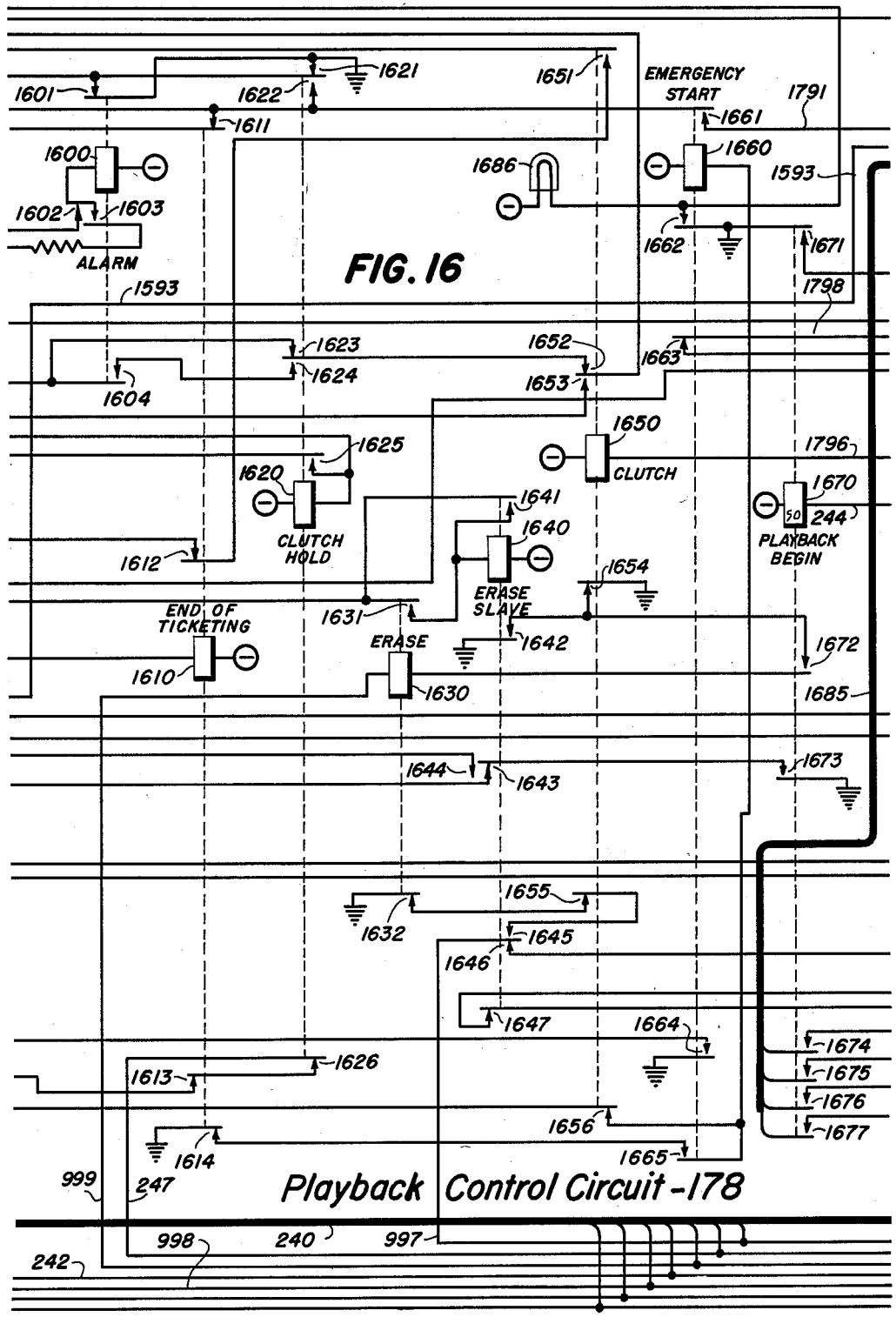
Figure 17:
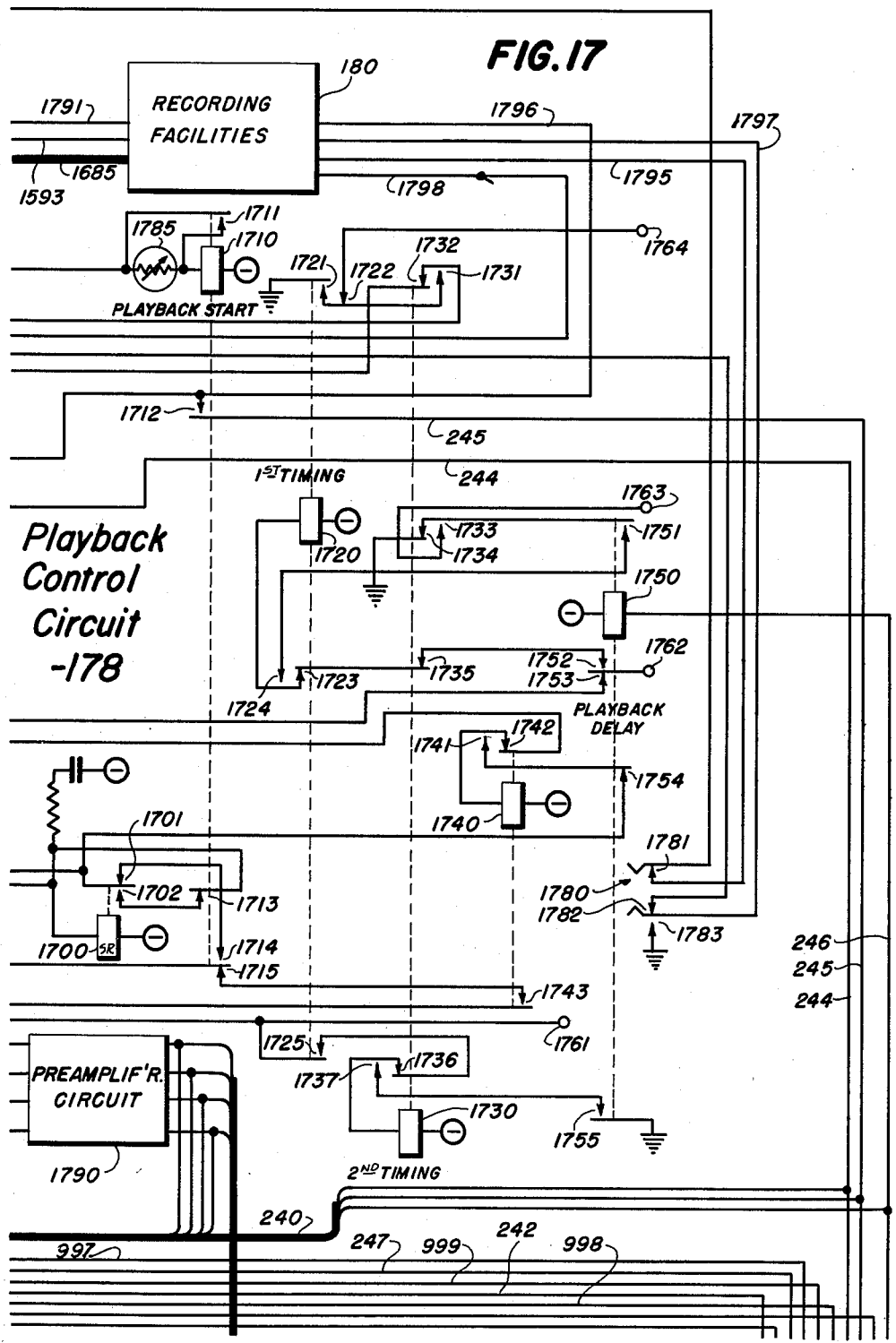
Figure 18:
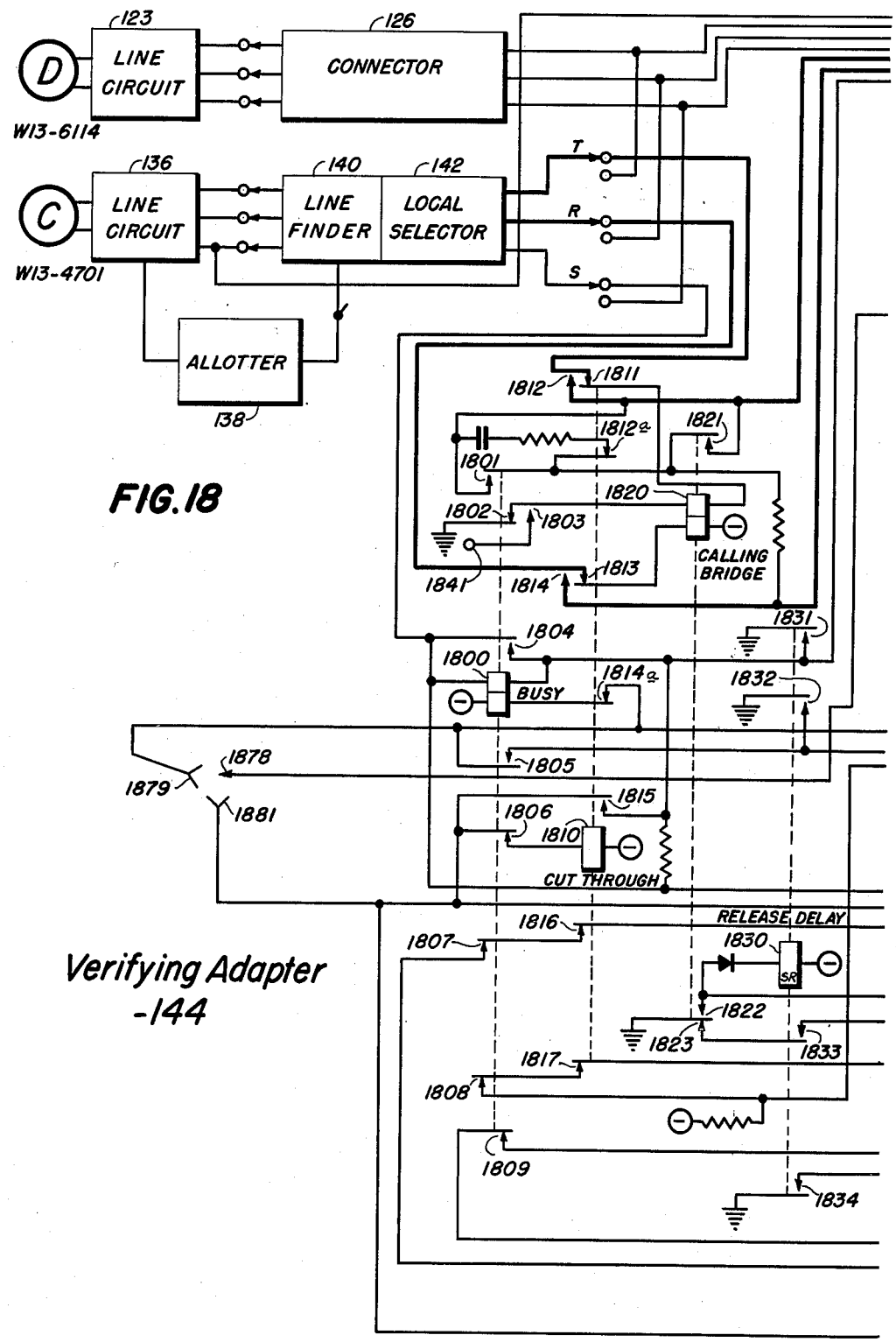
Figure 19:
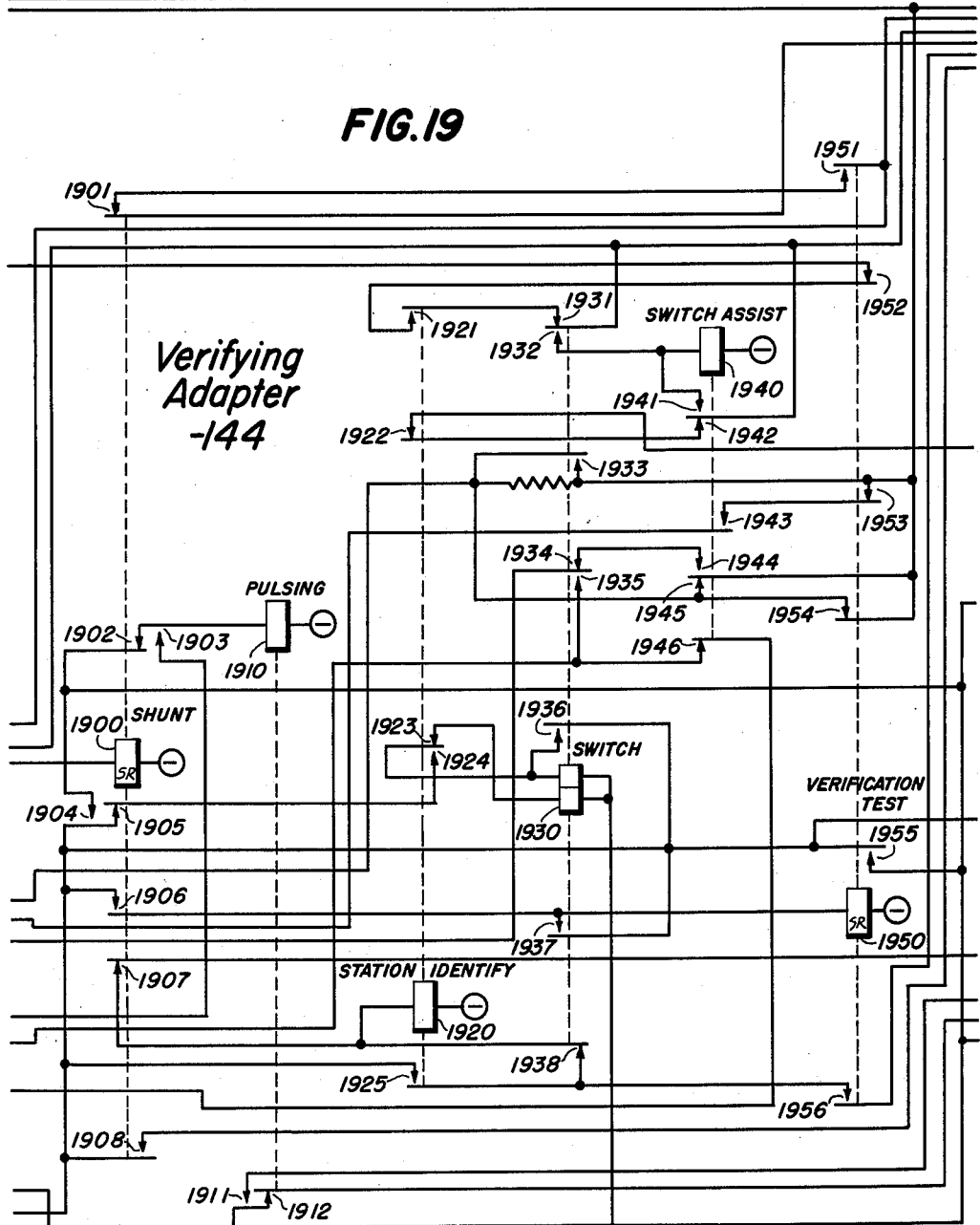
Figure 20:
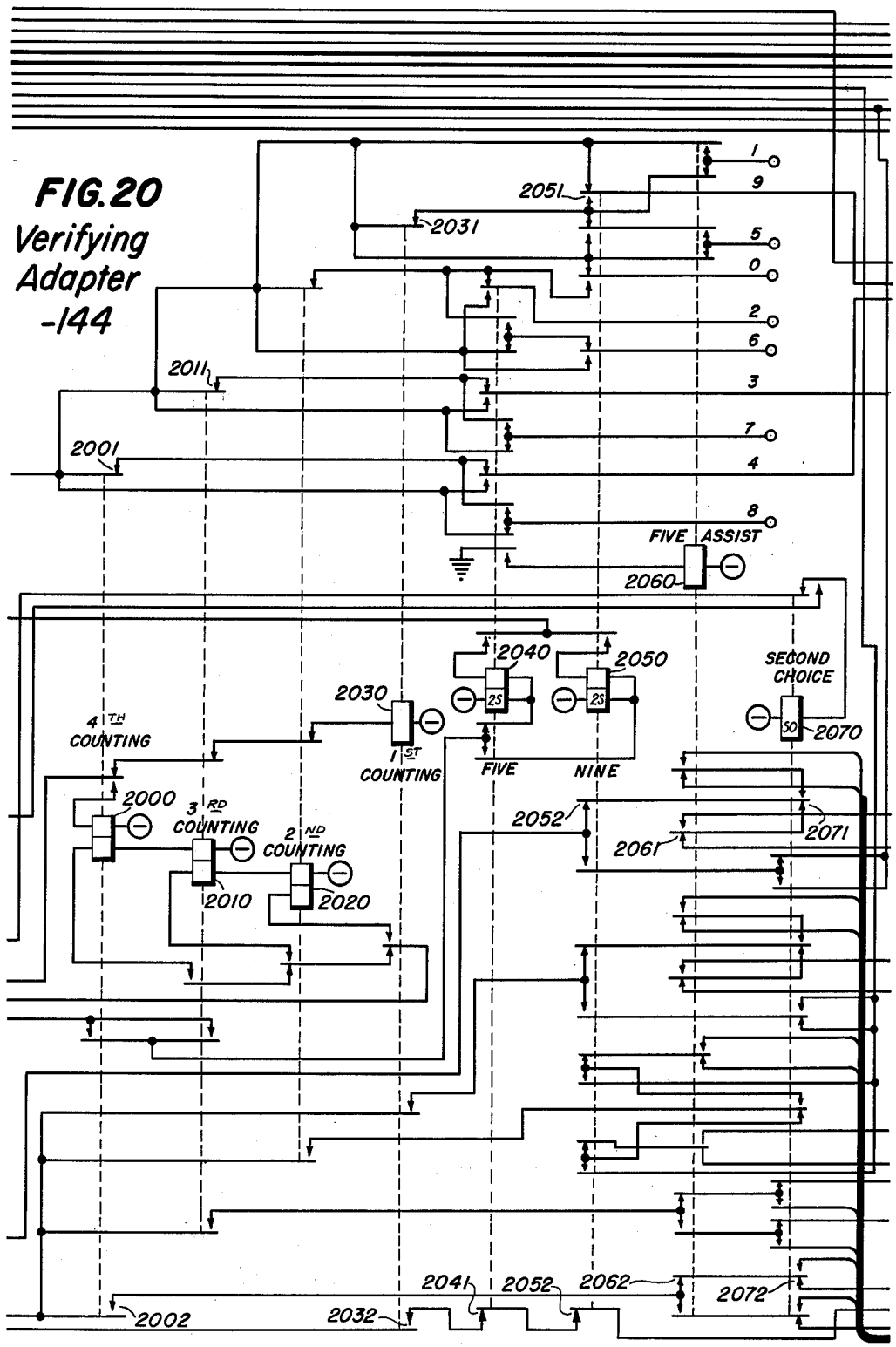
Figure 23:
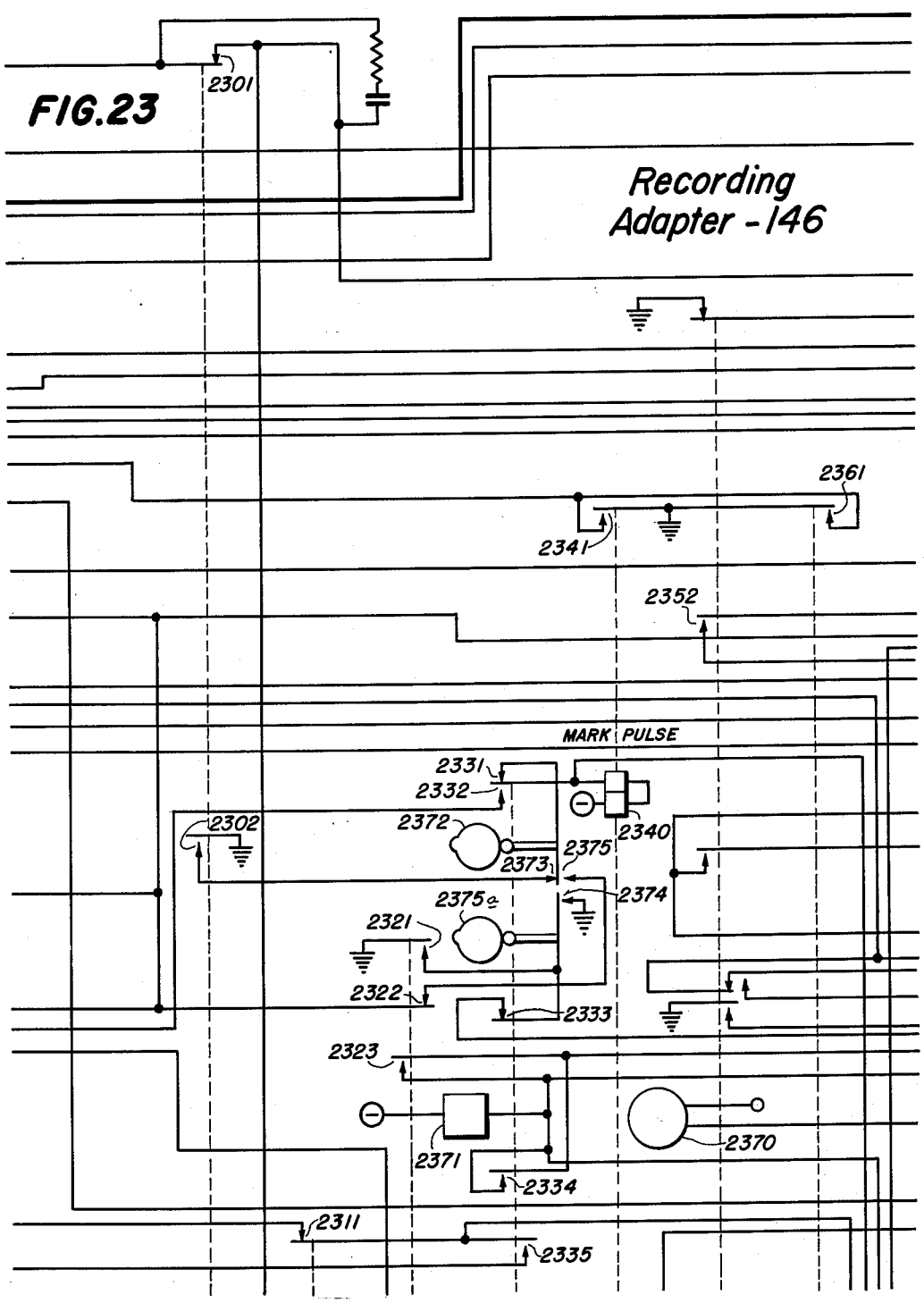
Figure 25:
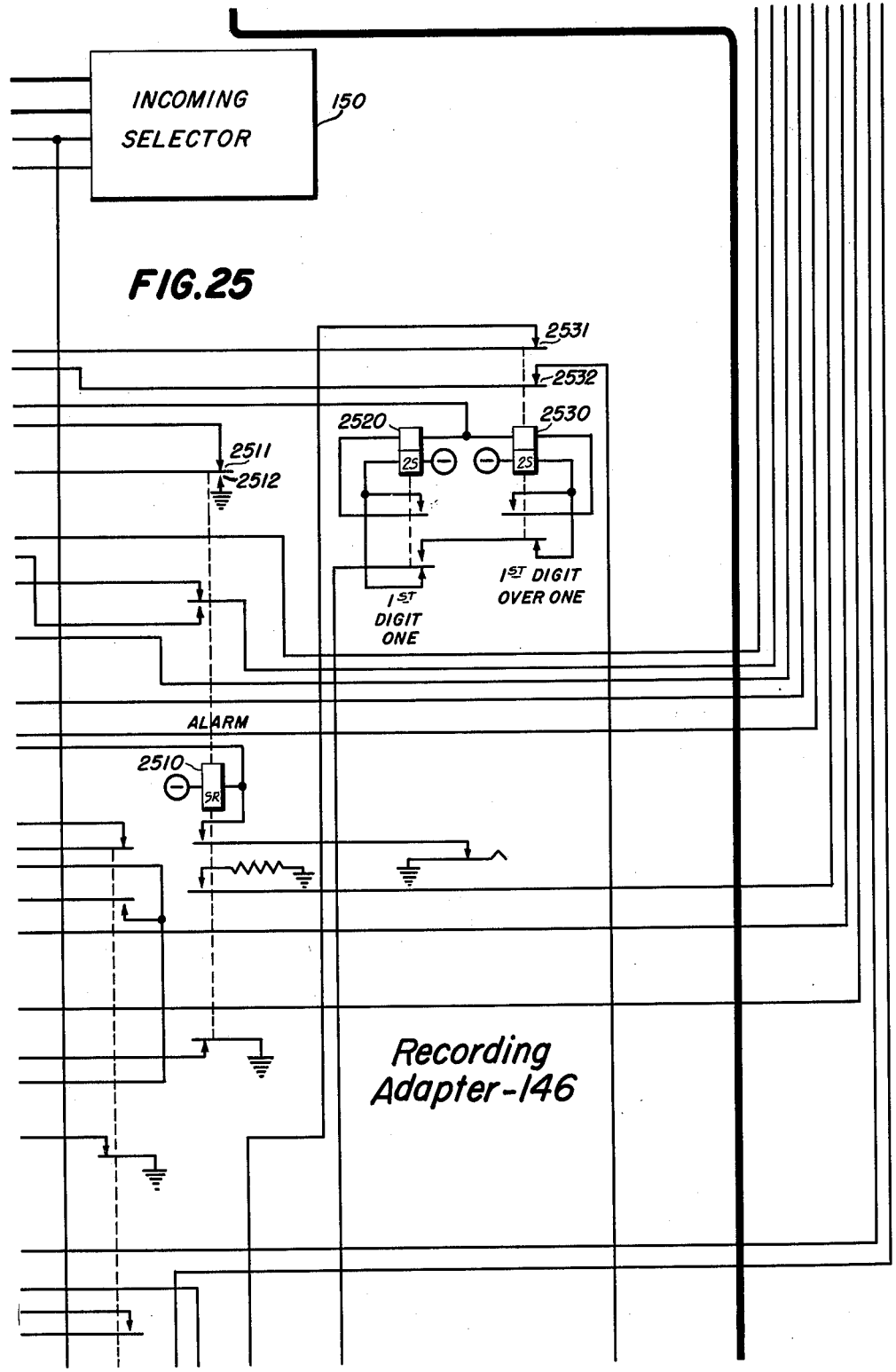
Figure 26:
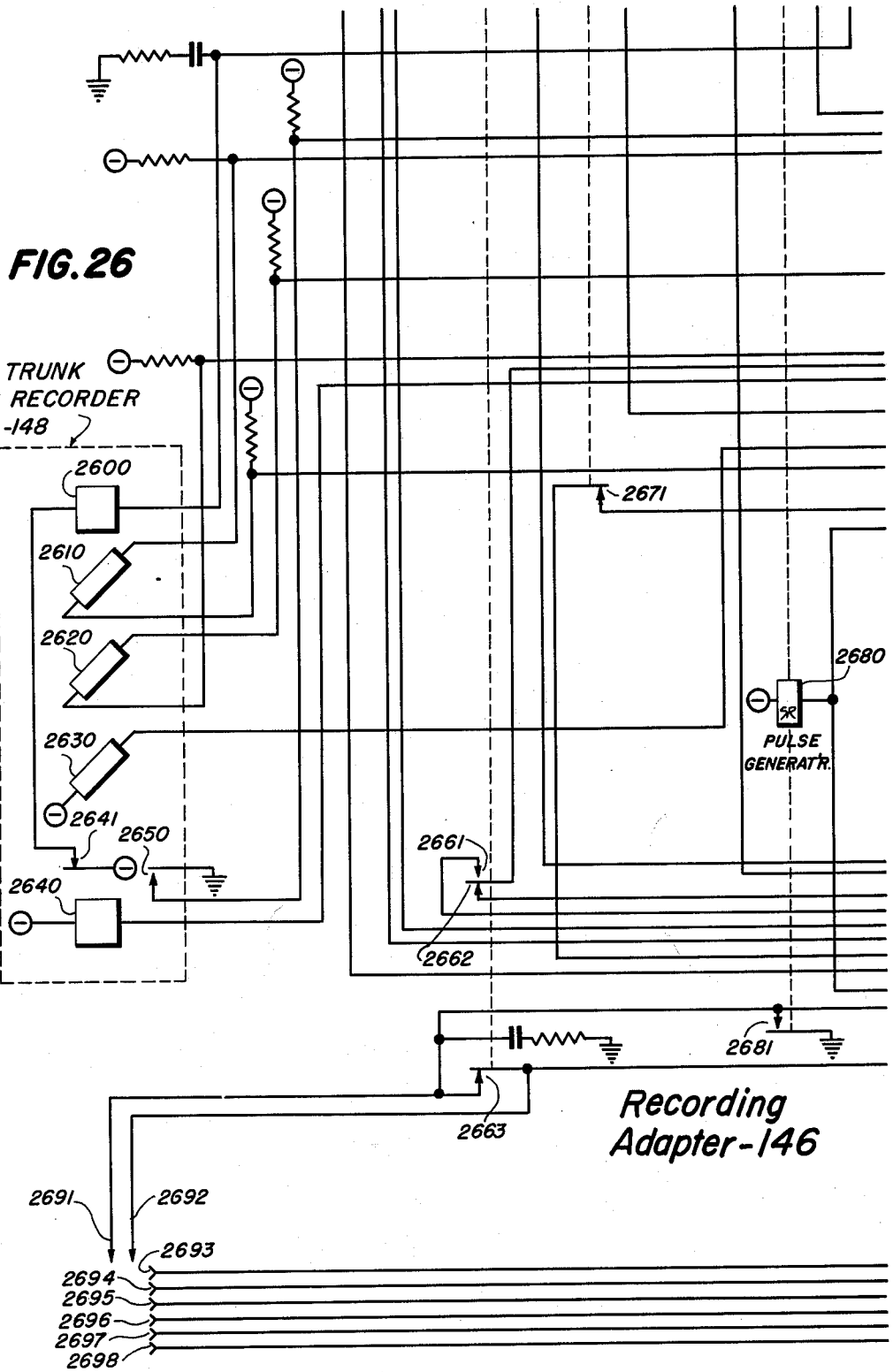
Figure 27:
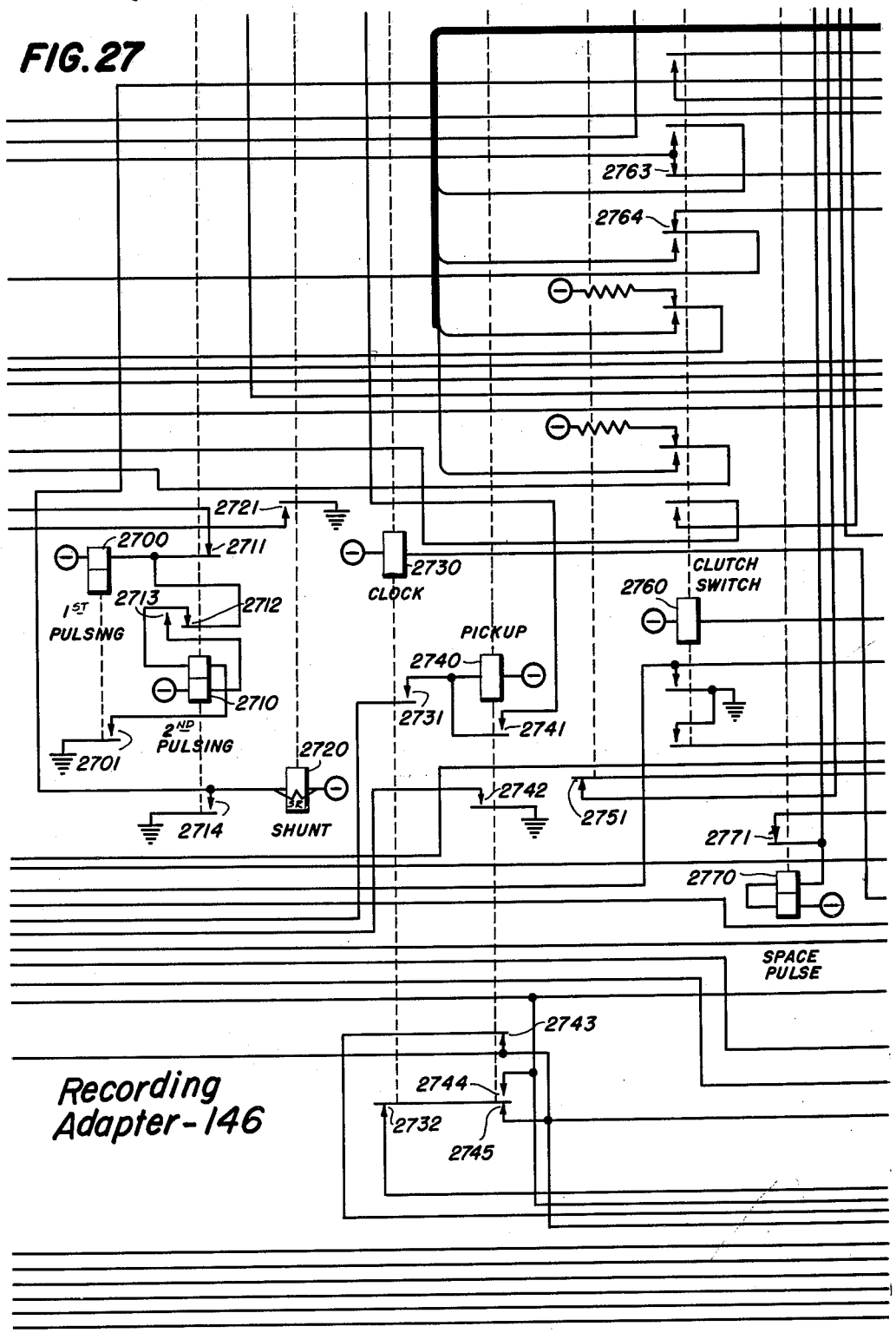
Figure 28:
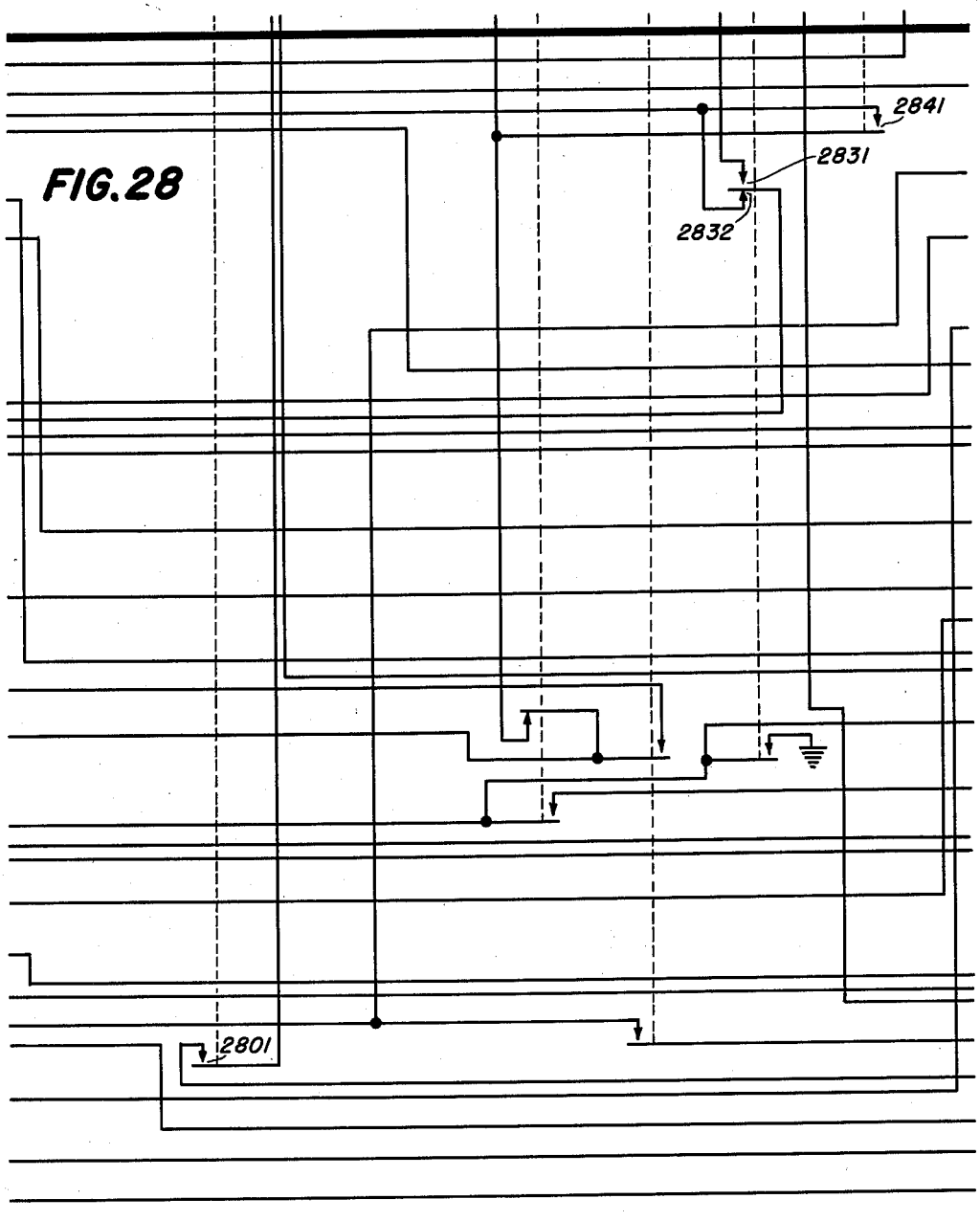
Figure 29:
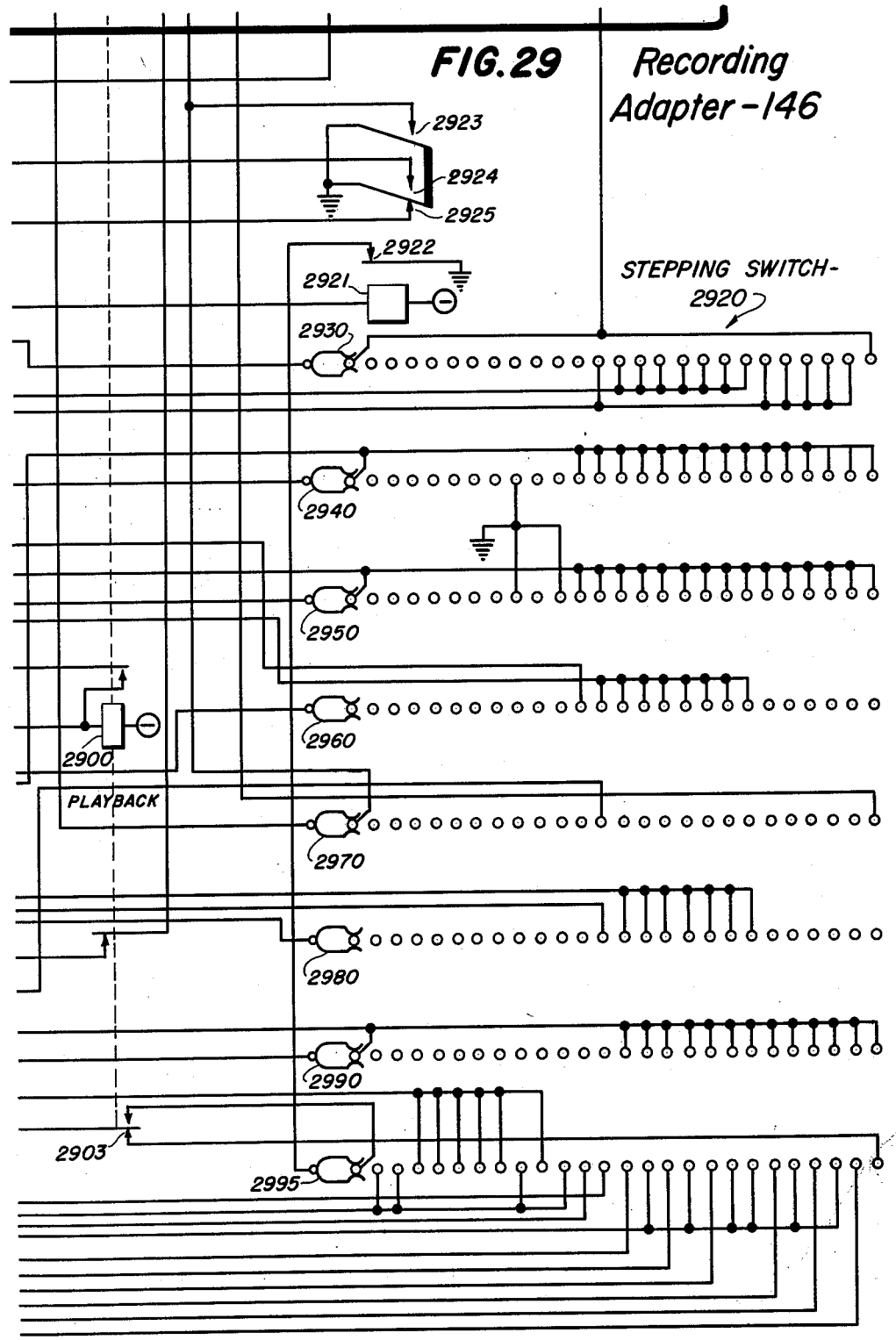

| FIG. 2 | FIG. 3 | FIG. 4 | FIG. 5 | FIG. 6 | FIG. 7 | FIG. 8 | | |
|---|---|---|---|---|---|---|---|---|
| FIG. 9 | FIG. 10 | FIG. 11 | FIG. 12 | FIG. 13 | FIG. 14 | FIG. 15 | FIG. 16 | FIG. 17 |
| | FIG. 18 | FIG. 19 | FIG. 20 | FIG. 21 | FIG. 22 | FIG. 23 | FIG. 24 | FIG. 25 |
| | | | | | FIG. 26 | FIG. 27 | FIG. 28 | FIG. 29 |

FIG. 30

United States Patent Office 3,087,020
Patented Apr. 23, 1963

3,087,020
TOLL TICKETING ADAPTER CIRCUIT
Ben A. Harris, Rochester, N.Y., assignor to General Dynamics Corporation, Rochester, N.Y., a corporation of Delaware
Filed Sept. 21, 1956, Ser. No. 611,219
30 Claims. (Cl. 179—18)

This invention relates to a telephone system, and, more particularly, to a telephone system including means for automatically collecting and storing items of information pertaining to telephone calls.

In automatic toll ticketing systems, the items of information pertaining to toll calls are automatically collected and stored for use, either following each call or at selected time intervals, in producing permanent records which provide the necessary information for billing subscribers. In most systems, the call data is collected and recorded locally or in a remote or tandem office, although in some systems, such as that showni in the copending application of Frank A. Morris et al., Serial No. 536,571, filed September 26, 1955, which is assigned to the same assignee as the present application, the data is collected in a remote area and subsequently transmitted to a local area for recording. Included in the data collected is information identifying the calling subscriber, which permits the charge for the call to be properly assessed.

This calling subscriber information is determined either automatically or under the control of dialled subscriber identifying digits, as described and shown in the copending application of Frank A. Morris et al., Serial No. 348,202, filed April 13, 1953, now Patent No. 2,886,642, which application is assigned to the same assignee as the present application. This latter type of identifying or verifying utilizes a switch train in the office in which the calling subscriber is located which is set up by the dialed digits representing the calling subscriber designation. As shown in the earlier filed and above identified Morris et al. application, these dialed digits are not repeated over the outgoing trunk and are conveniently stored in the local area in conjunction with the other items of information pertaining to the toll call to provide the calling subscriber identification to the toll call to provide the calling subscriber identification. However, in some applications it would be desirable to collect and store the toll data in an area remote from that in which the verifying or identifying facilities are provided.

Accordingly, one object of the present invention is to provide a new and improved automatic toll ticketing system.

Another object is to provide new and improved means for collecting and storing data pertaining to the designation of a calling subscriber.

Another object is the provision of a telephone system including calling subscriber identifying means in one local office and means for collecting and storing data pertaining to the designation of the calling subscriber in a remote office.

Another object is to provide a telephone system including automatic operable toll data collecting and storing means which are rendered ineffective on calls extended to an operator position.

Another object is to provide an improved calling line verifying means operated by dialed digits which includes means for checking a portion of the dialed digits and for setting up a switch train with others of said digits.

Another object is to provide calling subscriber identifying means adapted for use with subscriber designations including a variable number of digits.

A further object is the provision of a toll ticketing system including means for insuring the collection and storage of complete calling and called subscriber designations.

Figure 1:
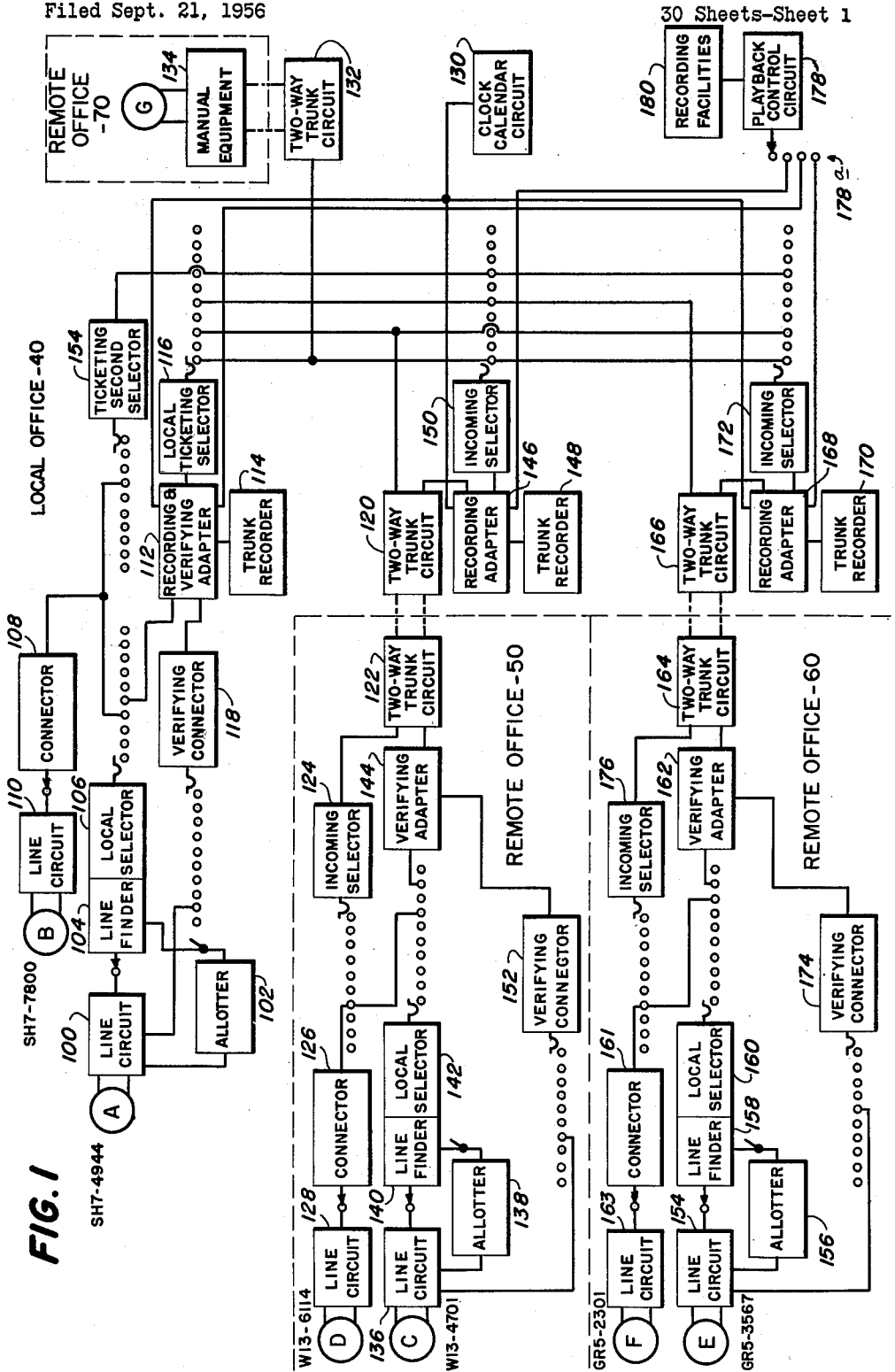

Other objects and advantages of the present invention will become apparent from the ensuing description of an illustrative embodiment thereof in the course of which reference is made to the accompanying drawings in which:

FIG. 1 is a block diagram illustrating a telephone system embodying the present invention;

FIGS. 2 to 29, inclusive, form a schematic drawing illustrating circuit details of the telephone system; and FIG. 30 is a block diagram showing the manner in which FIGS. 2 to 29, inclusive, are positioned adjacent each other to form a circuit diagram of an automatic toll ticketing system embodying the present invention.

Referring now to FIG. 1 of the drawings, the exchange network shown therein by way of example comprises a local office 40 and a plurality of remote offices 50, 60, and 70. The local office 40 includes automatic switching equipment for extending local calls between subscribers in the local office 40, which are not to be ticketed, and for extending toll calls to the remote offices 50 and 60, which are also provided wtih automatic switching equipment, which are to be ticketed. Further, calls can be placed from the local office 40 to the remote office 70, which is provided with manual equipment, and, although calls to the remote office 70 are to be ticketed, due to the manual equipment provided therein, the items of information pertaining to the toll calls are not automatically recorded by the toll ticketing equipment. Similarly, the remote offices 50 and 60 include automatic switching equipment for extending local calls which are not ticketed and for extending toll calls to other offices, such as the local office 40 or either of the offices 50 or 60, which are automatically ticketed. However, as in the case of the local office 40, calls extended from either of the offices 50 or 60 to the manual office 70 are subject to toll charges, but the items of information pertaining to these calls are not automatically collected and stored by the automatic toll ticketing equipment.

The automatic toll ticketing equipment provided is of the general type disclosed in the two above identified copending Morris et al. applications and includes data storing means individual to each of a group of separate line extending means which are capable of storing items of information pertaining to a plurality of calls. Each of the individual storing means is connected to a common recording means at a selected time of day, preferably in the early morning hours, to permit the stored items to be recorded in permanent form. To facilitate the production of permanent records in accordance with the items registered in the various storing means, all of the storing means are located in the local office 40, even though certain of the items of information stored therein, such as the designations of the calling and called subscribers, are provided from the remote offices 50 and 60.

To provide the items of information identifying the calling subscriber, identifying or verifying means similar to that disclosed in the earlier field above identified copending Morris et al. application are provided. These verifying means consist of a switch train set in accordance with dialed digits representing the designation of the calling subscriber, and the system is so arranged that, unless the verification train is set up to the line circuit or terminal from which the call has been extended, access to the toll ticketing facilities is denied, thus preventing the completion of the toll call. Accordingly, it is necessary to provide the verification switch train and means for controlling the switch train in the office in which the calling subscriber is located. When calls are placed from the local office 40, the dialed digits used in setting up the verification switch train are conveniently recorded in the storage means provided in the local office 40. However, when the tool call is extended from one of the remote offices 50 or 60, the dialed digits representing the designation of the calling subscriber are not only utilized locally to set up the vertification switch train, but also are repeated to the associated storage means in the local office 40 to permit their storage as one of the items of information pertaining to the toll call.

When a local call is to be extended from a calling substation A, idetntified as "SH 7-4944," on a terminal per line multiparty line to another local substation B, identified as "SH 7-7800," going off-hook at the calling substation A extends the calling circuit to a line circuit 100. This circuit places an allotter 102 in operation so that an idle link, such as one including a line finder 104 and a local selector 106, is placed in operation to search for and seize the line circuit 100. Incident to the completion of this seizure, the loop circuit is completed to the local selector 106 and the subscriber at the substation A is advised that dialing may be initiated. The switch directing digits dialed at the substation A operate the local selector 106 and a local connector 108 to establish a connection through a line circuit 110 to the calling substation B in any of the manners well known in the art.

When a call is to be extended from the substation A in the local office 40 to a substation, such as the substation D designated "WI 3–6114," in the remote office 40 for which a toll charge is to be assessed, the call is initiated in the same manner as a local call by going offhook at the station A to extend the calling loop circuit to the line circuit 100. This plates the allotter 102 in operation so that an idle link, such as one including the line finder 104 and the local selector 106, is placed in operation to search for and seize the line circuit 100 and to cut through the calling loop circuit from the substation A to the local selector 106. Since the call is to be a toll call to a remote substation, the first digit dialed at the substation A is an access digit, such as the digit "5," which causes the wipers of the local selector 106 to move to the fifth contact level and thereafter search over the contacts in this level to find an idle recording and verifying adapter circuit which is used to control the recording of the items of information pertaining to the toll call. Assuming that a recording and vertifying adapter circuit 112 is idle, the local selector 106 seizes the adapter 112 and switches the calling loop circuit through to this circuit.

The adapter 112 is provided with an individually associated trunk recorder 114 capable of storing the items of information pertaining to a plurality of toll calls. Incident to seizure of the adapter 112, this circuit is marked as busy to prevent its seizure and pulsing paths are prepared for control by digits dialed from the calling substation A to permit the dialed information to be stored in the trunk recorder 114. In seizing the adapter 112, an assoicated local ticketing selector 116 is busied.

Following the seizure of the recording and verifying adapter 112, the first item of information dialed at the calling substation A is the group of digits forming the designation of the calling substation A, which digits are simultaneously recorded in the trunk recorder 114 and utilized to establish a verification switch train back to the calling line circuit 100. More specifically, the first three digits dialed at the substation A are the three office code digits "747" representing the designation "SH 7." These digits, which are not repeated to the local ticketing selector 116, are stored in the trunk recorder 114 and also checked by the recording and verifying adapter 112 to determine whether these digits correctly designate the local office 40. In the event that the first three digits are correctly dialed, the fourth dialed digit "4" comprising the thousands digit of the directory number and the hundreds functional digit is stored in the trunk recorder 114 and is also temporarily stored in the adapter 112 to select one of a group of verifying connectors, such as a connector 118. Thereafter, the functional tens and units digits, i.e. the hundreds and tens digits "9" and "4" of the directory number, are dialed at the calling substation A and recorded in the trunk recorder 114. These two digits are also repeated to the verifying connector 118 so that the wipers thereof are advanced to a contact or bare wire multiple in accordance with the values of these two digits.

If the verifying connector 118 has established a connection to the sleeve or HS multiple individual to the calling line circuit 100, the recording and verifying adapter 112 is advised that the correct calling line designation has been recorded in the trunk recorder 114 and thus permits a further extension of the connection to the called substation D. Alternatively, if an incorrect calling line designation has been dialed by the subscriber at the substation A, the failure of the verification test operates the recording and verifying adapter 112 to prevent a further extension of the connection by returning busy tone to the calling substation A. At the completion of the verification test, the connector 118 is released and restored to its normal condition. Since the party ringing digit "4" forming the units directory digit is not utilized in establishing the verification train back to the line circuit 100, this digit is next dialed at the substation A and is stored in the trunk recorder 114.

Concurrently with recording the calling line designation in the trunk recorder 114 and establishing the verification switch train in accordance therewith, the dialed digits are counted by a stepping switch in the recording and verifying adapter 112 so that, after a predetermined number of digits as determined by the designation of the substations in the local office 40 have been received by the adapter 112, the adapter 112 is conditioned to repeat the next dialed digits to the local selector 116. The selector 116, which may absorb one or more digits, operates in response to the dialing of some of the seven digits forming the designation of the called substation D to extend a connection through a pair of two-way trunk circuits 120 and 122, an incoming selector 124, and a connector 126 to a line circuit 128 which is individual to the called substation D. A stepping switch in the adapter 112 counts the digits dialed in extending the connection to the called substation D so that, if an inadequate number of digits are dialed, a busy tone is returned to the calling substation A in response to the receipt of answer supervision by the adapter 112. Following the dialing of an adequate number of digits, the recording and verifying adapter 112 prevents the transmission of further switch directing digits through the adapter 112 and conditions this circuit for receiving answering supervisory signals from the extended switch train.

In the event that busy signals are received, the adapter 112 returns busy tone to the calling substation A and, in response to the release of the connection at the calling substation A, records an end-of-call code in the trunk recorder 114 to indicate that no further items of information pertaining to the call are to be recorded. Alternatively, upon receipt of answering supervisory signals from the extended switch train, the recording and verifying adapter 112 places a clock-calendar circuit 130 in operation so that data pertaining to the date and time of placing the call are recorded in the trunk recorder 114. Following the completion of the recording of this information, the clock-calendar circuit 130 is released and a timer individual to the adapter 112 is placed in operation to record signals at one minute intervals in the recorder 114 representing the length of the toll call. In response to the release of the connection, the recording and verifying adapter 112 utilizes the stepping switch therein to record an end-of-call signal in the trunk recorder 114 and removes holding and busy ground from the extended switch train so that it is released and restored to a normal condition.

For calls extended from the calling substation A to a called substation F in the remote office 60, the automatic toll ticketing system operates as described above except that, following the completion of the verification operation and the recording of the calling station designation in the trunk recorder 114, the local ticketing selector 116 seizes a two-way trunk circuit 166 which, together with a trunk circuit 164, an incoming selector 176, and a connector 161, is used in establishing a connection to a line circuit 163 to which the called substation F is connected.

On calls extended to a substation G in the remote office 70 which is provided with manual equipment 134, items of information pertaining to the toll call are not automatically collected by the toll ticketing equipment. Therefore, when the connection is extended from the substation A through the line circuit 100, the line finder 104, and the local selector 106 to the recording and verifying adapter 112, the subscriber at the calling substation A, instead of dialing the digits comprising the designation of the substation A, i.e. "747-4944," dials a digit "1" which is simultaneously stored in the trunk recorder 114 and repeated to the local ticketing selector 116 so that the wipers thereof are advanced to the first contact level. The contacts in this level are connected to two-way trunk circuits, such as the trunk circuit 132, which extend to the manual equipment 134 in the remote office 70. When the call is answered by the operator in the remote office 70, answering supervisory signals are returned over the trunk circuit 132 and the local ticketing selector 116 to cut through the connection to the manual equipment 134. When the call is terminated, the adapter 112, together with the remainder of the extended switch train, is released and an end-of-call signal is recorded in the trunk recorder 114 immediately following the single pulse representing the dialed digit "1" utilized in obtaining access to the remote office 70. Since all of the items of information pertaining to a toll call are not stored in the trunk recorder 114 in conjunction with calls extended to the manual office 70, a ticket is not printed for this call during a recording operation.

Referring now to the remote office 50, when a local connection is to be extended from a substation C on a terminal per line multiparty line, the substation C goes off-hook to energize a line circuit 136 so that an allotter 138 is placed in operation to seize an idle link such as a link including a line finder 140 and a local selector 142. The seizure of this link causes the line finder 140 to seize the line circuit 136 and to cut through the calling loop circuit to the local selector 142. This advises the subscriber at the calling substation C that dialing may be initiated, and the local selector 142 and the connector 126 are operated by the dialed digits in a manner well known in the art to extend the connection to the line circuit 128. Accordingly, for local calls extended between substations in the remote office 50, the items of information pertaining to the call are not automatically collected and stored.

However, when a toll call is to be extended from the substation C, for instance, in the office 50 to a subscriber in a remote office such as the substation B in the office 40, going off-hook at the substation C extends the connection through the line circuit 136 and line finder 140 to the local selector 142 as described above. To obtain access to a trunk extending between the office 50 and the local office 40, an access digit such as "9" is dialed at the substation C. This causes the local selector 142 to advance its wipers to the ninth level and thereafter to search over the contacts in the ninth level to seize an idle verifying adapter such as the adapter 144. Upon seizure of the adapter 144, the calling loop circuit is switched through to the vertifying adapter 144. Also, incident to seizure of the vertifying adapter 144, a seizure signal is transmitted over the two-way trunk circuits 122 and 120 to a recording adapter 146 so that this circuit is seized and pulsing paths are prepared therein for transmitting information to a trunk recorder 148 which is individually associated with the adapter 146.

The first item of information to be recorded which is dialed at the substation C in extending the toll call to the called substation B is the three code digits representing the designation "WI 3" of the remote office 50. These dialed digits are repeated over the two-way trunk circuits 122 and 120 to the recording adapter 146 in the local office 40 to be stored in the trunk recorder 148. Simultaneously therewith, these dialed digits are checked in the vertifying adapter 144 to insure that the digits correctly represent the office code digits of the remote office 50. In the event that these digits are correctly dialed, the vertifying adapter 144 prepares a vertification train for operation under the control of the next group of dialed digits.

The next digits dialed at the substation C are the four digits forming the station designation of the calling substation C. These digits are again repeated over the two-way trunk circuits 122 and 120 to cause the recording adapter 146 to store this information in the trunk recorder 148. Simultaneously therewith, the first three of these digits are utilized in the verifying adapter 144 and in a verifying connector 152 to return a verification switch train to the sleeve or HS lead of the calling line circuit 136. In the event that the vertifying connector 152 completes a connection to the calling line circuit 136, the vertifying adapter 144 is advised that the calling substation C has been correctly identified, and the verification train including the connector 152 is released prior to the dialing of the units or ringing digit of the designation of the substation C. The satisfactory completion of the vertification test permits the further extension of the toll call. In the event that the vertification train is returned to a line circuit other than the calling line circuit 136, the verifying adapter 144 prevents further extension of the connection.

Concurrently with recording the dialed digits representing the designation of the calling substation C, the recording adapter 146 advances a stepping switch therein so as to count the dialed digits representing identification of the calling line. Following the completion of the dialing of the necessary number of digits, the recording adapter 146 renders an incoming selector 150 responsive to the next digits dialed at the substation C so as to permit extension of the connection to the called substation B.

The subscriber at the calling substation C thereupon dials the digits forming the designation of the called substation B, and these dialed digits are utilized by the incoming selector 150, a ticketing second selector 154, and the connector 108 to establish a connection to the line circuit 110. In the event that insufficient digits for extending the connection to the substation B are dialed at the calling substation C, the recording adapter 146 provides means including the stepping switch for returning busy tone and preventing further extension of the connection. However, assuming that an adequate number of digits have been dialed, the recording adapter 146 is then conditioned for the receipt of answering supervisory signals from the called substation B. In response to the receipt of these signals, the recording adapter 146 seizes the common clock-calendar circuit 130 so that items of information pertaining to the date and time of placing the call are stored in the trunk recorder 148. Following the completion of the date and time information, a timing device individual to the adapter 146 is placed in operation to supply the trunk recorder 148 with information pertaining to the duration of the call.

When the call is released, the recording adapter 146 transmits an end-of-call signal to the trunk recorder 148 to indicate that all of the items of information pertaining to the call have been stored in the trunk recorder 148. Thereafter, and in response to termination of the connection, the extended switch train is released to restore the system to a normal condition.

When a toll call is to be extended from the calling substation C in the remote office 50 to a called substation F, for instance, in the remote office 60, the call is extended from the line circuit 136 through the local selector 142, the verifying adapter 144, and the two-way trunk circuits 122 and 120 to the recording adapter 146 in the local office 40 as described above. The calling subscriber thereupon dials the digits forming the designation of the calling substation C which operate the verifying adapter 144, the verifying connector 152, the recording adapter 146, and the trunk recorder 148 as described above in conjunction with the extension of the call to the called substation B. Following the completion of a satisfactory verification of the designation of the calling substation C, the recording adapter 146 repeats the next dialed digits representing the designation of the called substation F to the incoming selector 150. In response to the dialing of a digit such as "5," a pair of two-way trunk circuits 166 and 164 extending to the remote office 60 are seized by the selector 150 to permit the remainder of the dialed digits to operate the selector 176 and the connector 161 to extend the connection to the line circuit 163. Thereafter, the recording adapter 146, which stores the digits representing the designation of the called substation F in the trunk recorder 148, operates as described above to store date, time, and duration information in the trunk recorder 148 and, in response to release of the extended connection, to record an end-of-call signal in the trunk recorder 148.

When calls are to be extended from the substation C to the substation G in the remote office 70 provided with the manual equipment 134, the connection is extended through the line circuit 136, the line finder 140, the local selector 142, the verifying adapter 144, and the two-way trunk circuits 120 and 122 to the recording adapter 146. In order to extend the connection to the manual position in the remote office 70, the subscriber first dials the access digit "1" which operates the incoming selector 150 so that the two-way trunk circuit 132 is seized to extend the connection to the manual equipment 134. In response to answering of the call by an operator, answering supervisory signals are returned over the extended connection to the recording adapter 146 to cut through the circuit from the substation C to the manual position. As described above in conjunction with the extension of a call from the substation A to the called substation G, the extended switch train including the recording adapter 146, is released following the completion of the manually extended call so that only a single pulse followed by an end-of-call signal is recorded in the trunk recorder 148. This information is treated as pertaining to an incomplete call during a playback or readout operation and a record thereof is not provided.

The automatic toll ticketing system operates for calls placed from a calling substation E in the office 60 to called substations, such as D in the office 50, B in the office 40, and G in the manual office 70, in the same manner described above in conjunction with the extension of calls from the substation C by utilizing a line circuit 154, an allotter 156, a line finder 158, a local selector 160, a verifying adapter 162, a verifying connector 174, the trunk circuits 164 and 166, a recording adapter 168, a trunk recorder 170, and an incoming selector 172 so that the items of information pertaining to the toll calls are automatically collected and stored in the trunk recorder 170 for all of the toll calls which are to be automatically ticketed. However, the trunk recorder 170 does not record items of information pertaining to toll calls extended to the called substation G in the remote manual office 70. As in the case of the remote office 50, the verification of the calling designation "GR 5-3567" of the calling substation E in the remote office 50 is determined by the verification switch train including the verifying connector 174 in the remote office 60, although this information is stored in the trunk recorder 170 in the local office 40.

Thus, in the system of the present invention, although toll calls are initiated either in the remote offices 50 and 60 or in the local office 40, the items of information pertaining to the toll call are collected in storing devices in the local office 40, even though the verification or identification of the designation of the calling substation takes place in the remote offices 50 and 60 on calls placed from substations in these offices. Similarly, on calls extended to local or remote manual offices, such as the remote office 70, the call is extended through selected ones of the adapters 112, 144, 162, 146, and 168, but the items of information pertaining to these calls are not stored in the trunk recorders 114, 148, and 170.

When permanent records of the items of information stored in the trunk recorders 114, 148, and 170 are to be provided, recording facilities 180 comprising control circuits, registers, and recording means are placed in operation, preferably at a selected hour of the day. The facilities 180 place a playback control circuit 178 in operation to actuate a switching device 178a individual thereto to sequentially seize the adapters 112, 146, and 168 so that each of the trunk recorders 114, 148, and 170 is connected to the recording means. More specifically, when the switching means 178a is advanced into engagement with the contacts individual to the recording and verifying adapter 112, if the adapter 112 is in an idle condition, the playback control circuit 178 seizes the adapter 112 and associates the trunk recorder 114 with the recording facilities 180. The completion of this association or interconnection permits the items of information pertaining to each call to be transmitted to the recording facilities 180 to provide a permanent record of these items, together with other items such as the charge to be assessed for the call which is automatically determined by the computer forming a part of the recording facilities 180.

However, in the event that, upon movement of the switch 178a to the contacts individual to the adapter 112, this adapter is busy in being engaged in recording items of information pertaining to a toll call, time delay means in the adapter 112 and the playback control circuit 178 are operated to cause the playback control circuit 178 to wait for the termination of the busy condition in the adapter 112. If the adapter 112 is released at the completion of the storage of the necessary items of information pertaining to the call then in existence within the time delay interval provided by the playback control circuit 178, the adapter 112 immediately connects the trunk recorder 114 through the adapter 112 and the playback control circuit 178 to the recording facilities 180 so that the items of information pertaining to all of the calls stored in the trunk recorder 114 are played back. Alternatively, in the event that the busy condition in the adapter 112 is maintained beyond the predetermined delay interval provided by the playback control circuit 178, at the expiration of this delay interval, the playback control circuit 178 advances the switch 178a to seize the next idle adapter circuit. If the adapters 112, 146, and 168 are busy for a reason other than being engaged in storing data pertaining to a toll call, the switch 178a immediately steps by the busy adapter. In this manner, the switch 178a is advanced over the terminals individual to the adapters 112, 146, and 168 to sequentially seize each of the recorders 114, 148, and 170 and play back the items of information stored therein. Following the completion of the playback of all of the trunk recorders to which the switch 178a has access, the playback control circuit 178 and the recording facilities 180 are restored to a normal condition.

As set forth above, the recording facilities 180 and 178 are normally placed in daily operation at a selected time when the traffic on the system is at a relatively low level inasmuch as playing back the recorders 114, 148, and 170 renders them unavailable to store items of information pertaining to toll calls and thus reduces the traffic handling capacity of the system. However, in the event that one of these trunk recorders becomes filled with items of information prior to the time at which the normal readout or playback operation is initiated, the adapters 112, 146, and 168 include means for establishing an emergency start condition which renders the associated adapter circuit busy to prevent additional attempts to store data on the filled tape. The filled trunk recorder can then be played back by a manually initiated emergency playback operation.

TRUNK RECORDERS 114, 148, AND 170

The trunk recorders 114, 148, and 170 are of the type disclosed in the copending application of Howard S. Gleason, Serial No. 378,209, filed September 3, 1953, which application is assigned to the same assignee as the present application. For instance, the recorder 114 (FIG. 9) comprises a base plate on which is detachably mounted a magazine containing an endless loop of magnetic tape which is stored in random layer fashion. A portion of the magnetic tape, which is disposed outside of the magazine, is moved relative to a pair of transducing heads by one of a pair of driving means. The transducing heads comprise a record-reproduce space pulse head 910 and a record-reproduce mark pulse head 920 having two magnetic gaps which are disposed adjacent contiguous transversely spaced portions of the magnetic tape to define two separate channels for receiving mark and space pulse information. Another transducing head comprises an erase head 930 having a single gap which is adapted to erase the entire width or both channels of the magnetic tape.

During recording operations, the magnetic tape is stationary and the first advancing means comprises a step-by-step advancing mechanism including a pawl and ratchet drive arrangement driven by an advance magnet 900 for advancing the magnetic tape through a very small distance following the recording of each pulse in either of the mark and space pulse channels. In order to provide high speed playback or readout operations, a continuous drive mechanism is provided. This drive mechanism includes a clutch magnet or solenoid 940 which moves a clutching idler into a position interposed between a motor driven shaft and a pinch roller and capstan type of drive arrangement which directly drives the magnetic tape. In this manner, during playback operations, the magnetic tape in the trunk recorder 114 is rapidly advanced to produce mark and space impulses which are transmitted through the adapter circuits and the playback control circuit 178 to the recording facilities 180. A pair of contacts 941 in the energizing circuit for the magnet 900 is controlled by the clutch magnet 940 to prevent step-by-step operation of the magnetic tape during continuous drive operations.

In order to provide means for returning the magnetic tape in the trunk recorder 114 to its effective beginning or home position prior to recording and reproducing operations and further to provide an alarm indication when the magnetic tape in the trunk recorder 114 is filled with items of information, a pair of tape controlled contacts 950 is provided which cooperates with three spaced perforations or conductive portions on the surface of the magnetic tape so as to define the effective beginning or end thereof. As disclosed in the above identified Gleason application, the tape contact structure may comprise conductive portions carried on the surface of the tape which electrically bridge contact fingers held in engagement with one surface of the magnetic tape. Alternatively, the tape contact arrangement may comprise a grounded roller and a contact brush between which the magnetic tape is interposed so that the brush and roller arrangement senses spaced perforations in the tape.

The trunk recorder 148 (FIG. 26) is identical to the trunk recorder 114 described above and includes an advance magnet 2600, a record-reproduce space pulse head 2610, a record-reproduce mark pulse head 2620, an erase head 2630, a clutch magnet 2640 controlling a pair of contacts 2641, and a pair of tape controlled contacts 2650. The trunk recorder 170, the details of which are not disclosed in the present application, is identical to the trunk recorders 114 and 148.

RECORDING AND VERIFYING ADAPTER 112

The adapter 112 (FIGS. 2 to 14, inclusive) in the local office 40 controls the recording of items of information in the trunk recorder 114, which are provided under the control of dialed digits, by the clock-calendar circuit 130, and by the duration timer in the adapter 112. In addition to controlling the recording of the data pertaining to the toll calls in the trunk recorder 114, the recording and verifying adapter 112 operates in conjunction with a verifying connector, such as the connector 118, to determine the accuracy of the digits dialed as a representation of the designation of the calling substation and further includes a stepping switch which programs the recording of the information in the trunk recorder 114, controls the recording of a signal representing the end of a call on the magnetic tape of the trunk recorder 114, and counts variable numbers of digits representing the designations of the calling and called subscribers to prevent further operation of the automatic toll ticketing system in the event that improper digital information is supplied to the adapter 112. During playback operations, the adapter 112 is operated under the control of the playback control circuit 178 to supply the items of information stored in the trunk recorder 114 to the recording facilities 180 and further includes means for establishing an emergency start condition when the magnetic tape in the trunk recorder 114 becomes filled with items of information.

*Operation of the Adapter 112 to Record Data in the Trunk Recorder 114 Pertaining to a Toll Call*

As described above, in response to the dialing of an access digit, the local selector 106 actuates a switching means 106a individual thereto so that the wipers of the switch 106a search over the terminals in the contact level selected by the dialed access digit to search for and seize an idle adapter, such as the adapter 112. In the event that the adapter 112 is idle, the calling loop circuit is completed through a plurality of pairs of normally closed contacts 432 and 341 to the upper winding of a calling bridge relay 420 and through a pair of normally closed contacts 435 to the lower operating winding of the calling bridge relay 420, thereby operating this relay to seize the adapter 112. The operation of the calling bridge relay 420 opens a pair of contacts 422 and closes a pair of contacts 421. The closure of the contacts 421 completes an obvious operating circuit for a slow-to-release release delay relay 370 which in operating closes a plurality of contacts 372, 373, 374, 1041, and 1043 and opens a plurality of contacts 371 and 1042.

The closure of the contacts 372 applies ground to the incoming sleeve lead of the adapter 112 through a pair of normally closed contacts 501 and the upper winding of a busy relay 520 in parallel to provide holding ground for the actuated switch train and to provide busy ground for preventing subsequent seizure of the adapter 112. The closure of the contacts 373 connects the operating winding of a supervisory relay 450 with the HS lead of the local selector 116 through a pair of normally closed contacts 524 to prepare an operating circuit for this relay. The closure of the contacts 1043 connects the interrupter springs 1402 of a stepping switch 1400 with a wiper 1410 of this switch. The closure of the contacts 1041 provides a source of main holding ground for the adapter 112 and also completes an obvious operating circuit for a second release delay relay 1100 which operates to close a plurality of contacts 441, 442, 445, and 1101 and to open a plurality of contacts 443, 444, 446, and 1102.

The closure of the contacts 441 and 442 connects the outgoing tip and ring conductors of the adapter 112 to each other through a circuit including a plurality of normally closed contacts 433, 521, 411, and 763, a wiper 701 of the stepping switch 1400, and an additional plurality of normally closed contacts 523 and 537. The completion of this circuit prepares a pulsing or digit repeating circuit for the local selector 116 controlled by the contacts 411. The closure of the contacts 1101 prepares an energizing circuit for a timer motor 1050 forming a portion of the duration timing mechanism individual to the adapter 112.

The first item of information dialed at the calling substation A in extending a remote connection, such as one to the remote substation C in the office 50, is the first one of three office code digits "747" representing the office designation "SH 7" of the calling substation A. These digits are checked by the adapter 112 to determine whether or not they correspond to the digits assigned to the calling substation A, and, in the event that these three digits are correct, the adapter circuit 112 prepares paths for operating the verification connector 118 under the control of the following digits representing the station designation of the calling substation A. More specifically, incident to dialing the first office code digit "7," the calling loop circuit is interrupted so the calling bridge relay 420 releases to close the contacts 422. The closure of the contacts 422 completes an operating circuit for a first pulsing relay 400 which extends from the closed and grounded contacts 422 through the closed contacts 422 and through the closed contacts 374 and 525 to a wiper 703 of the stepping switch 1400 which, in the normal home position of the switch, engages a contact which is connected through a pair of normally closed contacts 414 to the operating winding of the relay 400. The operation of the relay 400 closes a pair of contacts 401 to prepare an operating circuit for a second pulsing relay 410. At the end of the first line break in the group of seven such breaks representing the dialed digit "7", the calling bridge relay 420 again operates to open the contacts 422 so that ground is removed from the winding of the first pulsing relay 400. However, this relay remains operated over a series circuit including the closed contacts 401, the lower winding of the relay 410, a pair of normally closed contacts 412, and the winding of the relay 400. The completion of this circuit, in addition to holding the relay 400 operated, energizes the lower operating winding of the relay 410 so that this relay operates to open a plurality of contacts 411, 412, 414, and 415 and to close a plurality of contacts 413, 416, and 417.

The opening of the contacts 411 disconnects the tip and ring conductors extending to the local ticketing selector 1116. The closure of the contacts 417 completes an operating circuit for a first mark relay 570 extending from the closed and grounded contacts 417 through a plurality of normally closed contacts 382 and 632. The operation of this relay closes a plurality of contacts 571 and 572. The closure of the contacts 572 extends ground from a pair of normally closed and grounded contacts 602 to the home contact in the bank of contacts engaged by a wiper 705 of the stepping switch 1400. This ground is further extended by the wiper 705 through a pair of normally closed contacts 205 to energize the winding of the mark head 920. The closure of the contacts 571 completes an obvious energizing circuit for a second mark relay 600 so that this relay operates to close a pair of contacts 601 and to open the contacts 602. Opening the contacts 602 interrupts the energization of the mark head 920 so that a single mark pulse is recorded on the magnetic tape in the trunk recorder 114 representing the first pulse in the group of seven pulses forming the dialed office code digit "7." The closure of the contacts 601 applies ground to the operating winding of the step drive magnet 900 which is connected to grounded battery at the normally closed contacts 941, thereby energizing the magnet 900.

In addition to recording the first mark pulse on the magnetic tape in the trunk recorder 114, the closure of the contacts 417 completes an obvious operating circuit for a slow-to-release shunt relay 470 which operates to close a plurality of contacts 471, 1132, and 1133 and to open a plurality of contacts 472 and 1131. The closure of the contacts 1133 completes an operating circuit for a motor magnet 1401 of the stepping switch 1400, but since this switch is indirect acting, the switch is not advanced at this time. The closure of the contacts 1132 completes an obvious operating circuit for a slow-to-release pulse generator relay 1120 which in operating closes a plurality of contacts 461, 462, 1121, 1122, 1124, and 1126 and opens a plurality of contacts 1123 and 1125.

Referring back to the above described operation of the second pulsing relay 410, the opening of the contacts 412 interrupts the above described holding circuit for the first pulsing relay 400, but this relay is somewhat slow-to-release and does not release at this time. The closure of the contacts 413 completes a holding circuit extending through both of the windings of the second pulsing relay 410 to ground at the closed contacts 401. The opening of the contacts 414 prevents reoperation of the first pulsing relay 400 until such time as the relay 410 is released. After a short time delay, the first pulsing relay 400 releases to open the contacts 401 and thus interrupts the above described holding circuit for the second pulsing relay 410 so that this relay releases to restore contacts controlled thereby to their normal position. The opening of the contacts 417 does not release the shunt relay 470 inasmuch as this relay is slow-to-release. However, the opening of the contacts 417 interrupts the above described operating circuit for the mark relay 570 so that this relay releases to open the contacts 572 and 571. The opening of the contacts 571 releases the second mark relay 600 so that the contacts 601 are opened to remove ground from the magnet 900. The removal of energization from the magnet 900 permits the step-by-step advance mechanism in the trunk recorder 114 to advance the magnetic tape therein a single step following the above described recording of the first mark pulse thereon. The release of the second pulsing relay 410, in closing the contacts 415, initiates the operation of a counting circuit in the adapter 112 which establishes a marking condition representing the value of the first dialed office code digit.

More specifically, the closure of the contacts 415 completes a circuit for energizing a first counting relay 530. This circuit extends from either of the pair of closed and grounded contacts 461 and 471 through a pair of normally closed contacts 503, the contacts 415, a wiper 704 which is in engagement with the home position contact in the bank associated therewith, and a plurality of normally closed contacts 561, 551, and 541. Completion of this circuit operates the first counting relay 530 to close a plurality of contacts 531 and 533 and to open a plurality of contacts 532 and 1231. The closure of the contacts 531 prepares a holding circuit for the first counting relay 530 and an operating circuit for a second counting relay 540. The opening of the contacts 1231 establishes a marking condition in a contact field controlled by the counting means representing a dialed digit "1."

When the second line break representing the second pulse in the dialed first called office code digit "7" releases the calling bridge relay 420, the first and second pulsing relays 400 and 410 are again sequentially operated to momentarily energize the mark pulse head 920 to record a second mark pulse on the magnetic tape in the trunk recorder 114 and to again operate the magnet 900. In operating, the second pulsing relay 410 further actuates the make-before-break contact arrangement involving the contacts 415 and 416 so that the contacts 416 are first closed to connect ground to the circuit including the winding of the relay 530 and the lower operating winding of the relay 540 in series. The contacts 415 are thereafter opened to interrupt the above described operating circuit for the relay 530, but this relay does not release inasmuch as holding ground is provided for this relay through the lower winding of the second counting relay 540. The removal of the ground shunt around the two sides of the lower winding of the second counting relay 540 due to opening the contacts 415 permits this relay to operate in series with the first counting relay 530 so that a plurality of contacts 542, 543, and 545 are closed and a plurality of contacts 541, 544, and 1241 are opened. The closure of the contacts 542 prepares a holding circuit for the upper winding of the second counting relay 540, and the closure of the contacts 543 prepares an operating circuit for a third counting relay 550. The opening of the contacts 541 established a marking condition in the contact field controlled by the counting relays representing a dialed digit "2."

When the second pulsing relay 410 next releases as described above, the contacts 415 are first closed to apply ground through the closed contacts 561, 551, and 542 to the upper operating winding of the second counting relay 540 so as to maintain this relay operated. The subsequent opening of the contacts 416 interrupts the above described operating path for the second counting relay 540 and the holding path for the first counting relay 530 so that the relay 530 releases to return the contacts controlled thereby to a normal condition. The closure of the contacts 532 together with the prior closure of the contacts 543 completes the preparation of a holding path for the relay 540 and an operating path for the third counting relay 550. The closure of the contacts 1231 removes the marking condition from the contact field controlled by the counting relays representing the dialed digit "1" so that only the condition representing the dialed digit "2" provided by the open contacts 541 remains. Further, the release of the relays 400 and 410 terminates the energization of the mark relays 570 and 600 so that energization is removed from the drive magnet 900 to advance the magnetic tape a single step following the recording of the second mark pulse thereon.

When the calling bridge relay 420 is next operated and released in response to the third line break representing the third pulse in the dialed digit "7," the pulsing relays 400 and 410 are again sequentially operated to momentarily energize the head 920 to record a third mark pulse on the tape and to energize the drive magnet 900. Further, the contacts 416 are first closed to extend ground through the closed contacts 532 and 543 to the series connected upper operating winding of the relay 540 and lower operating winding of the relay 550. Thereafter, the contacts 415 are opened to remove the ground shunt around the lower operating winding of the third counting relay 550 so that this relay operates to close a plurality of contacts 552, 553, 554, and 555 and to open the contacts 551 as well as a pair of contacts 1251. The closure of the contacts 552 prepares a holding path for the third counting relay 550, and the closure of the contacts 554 prepares a holding path for the third counting relay 550 and an operating path for a fourth counting relay 560. The opening of the contacts 1251 provides a marking condition in the contact field controlled by the counting relays representing a dialed digit "3."

The closure of contacts 553 completes a preliminary operating path for a five relay 640 extending from the closed and grounded contacts 461 or 471 through the closed contacts 553 and a pair of normally closed contacts 643 to the lower operating winding of the five relay 640. The completion of this preliminary operating circuit closes a pair of preliminary make type contacts 644 which connects the upper and lower windings of the five relay 640 to the closed contacts 461 and 471. However, due to the ground shunt around the upper operating winding provided by the closed contacts 553, the five relay 640 does not fully operate at this time.

When the pulsing relays 400 and 410 are sequentially released as described above, the drive magnet 900 is released to permit the step-by-step tape advancing mechanism to advance the magnetic tape in the trunk recorder 114 a single step following the recording of the third mark pulse therein. Further, in first closing the contacts 415, a circuit is completed for extending ground through the closed contacts 562 and 552 to maintain the upper winding of the third counting relay 550 energized. The subsequent opening of the contacts 416 removes ground from the path extending to the lower winding of the relay 550 and the upper winding of the relay 540 so that the second counting relay 540 releases to restore the contacts controlled thereby to a normal condition. The closure of the contacts 544 completes the preparation of a holding circuit for the relay 550 and an operating circuit for the relay 560. The closure of the contacts 1241 removes the marking condition from the contact field representing a dialed digit "3" so that only the marking condition provided by the open contacts 1251 representing a dialed digit "3" remains at this time.

The calling bridge relay 420 is next operated and released in response to the line break representing the fourth pulse in the dialed digit "7" and causes the sequential operation of the first and second pulsing relays 400 and 410 as described above so that a fourth mark pulse is recorded on the magnetic tape in the trunk recorder 114 and the drive magnet 900 is again energized. The closure of the contacts 416 incident to this operation of the second counting relay 410 completes the above described holding and operating circuits for the relays 550 and 560 so that, when the contacts 415 are opened to remove the ground shunt around the lower operating winding of the fourth counting relay 560, this relay operates in series with the upper operating winding of the third counting relay 560 to close a plurality of contacts 562, 563, and 564, and to open the contacts 561 and a pair of contacts 1261. The closure of the contacts 562 prepares a holding circuit for the upper winding of the fourth counting relay 560, and the closure of the contacts 563 provides an additional source of shunting ground for the five relay 640. The opening of the contacts 1261 establishes a marking condition representing a dialed digit "4."

When the pulsing relays 400 and 410 release as described above, the energization of the drive magnet 900 is terminated to advance the magnetic tape in the trunk recorder 114 a single step following the recording of the fourth mark pulse thereon, and the closure of the contacts 415 completes a holding circuit extending to the upper operating winding of the fourth counting relay 560 so as to maintain this relay operated. The subsequent opening of the contacts 416 removes ground from the series circuit including the upper winding of the third counting relay 550 and the lower winding of the fourth counting relay 560 so that the third counting relay 550 releases to restore the contacts controlled thereby to their normal condition. The closure of the contacts 1251 removes the marking condition representing a dialed digit "3" and the opening of the contacts 553 removes one ground shunt from the windings of the five relay 640, but an additional shunt is provided therefor through the closed contacts 563.

When the calling bridge relay 420 is next operated and released in response to the fifth line break representing the fifth pulse in the dialed digit "7," the pulsing relays 400 and 410 are again sequentially operated to record a fifth mark pulse on the magnetic tape in the trunk recorder 114 by momentarily energizing the mark pulse head 920 and to energize the drive magnet 900. The closure of the contacts 416 performs no useful function at this time, but the subsequent opening of the contacts 415 interrupts the above described holding circuit for the fourth counting relay 560 so that this relay releases to restore the contacts controlled thereby to their normal condition. The closure of the contacts 1261 removes the marking condition representing a dialed digit "4," and the closure of the contacts 561 prepares the above described operating circuit for the first counting relay 530.

The opening of the contacts 563 removes the ground shunt from the five relay 640 so that this relay operates fully to close a plurality of contacts 641, 642, 1311, 1314, 1315, 1318, 1319, and 1313a and to open a plurality of contacts 643, 1312, 1313, 1316, 1317, 1311a, and 1312a.

The opening of the contacts 643 interrupts the above described preliminary operating circuit for the five relay 640 at an additional point, and the closure of the contacts 642 prepares an operating circuit for a nine relay 650. The operation of the contacts 1311 to 1313a converts the marking conditions represented by the selective operation of one of the counting relays 530, 540, 550, or 560 from a digital significance less than "5" to one greater than "5" so as to permit these counting relays to establish marking conditions representing dialed digits having a value of "5" or over.

The closure of the contacts 641 completes an obvious operating circuit for a five assist relay 660 which operates to close a plurality of contacts 661, 663, 665, 667, 661a, 663a, 1331, 1333, 1336, and 1338 and to open a plurality of contacts 662, 664, 666, 668, 669, 662a, 1332, 1334, 1335, and 1337. The operation of the contacts 661—663a serves no useful function at this time, as is also true with respect to the contacts 1331—1334. However, the operation of the contacts 1335 to 1338 completes the conversion of the marking paths controlled by the counting relays 530, 540, 550, and 560 from those representing digits "1" to "4," inclusive, to those representing digits "5" to "8," inclusive.

When the pulsing relays 400 and 410 release as described above, the mark relays 570 and 600 are again released to terminate the energization of the drive magnet 900 so that the magnetic tape in the trunk recorder 114 is advanced a single step following the recording of the fifth mark pulse thereon. Further, the closure of the contacts 415 completes the above described operating circuit for the first counting relay 530 so that this relay operates to close the contacts 531 and 533 and to open the contacts 532 and 1231. The closure of the contacts 531 again prepares a holding path for the relay 530 and an operating path for the second counting relay 540. The opening of the contacts 1231, in view of the prior operation of the five relay 640 and the five assist relay 660, establishes a marking condition in the contact field controlled by the relays representing a dialed digit "5" rather than a dialed digit "1." Accordingly, at the end of the pulsing of the first five pulses of the seven pulses representing the first dialed calling office code digit "7," five mark pulses have been recorded on the magnetic tape in the trunk recorder 114 and a marking condition has been established in the contact field controlled by the counting relays representing the dialed digit "5."

The remaining two pulses sequentially operate and release the first and second pulsing relays 400 and 410 so that two additional mark pulses are recorded by the head 920 on the magnetic tape in the trunk recorder 114, thereby representing the first dialed calling office code digit "7." These two pulses also actuate the counting chain including the relays 530, 540, and 550 so that, following the release of the second pulsing relay 410 at the end of the seventh pulse, the third counting relay 550 and the five relay 640 are operated with the third counting relay 550 being maintained operated over a holding circuit including the closed contacts 552 and 561. With the counting relay chain in this condition, only the contacts 1251 are open to provide a marking condition representing the dialed digit "7." As described above, with the five relay 640 released, the open contacts 1251 represent a dialed digit "3." This marking condition is utilized in the interdigit interval separating the first dialed calling office code digit from the second dialed calling office code digit to determine the accuracy of the first digit dialed at the calling substation A as an identification of this substation.

More specifically, in the interdigit interval, the slow-to-release shunt relay 470 releases to restore the contacts controlled thereby to their normal condition. The opening of the contacts 471 interrupts one source of holding ground for the upper winding of the third counting relay 550, but this relay remains operated over the ground provided at the closed contacts 461. The closure of the contacts 472 completes an operating circuit for a space relay 610 to initiate the recording of a space pulse on the magnetic tape in the trunk recorder 114 to separate the group of recorded pulses representing the first dialed calling office code digit from subsequently recorded information. More specifically, the closure of the contacts 472 extends ground from the closed and grounded contacts 1041 through the contacts 462 and 472 to the operating winding of the space relay 610, thereby operating this relay to close a plurality of contacts 611 and 612. The closure of the contacts 612 extends ground from a pair of normally closed and grounded contacts 622 through a wiper 706 and a pair of normally closed contacts 973 to the space pulse head 910, thereby energizing this head to record a space pulse on the magnetic tape. The closure of the contacts 611 completes an obvious operating circuit for a second space pulse relay 620 so that this relay operates to close a pair of contacts 621 and to open the contacts 622. Opening the contacts 622 terminates the energization of the space pulse head 910 to complete the recording of the space pulse. The closure of the contacts 621 again applies ground to the operating winding of the advance magnet 900, thereby to condition the drive mechanism in the trunk recorder 114 for advancing the magnetic tape a single step.

Referring back to the preceding release of the shunt relay 470, the closure of the contacts 1131 prepares a path for interconnecting the lower operating winding of a slow-to-operate busy relay 520 through the closed contacts 1122 and 1131 to the contact field controlled by the relays 530, 540, 550, 560, 640, and 660 so that, if the first calling office code digit dialed at the substation A does not correspond to the digit assigned to the substation in the local office 40, the busy relay 520 is operated. Alternatively, if the digit has correctly been dialed, the busy relay 520 is not operated and the recording of additional digits can be initiated.

To permit the adapter 112 to be conditioned for operation with calling and called offices having variable numbers of digits in their designations and having different combinations of digits forming the calling office code designation, the contact banks engaged by a group of wipers 1440, 1420, and 1410 are provided. These levels of the stepping switch 1400, together with the control circuitry associated therewith, adapt the stepping switch 1400 to count different preselected numbers of digits in both the calling and called station designations to insure that a proper number of digits have been dialed, and these levels include further means for advancing the stepping switch over certain positions when the calling or called station designation includes a lesser number of digits than the maximum for which the adapter 112 can be conditioned for operation. These levels of the stepping switch also provide means for sequentially checking, in conjunction with the counting relays, three or less digits identifying the office code of the calling substation and for programming certain operations of the adapter 112, such as the initiation of the operation of the verification connector 118, the recording of clock calendar information, the recording of duration information, and the recording of an end-of-call signal following completion of the storage of all of the items of information pertaining to a toll call.

More specifically, to condition the adapter 112 for operation in the local office 40 in which the calling substation A includes a seven digit designation having three office code digits, a plurality of terminals 1456, 1455, and 1454 are connected with the numerical leads shown in FIG. 14 which extend to the marking paths controlled by the counting relay circuit in according with the values of the digits of the office code designation of the calling substation A. For instance, if the first office code digit is "7," the terminal 1456 is connected to the "7" designated lead, the terminal 1455 representing the second calling office code digit is connected to the "4" designated lead, and the terminal 1454 representing the third calling office code digit is also connected to the "7" designated conductor. To provide a means for initiating operation of the first choice verification connector 118 following the checking of the three office code digits in a seven digit office, a lead 1461 connected to a terminal in the contact bank engaged by the wiper 1440 representing the fourth dialed digit or the functional hundreds digit of the designation of the calling subscriber in a seven digit office is connected to a terminal 1465 to provide a path for seizing the verification connector 118. In the event that the first choice connector 118 is busy or otherwise unavailable, a terminal 1453, which is connected to the fourth contact in the bank engaged by the wiper 1410, is connected to a conductor 1478 to provide an operating circuit for a second choice relay 1340, the operation of which conditions a circuit for seizing a second choice verification connector such as a connector 740. Since the stepping switch 1400 is wired to provide for a maximum number of seven calling station digits, a terminal 1451 is connected to all of a plurality of terminals 1471, 1472, and 1473 which are utilized for automatically advancing the stepping switch 1400 over certain of the contact positions which are not utilized when the designation of the calling substation includes a smaller number of digits than seven.

To condition the adapter 112 for operation with a calling substation designation including only six digits, the terminals 1456 and 1455 are connected to the numerically designated conductors shown in FIG. 14 in accordance with the values of the first and second digits, respectively, of the office code. Further, a lead 1462, which is connected to the third contact in the contacts engaged by the wiper 1440, is strapped to the terminal 1465 to condition the adapter 112 for seizing the verification connector 118 following the dialing of three digits, and the terminal 1454, which is connected to the third contact in the bank engaged by the wiper 1410, is strapped to the conductor 1478 to provide a means for operating the second choice relay 1340 in the event that the first choice connector 118 is not available. For advancing the stepping switch 1400 over the unused contacts due to only six digits in the calling station designation, a terminal 1452 is strapped to the terminal 1471 and the terminals 1472 and 1473 remain connected to the terminal 1451.

To condition the adapter 112 for operation in a five digit office, the terminal 1456 is connected to one of the numerically designated conductors shown in FIG. 14 in accordance with the single office digit, and a conductor 1463 connected to the second contact in the bank engaged by the wiper 1440 is strapped to the terminal 1465 to provide a means for conditioning the connector 118 for seizure following the dialing of two digits. The terminal 1455 is connected to the conductor 1478 to condition a circuit for operating the second choice relay 1340 following the dialing of the second digit. The terminals 1472 and 1473 are connected to the terminal 1452 to provide a circuit for advancing the stepping switch 1400 over the two idle positions due to only five digits in the calling substation designation, and the terminal 1473 remains connected to the terminal 1451 when the adapter 112 is conditioned for operation with a five digit office.

To condition the adapter 112 for use with a calling office having a four digit substation designation wherein no office code digits are provided, the terminal 1456, which is connected to the first contact in the bank engaged by the wiper 1410, is connected to the conductor 1478, and the conductor 1464 which is connected to the first contact in the bank engaged by the wiper 1440, is strapped to the terminal 1465 so that the paths for operating the second choice relay 1340 and for seizing the first choice connector 118 are prepared following the dialing of only a single digit. Since three of the stepping positions in the switch 1400 are not utilized when the calling line designation includes only four digits, all of the terminals 1471, 1472, and 1473 are connected to the terminal 1452 to provide a means for atuomatically advancing the switch 1400 over the idle positions.

Referring now to the above described release of the shunt relay 470, the opening of the contacts 1133 terminates the energization of the motor magnet 1401 so that this magnet releases to close the interrupter springs 1402 and to advance the plurality of wipers 701, 702, 703, 704, 705, 706, 1440, 1430, 1420, and 1410 into engagement with the first contacts in the contact banks associated therewith, which contacts are illustrated in FIGS. 7 and 14 of the drawings as being at the extreme right hand end of the lines of contacts. Further, in moving off-normal, a pair of off-normal springs 713 are opened and a plurality of off-normal springs 711 and 712 are closed. The closure of the contacts 711 provides an additional source of busy ground for the incoming sleeve conductor of the adapter 112, which ground is interruped at the open contacts 443. The closure of the contacts 712 provides a source of ground for indicating to the playback control circuit 178 that the adapter 112 is in a busy condition.

The movement of the wiper 703 into engagement with the first contact in the bank associated therewith maintains the operating path for the pulsing relays 400 and 410 complete, and the movement of the wiper 704 into engagement with its first contact maintains the circuit complete for pulsing the counting circuit including the relays 530, 540, 550, and 560. The movement of the wipers 705 and 706 into engagement with their first contacts maintains complete the above described circuits for supplying pulses to the mark head 920 and the space head 910, respectively. The movement of the wiper 1440 into engagement with its first contact produces no useful function inasmuch as the conductor 1464 is not strapped to the terminal 1465 since the local office 40 is a seven digit office. The movements of the wipers 1430 and 1420 produce no useful function, but the movement of the wiper 1410 into engagement with its first contact representing the first calling office code digit initiates the test to determine whether or not this first office code digit was correctly dialed at the calling substation A.

More specifically, the release of the motor magnet 1401 closes the interrupter springs 1402 so that ground is extended through the closed contacts 1043 to the wiper 1410 which is in engagement with the first contact in the bank associated therewith. This contact is connected to the terminal 1456 which is strapped to the "7" designated conductor on FIG. 14 inasmuch as the correct value of the first called office code digit is "7" representing the alphabetical character "S." Therefore, this ground is extended over the "7" designated conductor through the contacts 1318 which were closed by operation of the five relay 640 to the contacts 1251. These contacts are now open inasmuch as both the third counting relay 550 and the five relay 640 have been operated in accordance with the dialed digit "7." Inasmuch as the contacts 1251 are open at this time, the ground provided on the wiper 1410 is not further extended, and thus the adapter circuit 112 is conditioned for additional operation.

However, assuming that an incorrect digit such as the digit "6" had been dialed as the first office code digit of the designation of the calling substation A, the contacts 1241 would be open at this time, and the contacts 1251 would be closed. Accordingly, the ground provided on the wiper 1410 would be further extended through the closed contacts 1131 and 1122 to the lower operating winding of the busy relay 520, thereby operating this relay to first close a pair of preliminary make contacts 1222 and then to close a pair of contacts 522 and to open a plurality of contacts 521, 523, 524, 525, 1221, and 1223. The preliminary closure of the contacts 1222 interconnects the lower operating winding of the busy relay 520 with the source of main holding ground provided at the closed contacts 1041 controlled by the release delay relay 370, thereby to maintain the busy relay 520 operated until such time as the connection is released.

The closure of the contacts 522 extends busy tone from a terminal 590 through a coupling condenser 591 to the tip conductor of the extended switch train, thereby to advise the calling subscriber the toll call cannot be completed. The concurrent opening of the contacts 521 interrupts the above described circuit extending to the local ticketing selector 116 to prevent dialed digits from being repeated to this selector, the opening of the contacts 523 further interrupting this circuit at an additional point. The opening of the contacts 524 interrupts an additional point in an operating circuit for a supervisory relay 450 to prevent operation thereof, and the opening of the contacts 525 interrupts the above described circuit extending to the wiper 703 for causing sequential operation of the pulsing relays 400 and 410. The opening of the contacts 1221 removes ground from the wiper 1440 to disable the control functions performed by this level of the stepping switch 1400, and the opening of the contacts 1223 prevents operation of a switch relay 1210. Accordingly, in the event that the first calling office code digit does not correspond to the digit in the office code designation of the calling substation A, the adapter 112 is prevented from being utilized in recording additional items of information and in further extending the toll connection. Upon release of the connection due to this busy condition, the adapter 112 records a COE or end-of-call signal on the magnetic tape in the trunk recorder 114 and restores the adapter 112 to a normal condition as described in detail hereinbelow.

However, assuming that the first called office code digit is correctly dialed, the opening of the contacts 1132 in response to release of the shunt relay 470 opens the operating circuit for the slow-to-release pulse generator relay 1120 so that, after a time delay, this relay releases to restore the contacts controlled thereby to their normal condition. Opening the contacts 462 opens the operating circuit for the space relay 610 so that this relay and the relay 620 release to terminate the energization of the magnet 900 so as to advance the tape in the trunk recorder 114 a single step following the space pulse. Opening the contacts 461 removes the source of holding ground from the operated third counting relay 550, the five relay 640, and the five assist relay 660 so that these relays release. The release of these relays merely aids in restoring the adapter circuit 112 to a normal condition and, more specifically, the release of these three relays removes the marking condition representing the dialed digit "7" from the contact field controlled thereby.

The next item dialed is the second calling office code digit "4" representing the alphabetical character "H." The first line break releases the calling bridge relay 420 to cause the sequential operation and release of the pulsing relays 400 and 410 and to further cause the sequential operation of the shunt relay 470 and the pulse generator relay 1120. The operation of the shunt relay in closing the contacts 1133 again energizes the motor magnet 1401, but the stepping switch 1400, as described above, is not advanced at this time. Thereafter, the pulsing relays 400 and 410 are sequentially operated and released three additional times in response to the remaining three line breaks so that four spaced mark pulses are stored on the magnetic tape in the trunk recorder 114. Further, concurrently with recording these four pulses, the counting relay chain including the first, second, third, and fourth counting relays 530, 540, 550, and 560 is sequentially operated so that at the end of the fourth line break, the fourth counting relay 560 is fully operated and the five relay 640 is partially operated. In operating, the fourth counting relay 560 opens the contacts 1261 to provide a marking condition in the contact field representing a dialed digit "4."

In the interdigit interval following the dialing of the second calling office code digit "4," the shunt relay 470 releases, as described above, to close the contacts 472, thereby to again complete the operating circuit for the space relay 610 so that this relay and the second space relay 620 operate to momentarily energize the space head 910 to record a space pulse on the magnetic tape in the trunk recorder 114 immediately following the group of four pulses representing the second calling office code digit. The sequential operation of these two relays also energizes the drive magnet 900 to condition the magnetic tape for being advanced a single step. Further, releasing the shunt relay 470 closes the contacts 1131 to prepare the above described path extending to the busy relay 520, thereby to provide a means for determining whether the second dialed digit is correct. The opening of the contacts 1132 interrupts the operating circuit for the slow-to-release pulse generator relay 1120, but this relay remains operated. The opening of the contacts 1133 interrupts the above described operating circuit for the motor magnet 1401 so that his magnet releases to close the interrupter spring 1402 and to advance the plurality of wipers 701 to 706 and 1410, 1420, 1430, and 1440 into engagement with the second contacts in the banks associated therewith.

Since the dialed digits representing the designation of the calling substation A are not to be repeated to the local ticketing selector 116, movement of the wiper 701 into engagement with the contact in its second position completes a circuit extending from the outgoing ring conductor through the closed contacts 442, 437, and 523, the wiper 701, the engaged second contact in the bank associated with the wiper 701, the contacts 521, 433, and 441 to the outgoing tip conductor. Completion of this circuit connecting the outgoing tip and ring conductors extending to the local ticketing selector 116 prevents operation of the contacts 411 under the control of the second pulsing relay 410 from repeating pulses to the local ticketing selector 116. As described below in detail in conjunction with the description of the operation of the adapter 112 on calls placed to the manual office 70, the adapter 112 includes means in the home and first positions of the switch 1400 for repeating only a single pulse to the selector 116 for obtaining access to the manual equipment 134.

In its second stepping position, the wiper 703 maintains the above described paths for operating the pulsing relays 400 and 410 and, in its second stepping position, the wiper 704 maintains the above described paths for operating the counting relay chain under the control of the pulsing relays 400 and 410. In their second stepping positions, the wipers 705 and 706 maintain the above described paths for transmitting mark and space pulse information to the trunk recorder 114. Movement of the wipers 702 and 1430 produces no useful function. In a similar manner, movement of the wiper 1440 into engagement with the contact in its second stepping position performs no useful function inasmuch as the conductor 1463 is not connected to the terminal 1465. However, in the event that the designation of the called office includes only five digits, movement of the wiper 1440 into engagement with the contact in its second stepping position completes a circuit for attempting seizure of the first choice verification connector 118. In a similar manner, movement of the wiper 1420 into engagement with its second contact performs no useful function unless the calling office designation includes only four digits so that the terminal 1473 is connected to the terminal 1452 to cause the switch 1400 to self interrupt to the next position. Further, if the connection is prematurely released at this time so that the second release delay relay 1100 is also released to close the contacts 1102, among others, the ground provided on the wiper 1420 is extended over the terminal 1451 to the operating winding of the motor magnet 1401 to advance the stepping switch 1400 a single step. Similar circuits are completed utilizing the wiper 1420 in each of the succeeding positions of the stepping switch 1400, thereby to restore this switch to its normal position incident to premature release of the connection.

However, when the wiper 1410 moves to its second stepping position, ground is applied from the closed contacts 1402 over the wiper 1410 to the terminal 1455. As described above, this terminal is connected to the "4" designated conductor in FIG. 14 so that this ground is extended through the closed contacts 1311a to the contacts 1261. If these contacts are closed, thus representing the dialing of a second calling office code digit other than "4," the busy relay 520 is operated to prevent recording of further information and further completion of the connection. However, as described above, the contacts 1261 are open at this time to prevent the operation of the busy relay 520.

Following the completion of the second calling office code digit test, the pulse generator relay 1120 releases to restore the contacts controlled thereby to their normal condition. The opening of the contacts 461 releases the fully operated fourth counting relay 560 and the partially operated five relay 640. The opening of the contacts 462 releases the space relays 610 and 620 so that the magnetic tape in the trunk recorder 114 is advanced a single step due to the release of the magnet 900. Accordingly, in response to the completion of the dialing of the second calling office code digit, a second group of mark pulses, four in number, are recorded on the magnetic tape following the group of seven digits representing the first calling office code digit, and this second group of mark pulses is separated from the items of information which are subsequently to be recorded by a single space pulse.

The next item of information which is dialed is the third calling office code digit "7" which operates the adapter circuit 112 as described in detail above to record seven mark pulses on the magnetic tape in the trunk recorder 114 followed by a space pulse and to operate the third counting relay 550, the five relay 640, and the five assist relay 660 so as to provide a marking condition representing the dialed digit "7." Incident to the release of the shunt relay 470 and the pulse generator relay 1120, the motor magnet 1401 is released to advance the stepping switch 1400 to its third stepping position, and a test is performed to determine the correctness of the third dialed calling office code digit. In moving to the third stepping position, the wipers of the stepping switch 1400 perform the same functions as described above with the exception of the wipers 1440, 1410, and 1420. The wiper 1440 applies ground to the conductor 1462 which, as described above, is not strapped to the terminal 1465. However, in the event that the designation of the calling substation A includes only six digits, this movement of the wiper 1440 would prepare a circuit for attempting to seize the first choice verification connector 118. In a similar manner, movement of the wiper 1420 into engagement with the third contact in its contact bank connects ground to the open contacts 1102 to provide a homing circuit for the switch 1400 when the connection is prematurely released. Movement of the wiper 1410 into engagement with the third contact in the bank associated therewith extends ground to the terminal 1454 which, as described above, is also strapped to the "7" designated conductor in FIG. 14 to provide a path for checking the accuracy of the dialing of the third calling office code digit. If the digit has been incorrectly dialed, the busy relay 520 is operated as described above.

It should be noted that the counting relays include a nine relay 650 which is operated in conjunction with the relays 530 or 540 and the relays 640 and 660 when the value of the dialed digit is "9" or "0," respectively. A plurality of contacts 651—657 and 1321—1321a controlled by this relay serve to vary the marking condition provided by the relays 530 and 540 from ones representing "5" and "6" when the relays 640 and 660 are operated to ones representing "9" and "0" when the relays 640, 650, and 660 are operated.

The next digit dialed at the calling substation A is the thousands digit of the station designation, i.e. "4," but, since the calling substation A is on a terminal per line multiparty line, the thousands directory digit functionally operates as a hundreds digit and is utilized by the adapter 112 to seize either the first choice verification connector 118 which is used in verifying numbers in the hundreds group "1"–"4" or to seize a first choice verification connector 720 which is utilized in verifying calls from lines in the hundreds group "5"–"8." More specifically, when the subscriber at the substation A dials the digit "4," the shunt relay 470 and the pulse generator relay 1120 are sequentially operated and, incident to these operations, the motor magnet 1401 is again energized. The pulsing relays 400 and 410 are sequentially operated in accordance with the four line breaks representing the dialed digit "4" to record four more pulses on the magnetic tape in the trunk recorder 114 and to sequentially operate the counting relays 530, 540, 550, and 560 so that the fourth counting relay 560 is fully operated and the five relay 640 is partially operated at the completion of the dialing of this digit. In the interdigit interval following the dialing of this digit, the shunt relay 470 releases to restore the contacts controlled thereby to their normal position, and, in doing so, the contacts 1133 are opened to release the motor magnet 1401 so that the plurality of wipers in the stepping switch 1400 are advanced into engagement with the fourth contacts in the banks associated therewith.

This movement of the wipers 702 and 1430 produces no useful function. The movement of the wipers 701, 703, 705, and 706 performs the same function as described above. The movement of the wiper 704 into engagement with its contact provides a holding path for maintaining the relay 560 fully operated and the five relay 640 partially operated. The movement of the wiper 1420 to its fourth stepping position applies ground to the terminal 1472 which is connected to the terminal 1451 to provide a means for homing the switch in the event that the connection is prematurely released. However, if the calling number included only four or five digits so that the terminal 1472 is connected to the terminal 1452, the switch 1400 would be stepped beyond this position. Movement of the wiper 1410 into engagement with the contact in its fourth stepping position applies ground from the closed interrupter contacts 1402 to the terminal 1453 which is connected to the conductor 1478. The conductor 1478 is connected through a pair of normally closed contacts 1213 to the operating winding of the second choice relay 1340, thereby to prepare a circuit for operating this relay in the event that one of the first choice connectors 118 or 720 is not available. However, the second choice relay 1340 is slow-to-operate and does not operate at this time.

To prepare a circuit for seizing the verification connector 118 for operation in accordance with the next two digits dialed at the calling substation A, movement of the wiper 1440 into engagement with the contact in its fourth stepping position applies ground from the closed and grounded contacts 1041 through the normally closed contacts 1221 to the conductor 1461. Since the calling substation A has a seven digit designation, the conductor 1461 is connected, as described above, to the terminal 1465. Therefore, ground is applied from the terminal 1465 through the closed contacts 1124 to one side of the upper operating winding of the switch relay 1210. The other side of the operating winding of this relay is connected through a plurality of normally closed contacts 1223, 1321, 1342, 1332, and 841 to the operating winding of a slow-to-release connector release relay 800 in the verification connector 118. The completion of the above described circuit is dependent upon the verification connector 118 being in an idle condition inasmuch as the contacts 841 are off-normal contacts which are open when the switching means in the verification connector 118 has been moved off-normal in an X direction.

Similarly, the above described circuit is not completed to the verification connector 118 which is utilized in verifying calling numbers having a thousands directory or hundreds functional digit in the group including the digits "1"–"4" unless the contacts 1332, controlled by the five assist relay 660 which is operated if the stored thousands digit has a value of "5" or above, are closed. Accordingly, the fact that the contacts 1332 are closed indicates that the value of the stored digit is "4" or less. If, however, the five assist relay 660 had been operated to close the contacts 1331, the circuit would have been extended over a conductor 725 to a connector release relay in the first choice verification connector 720 for the hundreds group "5"–"8."

Similarly, if the stored thousands digit of the directory number had been "9" or "0," both the five assist relay 660 and the nine relay 650 would be operated. The operation of the nine relay 650 to close the contacts 1322 and to open the contacts 1321 would prepare a circuit for seizing a verification connector (not shown) for verifying the numbers of lines in the "9" and "0" hundreds group. However, in the local office 40, no calling lines are located in the "9" or "0" group, and, accordingly, completion of the above described circuit to the closed contacts 1322 completes a circuit for operating the busy relay 520 to indicate the call cannot be completed. The ground applied to the upper winding of the switch relay 1210 is extended through the closed contacts 1223, 1322, and 1345 to the lower operating winding of the busy relay 520, thereby to operate this relay so that the busy functions described above are provided. Operating the relay 520 opens the contacts 1221 to remove ground from the wiper 1440, but the relay 520 remains operated over the holding circuit completed at the closed contacts 1222. Although only the dialing of the thousands directory digits "9" and "0" causes the operation of the busy relay 520 in the illustrated system, if other groups of hundreds digits are provided for which subscriber line designations have not been assigned such as the hundreds group "5"–"8," these conductors can likewise be strapped to the operating winding of the busy relay 520 to prevent the extension of calls when these thousands directory or functional hundreds digits are dialed.

As indicated above, the seizure circuit for the first choice hundreds group "1"–"4" verification connector 118 is dependent upon the connector 118 being in an idle condition, as evidenced by the closed condition of the X off-normal contacts 841. Assuming that the connector 118, which is common to a group of adapter circuits and which in fact may comprise the wire chief test set, is busy, the above described seizure circuit for the connector 118 cannot be completed. Therefore, after the slow-to-operate time interval of the second choice relay 1340, this relay operates over the above described circuit to open a plurality of contacts 671, 673, 675, 678, 671a, 672a, 675a, 1,342, and 1345 and to close a plurality of contacts 672, 674, 676, 677, 679, 673a, 674a, 1341, 1343, 1344, and 1346. The closure of the contacts 1346 completes a holding circuit for the second choice relay 1340 shunted around the contacts 1213 controlled by the switch relay 1210. The closure of the contacts 1341 prepares a holding circuit for this relay extending to a pair of normally open contacts 1201 controlled by a verification test relay 500.

The operation of the contacts 1342–1345, inclusive, switches the seizure path extending from the upper winding of the switch relay 1210 through the normally closed contacts 1223 to the second choice verification connector 740, which is illustrated in FIG. 7 of the drawings in block form, for verifying the hundreds group "1"–"8." The transfer of the seizure path to the second choice connector 740 permits one of two separate switch mechanisms or connectors therein to be seized in accordance with whether the dialed thousands directory digit or hundreds functional digit is in the group "1"–"4" or "5"–"8." As in the case of the first choice connectors 118 and 720, the path prepared by the operation of the nine relay 650 forwards ground to the busy relay 520 in the event that either of the digits "9" or "0" has been dialed as the thousands directory number of the calling substation A. The operation of the contacts 671 to 675a, inclusive, effectively transfers marking paths established by the counting circuit from the first choice connectors 118 and 720 to the second choice connector 740 so that the next digits to be dialed comprising the hundreds and tens digits of the directory number are repeated to the connector 740 to control the establishment of a verification switch train.

Assuming, however, that the second choice verification connector 740 is also in a busy condition so that seizure thereof cannot be completed, the adapter 112 includes means for either permitting the completion of the call or for blocking further extension of the connection by operating the busy relay 520. More specifically, after a predetermined time interval, the pulse generator relay 1120 releases to restore the contacts controlled thereby to a normal condition. In releasing, this relay closes the contacts 1123 so that the ground supplied at the wiper 1440 is extended over the conductor 1461, the terminal 1465, the closed contacts 1123, and a pair of contacts 1211 controlled by the switch relay 1210 to a terminal 1481. If the call is to be blocked because of the busy condition of the verification connectors, the terminal 1481 is strapped to a terminal 1480 so that the busy relay 520 is operated to provide the busy functions described above. It will be noted that this operating circuit for the busy relay 520 passes through a pair of normally closed contacts controlled by the switch relay 1210. This relay is operated incident to the completion of the seizure of a verification connector so that, if, at the time that the pulse generator relay 1120 releases, the switch relay 1210 has been operated to indicate the seizure of a verification connector, the contacts 1211 are open and operating ground is not supplied to the busy relay 520. In the event that the completion of the toll call is not to be blocked when a verification connector, either first or second choice, is not available, the terminals 1480 and 1481 are not strapped together, and the busy relay 520 is not operated. When the busy relay 520 is not operated in response to failure to seize a verification connector, the call can be completed and the items of information pertaining thereto can be recorded in the trunk recorder 114, as set forth in detail below.

Returning now to the completion of the above described path extending to the operating winding of the connector release relay 800 in the verification connector 118, assuming that the connector 118 is idle, the completion of the above described circuit operates the connector release relay 800 and the switch relay 1210 in series. The operation of the switch relay 1210 closes a plurality of contacts 511, 513, 514, and 1212 and opens a plurality of contacts 512, 1211, and 1213. The closure of the contacts 1212 extends holding ground from the closed and grounded contacts 1041 to one side of the lower operating winding of the switch relay 1210, thereby to provide a holding circuit for the switch relay 1210 and the connector release relay 800. The opening of the contacts 1211 interrupts the above described path for operating the busy relay 520 and, accordingly, provides an indication that a verification connector has been seized. The closure of the contacts 511 provides another shunt around the upper operating winding of the busy relay 520 so as to provide an alternative path for applying ground from the closed contacts 372 to the incoming sleeve conductor of the adapter 112. The opening of the contacts 512 serves no useful function at this time, but the concurrent closure of the contacts 513 prepares a path controlled by the pulsing relays 400 and 410 for repeating the next two dialed digits to the seized verification connector 118. The opening of the contacts 1213 interrupts the above described operating circuit for the second choice relay 1340 within the slow-to-operate period of this relay to prevent the operation of the relay 1340 to transfer the control paths to the second choice verification connector 740.

The closure of the contacts 514 completes an obvious operating circuit for the verification test relay 500 which operates to open a plurality of contacts 501, 502, and 503 and to close a plurality of contacts 504, 505, 506, and 1201. The closure of the contacts 1201 prepares a holding circuit for the second choice relay 1340, but this relay, as described above, is not operated due to the seizure of the first choice verification connector 118. The closure of the contacts 506 prepares a circuit for applying ground to one of the wipers in the seized connector 118. The closure of the contacts 505 extends holding ground from the closed contacts 504 to the operated relay 560 in the counting relay circuit. The closure of the contacts 504 also provides ground through the closed contacts 563 for maintaining the five relay 640 partially operated. However, if the value of the dialed thousands directory digit which is stored in the counting relay is greater than "4," the closure of the contacts 504 provides holding ground for the five relay 640 and, perhaps, the nine relay 650. The opening of the contacts 502 prevents further operation of the counting relay chain under the control of the second pulsing relay 410, and the opening of the contacts 501 removes one of the ground shunts around the upper operating winding of the busy relay 520, a shunt therefor being provided by the closed contacts 511.

Referring back to the above described operation of the connector release relay 800 in the verification connector 118, the operation of this relay closes a pair of contacts 801 and opens a pair of contacts 802. The opening of the contacts 802 disconnects a terminal 870 connected to a supervisory circuit which supplies ground for resetting the switch in the verification connector 118 to its normal position from a pair of X off-normal contacts 852 and a pair of Y off-normal contacts 842. The closure of the contacts 801 completes an obvious operating circuit for the upper operating windings of a Y delay relay 810 and an X delay relay 820. The operation of the X delay relay 820 opens a pair of contacts 821 and closes a pair of contacts 822. The closure of the contacts 822 prepares a circuit for connecting an X motor magnet 850 with a group of conductors extending to the adapter circuit 112. The operation of the Y delay relay 810 opens a plurality of contacts 811, 813, 815, and 817 and closes a plurality of contacts 812, 814, 816, 818, and 819. The closure of the contacts 819 provides a holding circuit for the connector release relay 800 shunted around the X off-normal contacts 851. The closure of the contacts 812, 814, 816, and 818 connects the operating winding of the X motor magnet 850 and also the lower winding of the slow-to-release X delay relay 820 with a plurality of conductors extending to the adapter circuit 112. A selected one of these conductors is conditioned to receive two series of pulses in accordance with the next two digits dialed at the calling substation A.

More specifically, when the counting relay chain, including the relays 530, 540, 550, and 560, and the relays 640, 650, and 660 is selectively operated in accordance with the value of the dialed thousands directory digit to select the connector having access to the hundreds group corresponding to the dialed thousands digit, these relays also prepare a path for selecting a single one of four wipers provided in the seized verification connector 118 in accordance with the value of the dialed thousands digit. The contacts 533, 545, 555, and 564 prepare paths for selecting wipers having access to sleeve or HS conductors in the calling line circuits designated by the functional hundreds digits "1," "2," "3," and "4," respectively, and, when the five assist relay 660 is operated to actuate the contacts 661 to 663a, inclusive, these contacts select wipers having access to sleeve or HS leads in calling line circuits designated by the hundreds digits "5," "6," "7," and "8," respectively. The contacts 533 and 545 are further utilized when the nine relay 650 is operated to actuate the contacts 652 to 657, inclusive, to select a wiper having access to HS or sleeve multiples of calling line circuits designated by the hundreds digits "9" or "0." However, as explained above, the local office 40 does not include subscriber lines having thousands directory digits "9" or "0," and, accordingly, these conductors are not connected to either the first choice connectors 118 and 720 or the second choice verification connector 740.

In the illustrative example set forth above, only the fourth counting relay 560 is fully operated so that the above described closure of the contacts 513 connects the pulsing contacts 417 controlled by the second pulsing relay 410 to a wiper 864 in the switch provided in the verification connector 118 representing the hundreds digit "4" through a circuit including the closed contacts 564, 662a, 672a, and 817. However, as described above this path now extends through the closed contacts 818 to the lower operating winding of the X delay relay 820 and the X motor magnet 850. In a similar manner, the paths extended to a group of wipers 861, 862, and 863 representing the hundreds digits "1," "2," and "3," respectively, are also connected to the X delay relay 820 and the X motor magnet 850, these paths, however, being interrupted at the open contacts 533, 545, and 555. In a similar manner, if the second choice relay 1340 is operated to actuate the contacts 671 to 675a, inclusive, the path selected in accordance with the value of the functional hundreds digit is extended to the second choice verification connector 740 and is not connected to the first choice verification connectors 118 and 720.

The next item of information dialed at the calling substation A is the hundreds digit of the directory number of the calling substation A, i.e. "9." When the first line break representing the first pulse in the group of nine pulses forming the dialed digit "9" is applied to the calling bridge relay 420, this relay is released to sequentially operate the first and second pulsing relays 400 and 410, as described above, so that the shunt relay 470 and the pulse generator relay 1120 are again operated. The operation of the shunt relay 470 again energizes the motor magnet 1401 of the stepping switch 1400. The nine intermittent operations and releases of the first and second pulsing relays 400 and 410 produced by dialing the digit "9" cause the mark relays 570 and 600 to record a group of nine mark pulses on the magnetic tape in the trunk recorder 114, as described above, so that the value of the dialed hundreds digit is recorded thereon.

The intermittent closures of the contacts 417 controlled by the second pulsing relay 410 provide a series of ground pulses which are coupled over the above identified circuit to the lower operating winding of the X delay relay 820 and to the X motor magnet 850. The intermittent operation of the X motor magnet 850 advances the wipers 861 to 864, inclusive, in an X direction relative to the contact bank disposed adjacent thereto so that at the end of the ninth pulse, these wipers are positioned adjacent a group of terminals, as illustrated in FIG. 8 of the drawings. Incident to moving off-normal in an X direction, the X off-normal contacts 851 and 853 are opened and the X off-normal contacts 852 are closed. The closure of the contacts 852 prepares an operating winding for a release magnet 830, which circuit is interrupted at the open contacts 802. The opening of the contacts 851 interrupts the above described circuit for maintaining the switch relay 1210 in the adapter 112 and the connector release relay 800 in the verification connector 118 operated. However, these relays remain operated over the circuit including the closed contacts 819. The opening of the contacts 853 interrupts the operating circuit for the upper winding of the X delay relay 820, but this relay remains operated during the application of pulses through the closed contacts 818 to the lower winding of this relay. However, at the end of the transmission of these pulses, the X delay relay 820 releases to close the contacts 821 and to open the contacts 822. The opening of the contacts 822 interrupts the above described operating circuit for the X motor magnet 850, and the concurrent closure of the contacts 821 prepares a pulsing circuit for a Y magnet 840 and the lower winding of the Y delay relay 810.

In the interdigit interval following the dialing of the hundreds digit of the directory number of the calling substation A, the shunt relay 470 and the pulse generator relay 1120 sequentially release to record a space pulse on the magnetic tape following a group of nine mark pulses representing the value of the dialed hundreds digit of the directory number of the calling substation A. Further, incident to release of the shunt relay 470, the energizing circuit for the motor magnet 1401 of the stepping switch 1400 is interrupted so that the plurality of wipers controlled thereby are advanced to the contacts forming the fifth stepping position of the switch 1400. The movement of the wiper 704 to its fifth stepping position interrupts the above described circuit for operating the counting relays 530, 540, 550, and 560, these relays remaining in their previously operated condition due to the holding circuit provided by the closed contacts 504 and 505. Movement of the wiper 1440 to its fifth stepping position interrupts at an additional point the above described operating circuit for the connector release relay 800 and the switch relay 1210. Movement of the wiper 1410 to its fifth stepping position interrupts at an additional point the above described operating circuit for the second choice relay 1340, and movement of the wiper 1420 to its fifth stepping position applies ground to the open contacts 1102 to provide a homing circuit for the switch 1400 if the call is prematurely terminated. The operations of the wipers 701, 702, 703, 705, 706, and 1430 perform the same functions described above in conjunction with movement of these wipers into engagement with the contacts forming the fourth stepping position.

The subscriber at the calling substation A now dials the tens digit of the directory number of the substation A which comprises the digit "4," so that four line breaks are applied to the calling bridge relay 420 to sequentially operate and release the first and second pulsing relays 400 and 410 four times. Incident to the first operation thereof, the shunt relay 470 and the pulse generator relay 1120 are operated and the motor magnet 1401 of the stepping switch 1400 is energized. These four operations and releases of the relays 400 and 410 record four more mark pulses on the magnetic tape in the trunk recorder 114 so that a record of the value of the dialed tens digit of the directory number of the calling substation A is provided. In addition, the four closures of the pulsing contacts 417 apply four ground pulses to the lower winding of the Y delay relay 810 and to the Y magnet 840 of the switch in the verification connector 118 so that the plurality of wipers 861–864 are advanced to the right four steps, as shown in FIG. 8 of the drawings. Incident to moving the first step in the Y direction, the Y off-normal contacts 841 are opened and the Y off-normal contacts 842 are closed. The closure of the contacts 842 prepares an alternative path for energizing the release magnet 830, and the opening of the contacts 841 interrupts the energizing circuit for the upper winding for the Y delay relay 810 which relay, however, is maintained operated by the pulses supplied through the closed contacts 818 and 821.

Following a suitable time delay after the termination of the application of the four pulses to the relay 810 and the motor magnet 840, the Y delay relay 810 releases to open the contacts 812, 814, 816, 818, and 819 and to close the contacts 811, 813, 815, and 817. The opening of the contacts 812, 814, 816, and 818 interrupts the circuit for applying pulses from the adapter 112 to the magnets 840 and 850. The opening of the contacts 819 interrupts the operating circuit for the connector release relay 800 and the switch relay 1210. However, the connector release relay 800 is slow-to-release and does not release at this time. The switch relay 1210 does release to initiate the verification test which determines whether the digits dialed at the calling substation represent the designation of the calling substation A.

More specifically, releasing the switch relay 1210 opens the contacts 511, 513, 514, and 1212 and closes the contacts 512, 1211, and 1213. The opening of the contacts 514 interrupts the operating circuit for the verification test relay 500, but this relay is slow-to-release and does not release at this time. The opening of the contacts 511 removes the last shunt around the upper operating winding of the busy relay 520 so that the left hand terminal of this winding, as shown in FIG. 5, is connected to grounded battery through switch components connected to the incoming sleeve lead of the adapter 112. The right hand terminal of the upper winding of the busy relay 520, as illustrated in FIG. 5, is connected to ground at the closed contacts 372. However, the busy relay 520 is slow-to-operate and does not operate at this time. The opening of the contacts 513 interrupts the above described path for supplying pulses to the verification connector 118, and the concurrent closure of the contacts 512 connects ground from the closed contacts 506 through the closed contacts 512, 564, 662a, 672a, and 817 to the wiper 864.

If the digits forming the designation of the calling substation A have been correctly dialed, the wiper 864 as well as the wipers 861, 862, and 863 are connected to the fourth contacts in the banks associated therewith in accordance with the dialed tens digit "4." However, the wipers 861, 862, and 863 are connected to contacts which are strapped to the sleeve or HS multiples of calling line circuits in the hundreds groups "1," "2," and "3," respectively. The wiper 864 engages a contact which is strapped to the sleeve multiple of the line circuit 100 so that the ground provided at the closed contacts 506 is extended through the line finder 104 and the local selector 106 to the left hand terminal of the upper winding of the busy relay 520, thereby again providing a ground shunt around the upper winding of this relay to prevent its operation. Accordingly, if the verification switch train includes the counting relays in the adapter 112 and the switching means provided in the verification connector 118 have been correctly set to extend a connection to the sleeve or HS lead of the calling line circuit 100, the busy relay 520 is not operated. However, in the event that the dialed digits do not form the designation of the calling substation A, the ground shunt for the busy relay 520 is not provided so that, after the slow-to-operate time period thereof, this relay operates to prevent the recording of further items of information in the trunk recorder 114 and to prevent further extension of the connection. It should be noted that the verification switch train establishes a revertive connection to the line circuit 100 in response to the dialing of the thousands, hundreds, and tens digits of the directory number of the calling substation A inasmuch as the units digit of this designation provides a party ringing digit since the calling substation is on a terminal per line multiparty line. However, it is obvious that an additional switching stage or additional stages of selection could be provided in the verification train for calling substations which are provided on private lines or on terminal per station multiparty lines.

Upon completion of the above described verification test, the connector release relay 800 releases to open the contacts 801 and to close the contacts 802. The closure of the contacts 802 connects the ground at the terminal 870 to the operating winding of the release magnet 830 so that the wipers 831–874 are restored to their normal position. Incident to this restoring operation, the X off-normal contacts 851 and 853 are closed and the X off-normal contacts 852 are opened. Further, the Y off-normal contacts 841 are closed and the Y off-normal contacts 842 are opened. The opening of the contacts 852 and 842 interrupts the above described operating circuit for the reset or release magnet 830, thereby to restore the verification connector 118 to a normal condition.

Following its slow-to-release interval, the verification test relay 500 releases to restore the contacts controlled thereby to their normal condition. The closure of the contacts 501 again provides a shunt around the upper winding of the busy relay 520 to prevent its operation following the completion of the verification test. The closure of the contacts 502 reestablishes a portion of the pulsing path for operating the counting relay chain, but this circuit is interrupted since the wiper 704 is in engagement with the contact in the fifth stepping position of the switch 1400. The opening of the contacts 504 and 505 removes holding ground from the relays in the counting relay circuit so that the relay 560 which is fully operated and the five relay 640 which is partially operated are released. The opening of the contacts 506 removes ground from the cricuit extending to one of the wipers in the verification connector 118.

Further, in the interdigit interval following the dialing of the tens digit "4" of the calling substation designation, the shunt relay 470 and the pulse generator relay 1120 are sequentially released so that a space pulse is recorded on the tape in the trunk recorder 114 immediately following the group of four pulses representing the value of the dialed tens digit of the directory number of the calling substation A. Further, the release of the shunt relay 470 interrupts the operating circuit for the motor magnet 1401 so that the wipers controlled thereby are advanced to the sixth stepping position of the switch 1400. However, advancing the stepping switch 1400 to this sixth position, except for movement of the wiper 1420, performs no functions other than those described above in conjunction with the preceding movements of the stepping switch 1400. Advancing the wiper 1420 applies ground to the terminal 1472 to provide a means for stepping the switch 1400 to its seventh position if four, five, or six digits are provided in the calling station designation. Since the substation A includes seven digits, movement of the wiper 1410 performs no useful function at this time.

The next item of information dialed at the calling substation A is the units or party ringing digit of the designation of the calling substation A, i.e. the digit "4." The four line breaks applied to the calling bridge relay 420 cause the pulsing relays 400 and 410 to operate and release four times during which four mark pulses are recorded on the magnetic tape in the trunk recorder 114. Incident to the first operation and release of the second pulsing relay 410, the shunt relay 470 and the pulse generator relay 1120 are operated, the operation of the shunt relay 470 completing an energizing circuit for the motor magnet 1401 of the stepping switch 1400. In this connection, it should be noted that, since the party digit is not utilized in establishing the verification switch train, the pulses provided by intermittent operation of the second counting relay 410 are not utilized either in operating the counting relays, because of the movement of the wiper 704 beyond the fourth stepping position, or in operating the verification switch train. In the interdigit interval following the dialing of the party or units digit of the directory number of the calling substation A, the shunt relay 470 releases to interrupt the operating circuit for the pulse generator relay 1120 and to remove energization from the motor magnet 1401 to the stepping switch 1400. The release of the pulse generator relay 1120 together with the release of the shunt relay 470 operates the space relays 610 and 620 so that a single space pulse is recorded on the magnetic tape in the trunk recorder 114 immediately following the group of four mark pulses representing the recorded units digit.

The release of the motor magnet 1401 advances the wipers 701–706, 1410, 1420, 1430, and 1440 into engagement with the contacts forming the seventh stepping position of the switch 1400. Since the next digit to be dialed is the first called office code digit of the designation of the remote office 50 in which the called substation D is located, this and the following six digits forming the designation of the called substation D are to be repeated to the local ticketing selector 116 from the recording and verifying adapter 112. Accordingly, when the wiper 701 moves into engagement with the contact forming the seventh stepping position, the previous circuit shunting the pulsing contacts 411 is interrupted and a circuit is completed extending from the outgoing tip conductor through the closed contacts 441, 433, 521, 411, the seventh contact in the bank engaged by the wiper 701, the wiper 701, and the closed contacts 523, 437, and 442 to the ring conductor extending to the local ticketing selector 116. Accordingly, each time the pulsing contacts 411 are opened in response to operation of the second pulsing relay 410, a break is transmitted to the local ticketing selector 116 for controlling this selector and the switching equipment in the remote office 50, including the incoming selector 124 and the connector 126, to extend a connection to the line circuit 128 to which the called substation D is connected. Since the information relating to the designation of the called substation D is to be recorded in the trunk recorder 114, the wipers 705 and 706 in the seventh stepping position maintain the above described operating paths extending to the space pulse head 910 and the mark pulse head 920 controlled by the pulsing relays 400 and 410. The wiper 703 in its seventh stepping position maintains the above described pulsing path for controlling intermittent operation of the pulsing relays 400 and 410.

The movement of the wipers 1430 and 1440 into engagement with the contacts in the seventh stepping position of the switch 1400 prepares paths for operating the busy relay 520 in the event that answering supervisory signals are received over the extended switch train prior to the dialing of all of the digits necessary to provide a full identification of the called substation D. It is possible to receive answering supervisory signals prior to the dialing of a full complement of digits inasmuch as one or more digits may be absorbed in either the local ticketing selector 116 or the incoming selector 124 during the extension of the connection to the called substation D. Movement of the wiper 1420 into engagement with the contact in the seventh stepping position of the switch 1400 merely prepares a circuit for advancing the switch 1400 to its home position in the event that the connection is prematurely released. Therefore, the adapter 112 is now conditioned to receive the first called office code digit designating the remote office 50.

To condition the stepping switch 1400 for counting the number of digits necessary to extend a connection to a called office, the terminals 1451 and 1452 are selectively strapped to a plurality of terminals 1474, 1475, and 1476. When the designation of the called substation includes seven digits, all of the terminals 1474, 1475, and 1476 are connected to the terminal 1451 so that the stepping switch is advanced from its seventh to its fourteenth stepping position under the control of the shunt relay 470. However, if the called office includes only six digits, the terminals 1474 and 1475 are connected to the terminal 1451, and the terminal 1476 is strapped to the terminal 1452 so that, when the wiper 1420 moves into engagement with the thirteenth contact, a circuit is completed through the terminals 1476 and 1451 for automatically advancing the stepping switch 1400 to its fourteenth stepping position.

Similarly, if the called office designation includes only five digits, the terminal 1474 is strapped to the terminal 1451 and the terminals 1475 and 1476 are connected to the terminal 1452 so that the ground supplied to the wiper 1420 by the interrupter springs 1402 automatically steps the switch 1400 from the twelfth to the fourteenth stepping position, thereby effectively absorbing two digits. When the called office designation includes only four digits, all of the terminals 1474, 1475, and 1476 are connected to the terminal 1452 so that the interrupter springs 1402 and the wiper 1420 advance the stepping switch 1400 from the eleventh to the fourteenth stepping position.

The subscriber at the calling substation A now dials the first office code digit "9" of the called office 50 representing the alphabetical character "W" so that the first and second pulsing relays 400 and 410 are intermittently operated and released nine times to record nine mark pulses on the magnetic tape in the trunk recorder 114, as described above. Further, during these intermittent operations, the pulsing contacts 411 effectively transmit nine pulses to the ticketing selector 116 over the above described circuit to actuate the selector 116. The first operation of the pulsing relay 410 again completes the above described operating circuit for the shunt relay 470 and the pulse generator relay 1120 so that the motor magnet 1401 is again energized. Following the completion of the dialing of this digit, the shunt relay 470 and the pulse generator relay 1120 sequentially release to record a space pulse on the magnetic tape in the trunk recorder 114 immediately following the group of nine pulses representing the first called office code digit. The sequential release of these relays also opens the operating circuit for the motor magnet 1401 so that the wipers of the stepping switch are advanced into engagement with the contacts forming the eighth stepping position thereof. This movement of the wipers of the stepping switch 1400 performs the same functions described above in conjunction with advancing these wipers into engagement with the contacts forming the seventh stepping position.

The subscriber at the calling substation A then dials the remaining two office code digits "43" and the digits "6114" forming the remainder of the designation of the called substation D, and these signals are repeated over the outgoing tip and ring conductors of the adapter 112 and simultaneously recorded as mark pulses on the magnetic tape in the trunk recorder 114, a space pulse being interposed between each of the groups of mark pulses under the control of the shunt relay 470 and the pulse generator relay 1120. Incident to these operations, the wipers in the stepping switch 1400 are advanced from the eighth to the fourteenth stepping position, the wipers being advanced into the fourteenth stepping position incident to the release of the shunt relay 470 and the pulse generator relay 1120 in the interdigit interval following completion of the dialing of the units digit "4" of the designation of the called substation D. During this step-by-step movement of the wiper 1420 of the stepping switch 1400, the contacts in the eleventh, twelfth, and thirteenth stepping positions, which are connected to the terminals 1474, 1475, and 1476, respectively, are engaged. However, since the called substation D comprises a seven digit designation, this produces no useful function. In the event that the designation of the called substation D includes four, five or six digits, the selective engagement of the contacts in the eleventh, twelfth, and thirteenth stepping positions completes an advancing circuit for the motor magnet 1401 of the stepping switch 1400 so that the stepping switch 1400 is advanced through a number of steps representing the digits which are not required to complete the extension of the connection to the called subscriber.

As indicated above, the adapter circuit 112 includes means for providing a busy indication in the event that answering supervisory signals are received by the adapter circuit 112 prior to dialing the full complement of digits necessary to provide the designation of the called substation D. More specifically, assuming that the stepping switch 1400 is positioned with the wipers thereof in engagement with the contacts forming the thirteenth stepping position on a call extended to the called substation D which requires seven digits to provide the complete designation of the called substation D and that answering supervisory signals are received in the form of the application of grounded battery to the HS lead of the local ticketing selector 116, this grounded battery is extended through the closed contacts 373 and 524 to complete an obvious operating circuit for the supervisory relay 450 so that this relay operates to close, among others, a plurality of contacts 1111 and 1112. The closure of the contacts 1112 energizes a timer motor 1050 for driving a timing mechanism individual to the adapter 112, which timing mechanism preferably is of the type disclosed in the copending application of Armistead Wharton, Serial No. 497,760, filed March 29, 1955, and which is assigned to the same assignee as the present application. The closure of the contacts 1111 completes a circuit for extending ground from the closed and grounded contacts 1041 through the closed contacts 1221 to the wiper 1440 of the stepping switch 400. This wiper is in engagement with the thirteenth contact in the contact bank associated therewith which is connected through the closed contacts 1111 to the operating winding of a timer clutch 1070 also forming a portion of the timing mechanism.

The energization of the timer clutch 1070 initiates rotation of a pair of cams 380 and 1060 so that, as described in detail in the above identified copending Wharton application, a pair of contacts 1061 is closed one to two seconds following the energization of the timer clutch 1070. The closure of the contacts 1061 extends the ground through a pair of normally closed contacts 1304 to the wiper 1430. Since this wiper is in engagement with the thirteenth contact in the bank associated therewith, the ground on the wiper 1430 is extended directly to the lower operating winding of the busy relay 520, thereby to operate this relay. Operation of the busy relay 520 performs the functions described above in preventing the recording of additional information in the trunk recorder 114 and the repeating of additional information to the selector 116, and in returning busy tone to the calling substation A to indicate that the connection cannot be completed. Operating the relay 520 opens the contacts 1221 to release the timer clutch 1070 so that the timing mechanism is restored to its normal position and opens the contacts 524 so that the relay 450 is released. The busy relay 520 remains operated until such time as the connection is released and the adapter 112 restored to a normal condition.

However, assuming as described above that the stepping switch 1400 is advanced to its fourteenth stepping position, the wiper 701, in moving to this position, interrupts the above described circuit for repeating pulses to the extended switch train inasmuch as all of the digits for extending the connection to the called substation D have been repeated by the adapter 112. In the fourteenth stepping position, the wiper 701 again completes the circuit described above shunted across the pulsing contacts 411 so that the outgoing tip and ring conductors of the adapter 112 are connected together. Movement of the wiper 702 into engagement with the fourteenth contact in the bank associated therewith prepares a circuit for operating a cut-through relay 430 in response to the receipt of answering supervisory signals from the extended switch train. More specifically, the wiper 702 which is connected to the sleeve lead of the selector 116 is connected to a pair of normally open contacts 453 controlled by the supervisory relay 450 so that, upon receipt of answering supervisory signals as determined by the operation of the relay 450, a circuit is prepared for operating the cut-through relay 430. Movement of the wiper 703 to its fourteenth stepping position interrupts the above described circuit for operating the pulsing relays 400 and 410 and, accordingly, prevents the recording of additional items of information on the magnetic tape of the trunk recorder 114 under the control of the calling bridge relay 420. This prevents a calling subscriber from dialing excessive digits into the adapter 112 to provide superfluous information in the trunk recorder which may adversely affect the readout or recording operation involving this information and thus prevent the assessment of a correct charge for the call.

Movement of the wiper 704 serves no useful function at this time, and movement of the wipers 705 and 706 performs the same function described above. In the fourteenth stepping position, the wiper 1440 again prepares a circuit for causing operation of the timer clutch 1070 as described above. However, when the wiper 1430 moves to its fourteenth stepping position, a path is prepared for operating a clock relay 1030 so as to initiate the recording of date and time information under the control of the common clock calendar circuit 130 in the event that answering supervisory signals are received from the called substation D. Advancement of the wiper 1410 serves no useful function, but movement of the wiper 1420 to its fourteenth stepping position prepares a path controlled by the clock relay 1030 and a pickup relay 1300 for energizing the motor magnet 1401 to advance the stepping switch 1400 to its fifteenth stepping position.

As described above, the completion of the dialing of the seven digits extends the connection to the called substation D so that, if the called substation is busy, sixty cycle flashing is provided on the HS lead which is connected to the grounded operating winding of the supervisory relay 450. Alternatively, if the calling substation is idle, answering supervision is supplied by a steady resistance battery on the HS lead of the extended switch train which maintains the supervisory relay 450 operated. To provide a test for determining the presence of answering supervisory or busy signals, the timer provided in the adapter 112 is utilized. More specifically, assuming that busy signals are received, the supervisory relay 450 is momentarily operated over the above described circuit to close the contacts 1111 and 1112 among others. The closure of the contacts 1112 initiates rotation of the timer motor 1050, and the closure of the contacts 1111 energizes the timer clutch 1070 so that the cams 1060 and 380 are placed in rotation. However, if busy signals are provided, the supervisory relay 450 releases to release the clutch 1070 before any of the contacts controlled by the cams 380 and 1060 are closed, the cam being mechanically restored to their normal position upon release of the clutch 1070. This intermittent operation and release of the supervisory relay 450 continues until such time as the connection is released.

Assuming, however, that steady resistance battery is provided on the HS lead of the local ticketing selector 116, the supervisory relay 450 is operated to close a plurality of contacts 452, 543, 1111, and 1112 and to open a pair of contacts 451. Opening the contacts 451 removes resistance ground from the HS lead extending to the local selector 106, and the concurrent closure of the contacts 452 connects resistance battery to this lead, thereby to provide an indication in the local selector 106 of the receipt of answering supervisory signals by the adapter 112. The closure of the contacts 453 prepares the above described operating circuit extending to the operating winding of the cut-through relay 430 from the sleeve lead of the ticketing selector 116 over the wiper 702. The application of ground to the sleeve lead of the selector 116 operates the cut-through relay 430 so that a plurality of contacts 432, 433, 435, and 437 are opened and a plurality of contacts 431, 434, 436, and 438 are closed.

The contacts 434 are of a preliminary operating type and close to complete a holding circuit for the calling bridge relay 420 extending from ground at the closed and grounded contacts 341 through both windings of the relay 420 to grounded battery, thereby to maintain the relay 420 in an operated condition. The opening of the contacts 432 and 435 which are break contacts in make-before-break contact arrangements disconnects the windings of the calling bridge relay 420 from the incoming tip and ring conductors, and the concurrent closure of the contacts 431 and 436 connects the incoming and outgoing tip and ring conductors 112 so that the calling circuit is cut through the adapter 112 to the extended switch train. The opening of the contacts 433 and 437 disconnects the outgoing tip and ring conductors of the adapter 112 from the pulsing circuit provided therein. The closure of the contacts 438 completes a holding circuit for the cut-through relay 430 shunted around the operating circuit including the wiper 702 and the closed contacts 453.

Referring back to the above described operation of the supervisory relay 450, the closure of the contacts 1112 again energizes the timer motor 1050, and the closure of the contacts 1111 energizes the timer clutch 1070 so that the cams 380 and 1060 are again placed in operation. The cam 1060 and the contacts 1061 controlled thereby provide a means for timing the busy test in the event that flashing grounded battery is provided on the HS lead of the local ticketing selector 116 since the relay 450 is operated and released before the contacts 1061 are closed. However, if steady grounded battery is received on the HS lead so that the supervisory relay 450 remains operated more than the one to two second interval provided by the cam 1060 prior to the initial closure of the contacts 1061, these contacts are closed to extend ground through the closed contacts 1304 to the wiper 1430 of the stepping switch 1400. This ground is extended by the contact in the fourteenth stepping position of the switch to the operating winding of the clock relay 1030 so that this relay operates to open a plurality of contacts 361 and 1034 and to close a plurality of contacts 1031, 1032, and 1033.

The opening of the contacts 361 interrupts a circuit controlled by a pair of contacts 381 controlled by the timer cam 380 for recording duration information in the trunk recorder, thereby to prevent the recording of this information during the storage of date and time information in the trunk recorder 114. The closure of the contacts 1032 provides an alternative source of holding ground shunted around the contacts 1111 controlled by the supervisory relay 450 so that, following the expiration of the busy test interval determined by the contacts 1061, the release of the connection will not prevent the recording of the necessary date and time information. The opening of the contacts 1034 interrupts a point in a partially prepared operating circuit for the motor magnet 1401, and the closure of the contacts 1033 provides an additional source of ground to the wiper 1430 for holding the clock relay 1030 operated when the contacts 1061 are opened by the cam 1060. The closure of the contacts 1031 connects the operating winding of a pickup relay 1300 to a clock-calendar pickup lead extending to the common clock calendar circuit 130.

In the event that the clock-calendar circuit 130 is idle, ground is standing on the pickup conductor in the circuit 130 and the pickup relay 1300, accordingly, is operated to close a plurality of contacts 631, 633, 1301, 1302, 1303, and 1305 and to open a plurality of contacts 632, 1304, and 1306. The closure of the contacts 1302, which are of the preliminary make type, interconnects the operating winding of the relay 1300 with a holding conductor extending to the clock-calendar circuit 130 so that the pickup relay 1300 is maintained operated under the control of the circuit 130 until complete date and time information has been transmitted to the adapter 112. The closure of the contacts 1301 forwards start ground to the clock-calendar circuit 130. The closure of the contacts 631 connects the operating winding of the space relay 610 with the circuit 130 so as to receive space pulse information therefrom. The opening of the contacts 632 interrupts the above described operating circuit for the first mark relay 570, and the concurrent closure of the contact 633 connects the operating winding of the relay 570 with the clock-calendar circuit 130 so that this relay is conditioned to be operated by the circuit 130 in accordance with mark pulses representing date and time information. The closure of the contacts 1305 connects the motor magnet 1401 with the open contacts 1034, and the opening of the contacts 1304 interrupts the above described operating circuit for the clock relay 1030 so that this relay releases to restore the contacts controlled thereby to their normal condition.

The closure of the contacts 1034 incident to the release of the clock relay 1030 completes a circuit for energizing the motor magnet 1401 extending from the closed and grounded springs 1402 through the wiper 1420, the fourteenth contact in the bank associated therewith, and the contacts 1034 and 1305. Operation of the motor magnet 1401 opens the interrupter springs 1402 so that ground is removed from the magnet 1401, and the wipers of the stepping switch 1400 are advanced to engage the contacts forming the fifteenth stepping position. In the fifteenth stepping position, the wipers 705 and 706 again maintain the pulsing paths for the mark pulse head 920 and the space pulse head 910 intact to permit the storage of date and time and duration information in the fifteenth stepping position of the switch 1400. Movement of the wiper 1440 to its fifteenth stepping position completes a direct operating circuit for the timer clutch 1070 so that, when either of the contacts 1032 or 1111 are opened, the clutch 1070 is maintained operated by the holding ground provided at the closed contacts 1041. Movement of the wiper 1420 into its fifteenth stepping position prepares an additional operating circuit for the motor magnet 1401. The remaining movements of the wipers of the stepping switch 1400 perform no useful functions at this time.

The clock and calendar circuit 130 now supplies a plurality of groups of mark pulses separated by space pulses for recording in the trunk recorder 114 representing the date and time of placing the call. The clock-calendar circuit 130 preferably is of the type disclosed in the above identified copending Morris et al. application.

Following the completion of the transmission of this information to the trunk recorder 114, the clock-calendar circuit 130 removes holding ground from the contacts 1302 so that the pickup relay 1300 releases to restore the contacts controlled thereby to their normal condition. Incident to the release of the pickup relay, the contacts 1306 are closed to prepare a portion of an operating circuit for the motor magnet 1401, and the contacts 632 are again closed to prepare the above described operating circuit for the mark relay 570. The remaining contact operations provided in restoring the pickup relay 1300 to its normal condition merely aid in conditioning the adapter circuit 112.

To initiate the recording of duration information which comprises the recording of a mark pulse in the trunk recorder 114 at the end of each minute that the call is maintained, the timer cam 380 momentarily closes the contacts 381 at one minute intervals. As disclosed in the above identified copending Wharton application, the contacts 381 are originally closed approximately sixty-eight seconds following the initial energization of the timer clutch 1070 to provide a first minute pulse after an interval slightly larger than sixty seconds to cover the release time of the extended switch train and thereby avoid the possibility of charging the subscriber for an additional minute of call duration in the event that the connection is released toward the end of a one minute interval. When the contacts 381 are momentarily closed, ground from the closed contacts 1041 is forwarded through the closed contacts 361, 381, and 632 to the operating winding of the mark relay 570 so that this relay and the second mark relay 600 sequentially operate and release to record a mark pulse on the magnetic tape in the trunk recorder 114 representing the first minute of elapsed time and to advance the magnetic tape a single step. The contacts 381 are momentarily closed at one minute intervals thereafter under the control of the cam 380 to provide a record of the duration of the toll call.

This intermittent operation continues until such time as the connection is released so that holding ground for the cut-through relay 430 is removed from the sleeve lead of the local selector 116 to permit the cut-through relay 430 to restore to its normal condition. Incident to releasing the cut-through relay 430, the supervisory relay 450 is also released to restore the contacts controlled thereby to their normal position. The opening of the contacts 1112 interrupts the energizing circuit for the timer motor 1050 so that the timer cam 380 is no longer advanced to provide duration pulses representing the length of the toll call. The closure of the contacts 451 connects resistance ground to the HS sleeve of the local selector 106 to advise the selector that the connection has been released. The remaining contact operations produced by releasing the supervisory relay 450 merely aid in restoring the adapter 112 to its normal condition.

When the call is released from the calling substation A, the calling bridge relay 420 is released to interrupt the operating circuit for the release delay relay 370. After the slow-to-release interval, this relay releases to restore the contacts controlled thereby to their normal condition. The opening of the contacts 372 removes ground from the sleeve lead extending to the local selector 106 and the line finder 104 so that these components restore to a normal condition. The opening of the contacts 1041 interrupts the above described operating circuit for the timer clutch 1070 so that the cams 380 and 1060 are restored to their normal position. The opening of the contacts 1041 also interrupts the operating circuit for the second release delay relay 1100, but this relay is not released at this time due to the slow-to-release characteristic thereof.

After the slow-to-release interval of the second release delay relay 1100, this relay releases to restore the contacts controlled thereby to their normal condition. The opening of the contacts 441 and 442 disconnects the tip and ring conductor of the adapter 112. The closure of the relay of the contacts 443 extends ground from the closed and grounded off-normal contacts 711 through the closed contacts 211, 222, 331, 443, and 501 to be applied to the incoming sleeve lead of the adapter 112, thereby to mark the adapter 112 as busy to prevent its seizure during the restoration of the adapter 112 to its normal condition. The closure of the contacts 1102 completes an energizing circuit for the motor magnet 1401 of the stepping switch 1400 extending from the closed and grounded interrupter springs 1402 through the wiper 1420, the contact in the fifteenth stepping position, and the closed contacts 1306 and 1102 to the motor magnet 1401. Operation of the motor magnet 1401 opens the interrupter springs 1402 so that the magnet 1401 is released to advance the plurality of wipers to the contacts forming the sixteenth stepping position. Movement of the wiper 705 to its sixteenth stepping position interrupts the above described paths for supplying mark pulses to the trunk recorder 114, and movement of the wiper 706 to its sixteenth stepping position energizes the space head pulse 910 to record a space pulse on the magnetic tape in the trunk recorder 114 immediately following the group of mark pulses representing the duration of the call.

Movement of the wiper 1420 to its sixteenth stepping position connects ground from the closed interrupter springs 1402 through the wiper 1420 to the operating winding of the motor magnet 1401 so that this magnet is energized to open the interrupter springs 1402, thereby interrupting the above described circuit to release the magnet 1401 and advance the wipers to their seventeenth stepping position. Movement of the wiper 706 to its sixteenth stepping position removes ground from the space head 910 in the trunk recorder 114 to terminate the recording of the space pulse immediately following the group of mark pulses forming the record of the duration of the toll call. Movement of the wiper 1420 to its seventeenth stepping position completes a circuit for forwarding ground from the interrupter springs 1402 and the wiper 1420 to the operating winding of the pulse generator relay 1120 so that this relay operates.

The operation of the pulse generator relay closes the contacts 462, but closure of these contacts does not operate the space relay 610 inasmuch as main holding ground has been removed from the contacts 1041 by the prior release of the release delay relay 370. The closure of the contacts 1121 extends ground from the closed contacts 1042 to operate the magnet 900. The operation of the pulse generator relay 1120 also closes the contacts 1126 so that ground is forwarded through the closed contacts 1102 to the motor magnet 1401, thereby operating the motor magnet to open the interrupter springs 1402. Opening the interrupter springs 1402 interrupts the above described operating circuit for the pulse generator relay 1120. After the slow-to-release interval of this relay, the contacts 1121 are opened to advance the magnetic tape a single step following the previously recorded space pulse, and the contacts 1126 are opened to release the motor magnet 1401 so that the interrupter springs 1402 are closed and the wipers are advanced to their eighteenth stepping position.

In this positon the wipers 705 and 706 engage contacts which are strapped directly to ground so that both the space pulse head 910 and the mark pulse head 920 in the trunk recorder 114 are connected directly to ground to record simultaneous mark and space pulses on the magnetic tape to provide an end-of-call or COE signal, thus indicating that all of the items of information pertaining to the toll call have been stored in the trunk recorder 114. In moving to its eighteenth stepping position, the wiper 1420 completes the above described circuit extending from the interrupter springs 1402 through the wiper 1420 for energizing the motor magnet 1401 so that the interrupter springs 1402 are opened to release the magnet 1401 and thus the stepping switch 1400 is advanced to its nineteenth stepping position. Movement of the wipers 1705 and 1706 to their nineteenth stepping position terminates the energization of the space pulse head 910 and the mark pulse head 920 to terminate the recording of the COE signal on the magnetic tape.

In order to space the items of information recorded on the magnetic tape in the trunk recorder 114 from items of information pertaining to the next succeeding call, the magnetic tape is automatically advanced through five steps under the control of the pulse generator relay 1120 and the wiper 1420 of the stepping switch 1400 as described above so that the pulse generator relay 1120 is operated and released five times as the wiper 1420 moves from the nineteenth to the twenty-third stepping position. When the wiper 1420 moves to the twenty-fourth and twenty-fifth stepping positions, the above described self interrupting circuit for the motor magnet 1401 is completed to advance the plurality of wipers in the stepping switch 1400 to their normal home position, as illustrated in FIG. 14 of the drawings. Incident to moving to the normal home position, the off-normal contacts 711 and 712 are opened, and the off-normal contacts 713 are closed. The completion of the return of the stepping switch 1400 to its normal home position completes the return of the adapter circuit 112 to its normal position and, accordingly, the opening of the contacts 711 removes busy ground from the incoming sleeve lead of the adapter 112 to permit its seizure and use in recording items of information pertaining to succeeding toll calls.

Although the operation of the adapter 112 has been described in detail above in conjunction with the extension of a toll call to the substation D in the remote office 50, it is obvious that the adapter 112 operates in substantially the same manner on calls extended to a called substation, such as the substation F, in the remote office 60 so that all of the items of information pertaining to a call placed to this substation are stored in the trunk recorder 114.

*Operation of the Adapter 112 on Toll Calls Extended to the Remote Manual Office 70*

As set forth above, when a toll call is extended from the calling substation A to a called substation G which is in the remote office 70 and which is provided with manual equipment 134, the items of information pertaining to this toll call are not automatically collected and stored in the trunk recorder 114 inasmuch as the necessary information for establishing and assessing charges for the toll call is collected by the manual operator in the remote office 70. However, the recording and verifying adapter 112 is used, together with the local ticketing selector 116, to obtain access to the two-way trunk circuit 132 extending to the manual equipment 134. Accordingly, the recording and verifying adapter 112 includes means for recognizing calls placed to a manual office and for permitting the calling circuit to be cut through to the remote office 70 under the control of answering supervision received from the manual equipment 134 without permitting items of information pertaining to the call to be stored in the trunk recorder and without requiring the dialing of the digits forming the designation of both the calling and called subscribers.

More specifically, and as described in detail above to extend a call to a remote office, the subscriber at the calling substation A dials the access digit "5" so that the calling loop circuit is completed through the line circuit 100, the line finder 104, and the local selector 106 to the recording and verifying adapter 112, thereby causing the operation of the calling bridge relay 420 so that the release delay relay 370 and the second release delay relay 1100 are sequentially operated. Following the completion of the operation of these two relays, the adapter 112 is in a condition to receive dialed digits from the calling substation A for use in extending a connection to the remote office 70.

The two-way trunk 132 extending to the manual equipment 134 in the remote office 70 is accessible over the first level of the local ticketing selector 116, and, accordingly, to obtain access to the remote office 70 following the seizure of the adapter 112, the digit "1" is dialed at the calling substation A. The single line break representing the dialed digit "1" releases and operates the calling bridge relay 420 so that the first and second pulsing relays 400 and 410 are operated as described above. The operation of the second pulsing relay 410 in closing the contacts 417 completes the above described operating circuit for the shunt relay 470 and the pulse generator relay 1120. The first operation of the second pulsing relay 410 also causes the operation of the first and second mark relays 570 and 600 as described above so that a single mark pulse is recorded on the magnetic tape in the trunk recorder and so that the drive magnet 900 is energized. In addition, the first operation of the shunt relay 470, in closing the contacts 1133, energizes the motor magnet 1401 of the stepping switch 1400 to condition the switch for being advanced from its normal home position to its first stepping position.

The adapter circuit 112 includes a control circuit comprising a first digit one relay 750 and a first digit over one relay 760 which are controlled by the first digit dialed into the adapter 112. If the first dialed digit is "1," this control circuit conditions the adapter circuit 112 for the receipt of answering supervisory signals from the manual equipment 134. However, if the first dialed digit is greater than "1," thus representing that the call is not to be placed to the remote office 70, this control circuit prevents the repeating of additional digits to the local ticketing selector 116 until such time as all of the digits representing the designation of the calling substation have been stored in the trunk recorder 114 and the verification test completed.

More specifically, when the second release delay relay 1100 is operated incident to seizure of the adapter circuit 112 as described above, the contacts 441 and 442 are closed so that the tip and ring conductors extending to the local ticketing selector 116 are connected to each other through a circuit including the closed contacts 433, 521, and 411, a pair of normally closed contacts 763 on the first digit over one relay 760, the wiper 701 in its normal home position, and the closed contacts 523, 437, and 442. It will be noted that the above described circuit includes the contacts 411 controlled by the second pulsing relay 410 so that, when this relay is first operated incident to the first line break, the contacts 411 are opened to disconnect the tip and ring conductors extending to the local ticketing selector 116, thereby providing a single line break in the selector 116 representing a dialed digit "1." The first operation of the second counting relay 410, in closing the contacts 417, also supplies ground to a pair of normally closed contacts 753 on the first digit one relay 750 to partially operate the two-step relay 750 so that a pair of preliminary make type contacts 751 are closed, thereby forwarding the ground provided at the closed contacts 753 to the left hand terminal of the upper winding of the relay 750, as shown in FIG. 7 of the drawings. The right hand terminal of this winding is connected to main ground at the closed contacts 1041 so that the first digit one relay 750 does not fully operate at this time.

In the interdigit intervals following the single line break representing the dialed digit "1," the second pulsing relay 410 releases to close the contacts 411 and to open the contacts 417, among others. The closure of the contacts 411 again connects the tip and ring conductors extending to the local ticketing selector 116, thereby to terminate the first line break transmitted thereto. In response to this single pulse, the selector 116 advances the wipers of the switch therein to the first contact level and thereafter searches over the contacts in this level to seize an idle trunk circuit, such as the trunk circuit 132, extending to the manual equipment 134 in the remote office 70. The opening of the contacts 417 removes the ground shunt provided around the upper operating winding of the first digit one relay 750 so that this relay fully operates to close a pair of contacts 752 and to open the contacts 753. Further, the opening of the contacts 417 releases the mark relays 570 and 600 so that the energization of the drive magnet 900 is terminated to permit the magnetic tape in the trunk recorder to be advanced a single step following the single mark pulse representing the dialed digit "1."

The opening of the contacts 417 further interrupts the operating circuit for the shunt relay 470 so that this relay releases to open the contacts 1133 and to close the contacts 472, among others. Closing the contacts 472 operates the space relays 610 and 620 so that a space pulse is recorded on the magnetic tape in the trunk recorder 114 immediately following the single mark pulse representing the dialed digit "1" and so that the magnet 900 is energized. The opening of the contacts 1132 releases the relay 1120 to release the relays 610 and 620 so that the magnet 900 is released to advance the tape a single step following the space pulse. The opening of the contacts 1133 interrupts the above described energizing circuit for the motor magnet 1401 so that the stepping switch 1400 is advanced to its first stepping position. In the first stepping position, the wiper 701 again completes the above described circuit extending through the closed contacts 411 for connecting the tip and ring conductors of the local ticketing selector 116. The movement of the wiper 702 to its first stepping position prepares a circuit for operating the cut-through relay 430. This circuit extends from the winding of the relay 430 through a pair of closed contacts 762 on the first digit over one relay 760, the first contact in the bank associated with the wiper 702, and the wiper 702 to the sleeve lead of the local ticketing selector 116.

Accordingly, when the call is answered at the manual equipment 134, ground is applied to the sleeve lead in the local ticketing selector 116 to complete an operating circuit for the cut-through relay which in operating opens the contacts 432, 433, 435, and 437 and closes the contacts 431, 434, 436, and 438. The closure of the contacts 438 completes a holding circuit for the cut-through relay 430 extending directly to the sleeve lead of the local ticketing selector 116 which is shunted around the wiper 702. The closure of the preliminary make contacts 434 completes a holding circuit for the calling bridge relay 420 extending to the closed contacts 341 to maintain this bridge relay operated. The operations of the contacts 431, 432, 435, and 436 which form make-before-break contact arrangements connects the incoming tip and ring conductors of the adaptor 112 with the tip and ring conductors extending to the local ticketing selector 116. The opening of the contacts 433 and 437 interrupts at an additional point the above described pulsing circuit.

The adaptor circuit 112 remains in this condition during the toll call and until the connection is released in the manual equipment 134 incident to which holding ground is removed from the sleeve lead so that the cut-through relay 430 is released to restore the contacts controlled thereby to their normal condition. When the call is released at the calling substation A, the calling bridge relay 420 is released to sequentially release the release delay relay 370 and the second release delay relay 1100. In releasing, the relay 1100 closes the contacts 1102 to complete a homing circuit for the stepping switch 1400 controlled by the wiper 1420 and the interrupter springs 1402 in the stepping switch 1400. This homing or self interrupting circuit advances the wipers of the stepping switch from the first stepping position to their normal home position. Incident to moving to its home position, the wipers 705 and 706 cause the recording of an additional space pulse on the magnetic tape in the trunk recorder 114 immediately following the space pulse recorded thereon following the dialing of the digit "1," and these two wipers also record an end-of-call signal on the magnetic tape. Further, in the nineteenth to twenty-third stepping positions of the wiper 1420, the pulse generator relay 1120 is intermittently operated and released to pulse the drive magnet 900 in the trunk recorder 114 so that the magnetic tape therein is advanced to space the items of information pertaining to the toll call placed to the manual office 70 from the items of information which are to be recorded pertaining to the next toll call. Incident to the release of the release delay relays 370 and 1100, holding ground is momentarily removed from the sleeve lead to permit the extended switch train to be released and thereafter ground from the off-normal contacts 711 is applied to the sleeve terminal to maintain the adapter circuit 112 busy until such time as the stepping switch 1400 is returned to its normal home position. When the switch 1400 returns to home, the off-normal springs 711 are opened to remove ground from the sleeve lead and thus return the adapter 112 to a condition in which it is capable of being utilized in completing and recording items of information pertaining to subsequent toll calls.

Since the end-of-call or COE signal immediately follows the single mark pulse representing the dialed digit "1" utilized to obtain access to the remote manual office 70 during a recording or playback operation, the sensing of the end-of-call signal with only a single digit stored in the registers associated wtih the recording equipment causes the registers to be cleared and thus prevents the recording of the single item of information pertaining to the manual call.

It will be noted that the control circuit including the first digit one relay 750 and the first digit over one relay 760 permits the repeating of the first dialed digit to the local ticketing selector 116 so that the selector 116 can be operated to seize the trunk circuit 132 extending to the manual remote office 70. However, on calls which are to be automatically ticketed, the first dialed digit is not an access digit but rather is a first calling office code digit, and this digit should not be repeated to the local ticketing selector 116. However, the first office code digit always has a value greater than "1," and the control circuit including the relays 750 and 760 is adapted to interrupt the digit repeating circuit extending to the selector 116 in the event that the value of the first dialed digit is greater than "1." More specifically, assuming that the adapter circuit 112 is seized, as described above, so that the release delay relays 370 and 1100 are sequentially operated, the first line break transmitted to the calling bridge relay 420 sequentially operates and releases the first and second pulsing relays 400 and 410 so that the first digit one relay 750 is fully operated.

The closure of the contacts 752 incident to full operation of the relay 750 prepares an operating circuit for the first digit over one relay 760. Accordingly, when a second line break is applied to the calling bridge relay 420 to cause the sequential operation of the relays 400 and 410, the opening of the contacts 411 transmits a second line break to the local ticketing selector 116, and the closure of the contacts 417 completes a preliminary operating circuit for the first digit over one relay 760 so that this relay partially operates to close a pair of preliminary make contacts 761, thus providing a ground shunt on both sides of the upper winding of the relay 760. When the second pulsing relay 410 releases, the ground shunt is removed from the relay 760 so that this relay fully operates to open the contacts 762 and 763. The opening of the contacts 763 interrupts the above described digit repeating circuit controlled by the contacts 411 so that additional pulses are not repeated to the local ticketing selector 116. The opening of the contacts 762 interrupts the above described circuit extending to the first contact in the bank engaged by the wiper 702 to prevent the cut-through relay 430 from being operated when the stepping switch 1400 is in its first stepping position.

Accordingly, the provision of two or more pulses in the first digit dialed into the adapter circuit 112 operates the relay 760 to prevent the repeating of digits to the local ticketing selector 116 until such time as the stepping switch 1400 has been advanced to its seventh stepping position and further prevents the operation of the cut-through relay 430 until such time as answering supervisory signals are received with the stepping switch 1400 in its fourteenth position. However, it should be noted that prior to the operation of the relay 760 to interrupt the above described circuits, two pulses have been transmitted to the local ticketing selector 116. These two pulses will cause the ticketing selector 116 to attempt to move its wipers to the second contact level. However, the opening of the contacts 763 disconnects the tip and ring conductors extending to the selector 116 before the selector 116 has an opportunity to complete a connection to an idle circuit located in the second contact level, and, accordingly, the selector 116 returns to a normal condition. The tip and ring conductors of the selector 116 are not again connected until such time as the wiper 701 is advanced to the second stepping position and at this time a shunt is provided around the pulsing contacts 411 so that additional digits representing the designation of the calling substation are not repeated to the selector 116.

The relays 750 and 760, which are held operated over the main ground provided at the closed contacts 1041, are released in response to release of the release delay relay 370 when the connection is released.

*Operation of the Adapter 112 During a Normal Playback Operation*

On a normal playback operation, the adapter 112 is seized by the playback control circuit 178 and the magnetic tape in the trunk recorder 114 is returned to its normal home position in which the items of information pertaining to the first call stored on the tape are positioned adjacent the transducing heads 910, 920, and 930. The adapter circuit 112 incident to seizure connects these heads to circuits extending through the playback control circuit 178 to the recording facilities 180 so that the circuits 178 and 180 control periodically arrested continuous movement of the magnetic tape in the recorder 114 to transmit the stored items of information to the recording facilities 180 so that permanent records thereof are provided. Incident to transmission of this information, the erase head 930 is energized to erase the recorded information to condition the magnetic tape in the trunk recorder for receiving the items of information pertaining to subsequently placed calls.

To initiate normal playback operation, the recording facilities 180 place the playback control circuit 178 in operation so that the switching means 178a associated therewith seizes one of the adapters 112, 146, or 168. Assuming that the adapter 112 is seized, the switching means 178a performs a busy ground test over a conductor 241 which extends to the playback control circuit 178 through a cable 240. The conductor 241 in the adapter 112 is normally connected to a conductor 242 through a plurality of normally closed contacts 213, 301, 232, and 224a. The conductor 242 is normally connected to an open circuit in the playback control circuit 178, and the absence of ground on the conductor 241 operates the playback control circuit 178 to terminate stepping operation of the switch and to supply ground to a conductor 243 to complete the operating circuit for a playback attempt relay 300. The operation of this relay closes a plurality of contacts 302, 303, and 304 and opens the contacts 301. The closure of the contacts 302 extends holding ground from a pair of closed and grounded contacts 233 to the conductor 241 to provide a source of holding ground for the playback control circuit 178 to prevent further movement of the switch 178a. If the adapter circuit 112 is in a normal condition, as evidenced by the closed off-normal contacts 713 of the stepping switch 1400, the closure of the contacts 304 completes an operating circuit for a clutch switch relay 200 extending to ground through the closed contacts 304, 444, and 713. The operation of the clutch switch relay closes a plurality of contacts 201, 203, 204, 206, 207, 208, 971, 972, 974, 975, 978, and 979 and opens a plurality of contacts 202, 205, 209, 973, 976, and 977. The closure of the contacts completes a holding circuit for the clutch switch relay extending through the closed contacts 304.

The operation of the clutch switch relay 200 connects the transducing heads in the trunk recorder 114 with the playback control circuits 178. More specifically, the closure of the contacts 978 and 972 connects both sides of the space pulse head 910 to the playback control circuit 178 through the cable 240. The closure of the contacts 204 and 975 connects both sides of the mark pulse head 920 to the playback control circuit 178 through the cable 240. The closure of the contacts 971 connects the erase head 930 with the playback control circuit 178 through the cable 240.

The closure of the contacts 208 completes an operating circuit for a home relay 220 which extends from a pair of grounded and closed contacts 215 through a plurality of closed contacts 208, 237, 314, and 446. Operation of the home relay 220 closes a plurality of contacts 221, 223, 224, 225, 227 and 981 and opens a plurality of contacts 222, 224a, and 226. The closure of the contacts 223 extends ground through the closed contacts 331, 433, and 501 to the sleeve terminal of the adapter 112 to mark the adapter 112 as being in a busy condition due to the playback operation. The closure of the contacts 981 applies ground from a pair of closed and grounded contact 1011 to a terminal 996 which is connected to a motor speed control circuit of the type described in detail in the above identified copending Morris et al. application. The application of ground to the terminal 996 causes the operation of a drive motor associated with the group of trunk recorders, including the recorder 114, to be operated at a high speed.

The closure of the contacts 225 and the closure of the contacts 203 extends the ground provided at the closed off-normal contacts 713 through a pair of normally closed contacts 234 to energize the clutch magnet 940. Energization of the clutch magnet 940 opens the contacts 941 to prevent inadvertent operation of the ratchet drive magnet 900 and also interposes an idler roller between the drive shaft driven by the motor, which is now operating at a high speed, and a capstan and pinch roller drive mechanism. Rendering the capstan drive mechanism effective advances the magnetic tape at a high speed toward its home position.

When the magnetic tape approaches its home position, a first perforation or conductive portion is sensed by the closure of the tape contacts 950 to momentarily operate the tape contact relay 1020 so that a pair of contacts 351 are closed. Closure of the contacts 351 extends ground through a plurality of closed contacts 344 and 335 to partially operate a two-step first perforation counting relay 330 so that a pair of preliminary make type contacts 333 are closed. When the contacts 351 are opened to remove the ground shunt, the two-step relay 330 operates fully to open a plurality of contacts 331 and 335 and to close a plurality of contacts 332 and 334. The closure of the contacts 334 prepares an operating circuit for a second perforation counting relay 340, and opening the contacts 331 opens the above described path for applying ground to the sleeve lead of the adapter 112. However, the concurrent closure of the contacts 332 again applies ground to the sleeve terminal.

Movement of the magnetic tape continues until such time as the second perforation is sensed to again momentarily operate the tape contact relay 1020 to close the contact 351. Closure of the contacts 351 partially operates the two-step relay 340 so that a pair of preliminary make contacts 342 are closed to prepare a full operating and holding circuit for the relay 340. When the contacts 351 are opened to remove the ground shunt, the relay 340 operates fully to open a plurality of contacts 341 and 344 and to close a plurality of contacts 342 and 343. The closure of the contacts 343 prepares an operatnig circuit for the third perforation counting relay 320.

When the third perforation in the magnetic tape is sensed, thus indicating that the tape has been returned to its effective beginning or normal home position, the tape contact relay 1020 is again momentarily operated to open and close the contacts 351. This causes the preliminary and then full operation of the third perforation relay 320 so that a plurality of contacts 321 and 1012 are closed and a plurality of contacts 322, 323, 324, 325, and 1011 are opened. The closure of the contacts 321, which are of a preliminary make type, completes a holding and full operating circuit for the relay 320 extending to the closed and grounded contacts 315 and 224. The opening of the contacts 323 removes ground from the clutch magnet 940 so that the magnetic tape in the trunk recorder 114 is no longer advanced. The opening of the contacts 1011 removes ground from the terminal 996 so that the drive motor is now operated at a lower speed suitable for transducing operations.

The closure of the contacts 1012 completes an obvious operating circuit for a playback relay 1000 so that this relay operates to open a plurality of contacts 311, 312, 314, 315, and 1003 and to close a plurality of contacts 313, 1001, and 1002. The closure of the contacts 1001 completes a holding circuit for the playback relay 1000. The closure of the contacts 1002 completes an energizing circuit for the motor magnet 1401 of the stepping switch 1400. This circuit extends from the closed interrupter springs 1402 through the wiper 1420 and the closed contacts 1002 and 1102 to the operating winding of the magnet 1401. Operation of the magnet 1401 opens the interrupter springs 1402 so that the magnet 1401 is released and the wipers of the switch 1400 step to their first position.

The closure of the contacts 313 also forwards ground from the closed contacts 215 through the closed contacts 208, 313, and 207 to a playback start conductor 244 which extends to the playback control circuit 178 through the cable 240. This operates the playback control circuit 178 to supply ground over the cable 240 to the closed contacts 971 so that the erase head 930 is energized to erase the information recorded on the magnetic tape in the trunk recorder 114 when movement of the tape is again initiated under the control of the playback control circuit 178 and the recording facilities 180.

The opening of the contacts 314 interrupts the operating circuit for the home relay 220 so that this relay releases to restore the contacts controlled thereby to their normal condition. The opening of the contacts 224, together with the opening of the contacts 315, interrupts the holding circuit for the perforation counting relays 320, 330, and 340 so that all of these relays release to restore the contacts controlled thereby to their normal condition. The release of the third perforation counting relay 320 to close the contacts 324 and the release of the home relay 220 to close the contacts 226 completes an operating circuit for a clutch switch slave relay 230 extending to ground through the closed contacts 226, 324, 313, 208, and 215.

Operation of the clutch switch slave relay closes a plurality of contacts 231, 235, 236, and 991 and opens a plurality of contacts 232, 233, 234, and 237. The closure of the contacts 231 extends holding ground from the closed contacts 201 to the perforation counting relays 320, 330, and 340. The closure of the contacts 236 completes the holding circuit for the clutch switch slave relay 230 extending to ground at the closed contacts 215 through the closed contacts 208. The closure of the contacts 991 provides an additional source of holding ground for the playback relay 100, and the opening of the contacts 237 interrupts, at an additional point, the operating circuit for the home relay 220. The opening of the contacts 233 removes one source of holding ground from the conductor 241, but holding ground therefor is provided at the contacts 322 which are closed by the release of the third perforation counting relay 320. The opening of the contacts 234 interrupts, at an additional point, the circuit for applying ground to the clutch magnet 940, and the concurrent closure of the contacts 235 connects the clutch magnet 940 with a conductor 245 extending through the cable 240 to the playback control circuit 178 so that subsequent energization of the clutch magnet 940 and, accordingly, control over movement of the magnetic tape in the trunk recorder 114 is now transferred to the playback control circuit 178 and the recording facilities 180.

The recording facilities 180 and the playback control circuit 178 now apply intermittent ground to the clutch magnet 940 so that the magnet tape is advanced to transmit all of the items pertaining to each toll call, following which movement of the tape is terminated until such time as the transmitted items have been recorded by the recording facilities. When the last items of information on the magnetic tape in the trunk recorder 114 have been transmitted, the recording facilities 180 operate the motor speed control circuit so that the magnetic tape in the trunk recorder 114 is advanced at high speeds. This advance continues until the first perforation is sensed so that the contacts 950 are closed to again momentarily operate the tape contact relay 1020 whereby the contacts 351 are closed and opened. This operates the first perforation relay 330 which prepares an operating path for the second perforation relay 340. When the next perforation is sensed, the tape contact relay 1020 is momentarily operated to operate the second perforation relay 340, the operation of which prepares an operating path for the third perforation relay 320. When the third perforation in the tape is reached, thus indicating the effective end or beginning of the magnetic tape, the tape contact relay 1020 is again operated to operate the third perforation relay 320.

The operation of the relay 320 closes the contacts 321 and 1012 and opens the contacts 322, 323, 324, 326, and 1011. The opening of the contacts 322 removes the last source of holding ground from the conductor 241 extending to the playback control circuit so that this circuit removes ground from the conductor 243, thereby releasing the playback attempt relay 300 to restore the contacts controlled thereby to their normal condition. Opening the contacts 304 incident to release of the relay 300 interrupts the above described holding circuit for the clutch relay 200 so that this relay releases to restore the contacts controlled thereby to their normal condition. Incident to release of the clutch switch relay 200, control over energization of the space pulse head 910, the mark pulse head 920, and the erase head 930 is restored to the adapter circuit 112. Further, in releasing, the clutch switch relay 200 opens the contacts 201 so that holding ground is removed from the perforation relays so that the relays 320, 330, and 340 are released to restore the contacts controlled thereby to their normal condition. The release of the relay 200 also opens the contacts 208 so that holding ground is removed from the operating winding of the clutch switch slave relay 230 so that this relay releases. In releasing, the clutch switch slave relay opens the contacts 991 to interrupt the holding circuit for the playback relay 1000 so that this relay releases to close the contacts 1003, among others. The closure of the contacts 1003 completes an energizing circuit for the motor magnet 1401 of the stepping switch 1400 including the ground provided at the closed interrupter springs 1402 and the wiper 1420 which is positioned in engagement with the first contact in the contact bank associated therewith. Energization of the motor maget 1401 opens the interrupter springs 1402 so that the magnet 1401 is released and the stepping switch 1400 advances to the second stepping position.

In being advanced to the second stepping position, a plurality of self interrupting circuits for the motor magnet 1401 controlled by the interrupter springs 1402 are completed so that the stepping switch 1400 is advanced to its sixteenth stepping position in which a space pulse is recorded on the magnetic tape in the trunk recorder 1400. Thereafter, the self interrupting circuit controlled by the spring 1402 advances the stepping switch 1400 to the seventeenth stepping position in which the pulse generator relay 1120 is momentarily operated to both pulse the drive magnet 900 to advance the magnetic tape a single step and to step the switch 1400 to its eighteenth stepping position in which the wipers 705 and 706 momentarily energize the space head 910 and the mark head 920 to record a preliminary COE or end-of-call signal on the magnetic tape. Thereafter, the pulse generator relay 1120 and the interrupter springs 1402 restore the stepping switch 1400 to its normal home position, and the pulse generator relay 1120 further pulses the drive magnet 900 five times to provide a measured run-off or advance of the magnetic tape in the trunk recorder 114 following the preliminary COE signal so as to space this signal from the items of information to be recorded on the tape in the trunk recorder 114 pertaining to the next toll call placed through the adapter circuit 112. When the stepping switch 1400 returns to its normal home position, the off-normal contacts 711 are opened to remove ground from the sleeve lead of the adapter 112 and thus permit the seizure of the adapter 112. In this condition, the adapter 112 is restored to its normal condition in which all of the relays therein are released, and the stepping switch 1400 is returned to its normal home position.

*Operation of the Adapter Circuit 112 on a Time Delayed Playback Operation*

As indicated above, it is desirable, in the event that the adapter 112 is engaged in recording items of information pertaining to a toll call when a normal playback operation is initiated, to cause the playback control circuit 178 to wait for a measured time interval of between six to eight minutes for the adapter circuit 112 to complete the recording of the items of information pertaining to the toll call and, accordingly, to become idle to permit its seizure and playback by the control circuit 178. Accordingly, when the playback control circuit 178 is placed in operation under the control of the recording facilities 180 as described above, ground is applied to the conductor 243 to operate the playback attempt relay 300 after the completion of the busy test over the conductor 241. The operation of this relay closes the contacts 302, 303, and 304 and opens the contacts 301. The closure of the contacts 302 against provides holding ground for the conductor 241 from either of the closed contacts 322 or 233. The closure of the contacts 304 again prepares the operating circuit for the clutch switch relay 200, but, inasmuch as items of information are being recorded by the adapter 112 at this time, the relay 200 cannot be operated since the operation of this relay transfers control over the transducing heads in the trunk recorder 114 to the playback control circuit 178. Accordingly, when the contacts 304 are closed, if the adapter 112 is engaged in recording items of information pertaining to a toll call, the second release delay relay 1100 is in an operated condition, as described above, so that the contacts 444 are open to interrupt the above described circuit for operating the clutch switch relay 200.

To provide a means for indicating to the playback control circuit 178 that the adapter 112 is engaged in recording items of information pertaining to a toll call, the closure of the contacts 303 connects a playback delay lead 246, which extends to the control circuit 178 through the cable 240, through the closed contacts 311 and 303 to the off-normal contacts 712 controlled by the stepping switch 1400. If the adapter circuit 112 is in use, the contacts 712 are closed to indicate the off-normal condition of the stepping switch 1400 and, accordingly, the above described circuit applies ground to the playback delay conductor 246. The application of ground to this conductor advises the playback control circuit 178 that a playback operation cannot be immediately initiated and also initiates the operation of the time delay circuit in the playback control circuit 178 during which the playback control circuit waits for the adapter 112 to become idle.

Assuming that the adapter 112 becomes idle within the waiting period of the playback control circuit 178, the second release delay relay 1100 is released to close the contacts 444. The closure of the contacts 444 prepares the operating circuit for the clutch switch relay 200, which circuit is not completed inasmuch as the off-normal contacts 712 remain open until the stepping switch 1400 is returned to its normal home position following the release of the second release delay relay 1100. Accordingly, when the stepping switch 1400 completes the control operations of recording a COE signal on the tape in the trunk recorder 114 and advancing the magnetic tape through a measured run-off, the contacts 713 are opened and the contacts 712 are closed. The closure of the contacts 712 operates the clutch switch relay 200, and the opening of the contacts 713 removes ground from the playback delay conductor 246 to advise the playback control circuit 178 that a normal playback operation may now be initiated. The operation of the clutch switch relay 200 prepares the adapter circuit 112 for operation in a manner identical to that described above in conjunction with a normal playback operation.

It is desirable to permit the playback control circuit 178 to wait for the adapter 112 to become idle only if the adapter is engaged in recording items of information pertaining to a toll call. Accordingly, if the adapter 112 has been placed in an alarm condition by the operation of an alarm relay 960 to close a pair of contacts 214, ground is provided on the conductor 241 during the busy test incident to seizure of the adapter 112, and the provision of ground on the conductor 241 causes the stepping switch 178a associated with the playback control circuit 178 to immediately advance to the contacts to which the next adapter circuit is connected without attempting to complete the seizure of the adapter circuit 112. In a similar manner, if the adapter 112 is busied out by the operation of a busy key 390 to close a pair of contacts 391, ground is applied to the conductor 241 to again prevent seizure of the adapter 112.

*Operation of the Adapter Circuit 112 During an Emergency Playback Operation*

When the trunk recorder 114 associated with the adapter circuit 112 becomes filled with items of information during the recording of data pertaining to a toll call, the adapter circuit 112 is placed in a busy condition so that, upon release of the call, the adapter circuit 112 cannot be seized. Thereafter, the adapter circuit 112 remains in a busy condition until it is played back during a normal playback operation or else manually played back under the control of a playback key 250.

More specifically, if, during the recording of items of information pertaining to a toll call, the effective end of the loop of magnetic tape in the trunk recorder 114 is approached, the tape contact relay 1020 is momentarily operated by the tape contacts 950 so that the first perforation relay 330 is operated as described above. In operating, the relay 330 closes a pair of contacts 332 to extend busy ground through the contacts 443 which are now open due to the operated condition of the second release delay relay 1100. The relay 330 is fully operated and is held operated by the ground provided at the normally closed contacts 315 controlled by the playback relay 1000. Accordingly, when the connection is released so that the second release delay relay 1100 releases to close the contacts 443, the extended switch train is released by the prior release of the release delay relay 370, and the closure of the contacts 443 extends ground from the closed contacts 332 to mark the adapter circuit 112 as busy and thereby prevents seizure of this circuit when the magnetic tape in the trunk recorder 114 is filled with items of information.

In the event that the call is extended long enough for the second perforation to be sensed so that the tape contact relay 1020 is again momentarily operated to operate the second perforation relay 340, the operation of this relay opens the contacts 341 to break the circuit for the calling bridge relay 420. The release of this relay forcibly releases the connection and thus insures that items of information are not recorded on the magnetic tape beyond the point at which the second perforation is sensed.

Incident to release of the adapter 112 due either to the forcible disconnect or due to voluntary release of the connection prior to the second operation of the tape contact relay 1020, the stepping switch 1400 is returned home over the circuit described above so that a COE signal is recorded on the magnetic tape in the trunk recorder 114, and this magnetic tape is spaced out as described above.

When the adapter circuit 112 is placed in this busy condition, it remains until such time as it is seized during a normal playback operation during which the items of information stored on the magnetic tape in the trunk recorder 114 are erased to condition the recorder 114 for receiving items of information pertaining to subsequently placed calls. However, in the event that it is desired to clear out the trunk recorder 114 before a normal playback operation so as to place the adapter 112 in service again, the manually operate playback key 250 is provided.

Operation of this key closes a pair of contacts 251 so that the home relay 220 is operated over a circuit including the closed contacts 251, 209, 325, and 215. Closure of the contacts 224, in response to operation of the home relay 220, provides an additional source of holding ground for the operated ones of the relays 320, 330, and 340. The closure of the contacts 225 extends ground to the clutch magnet 940 so that movement of the magnetic tape is initiated, the closure of the contacts 981 providing ground to the terminal 996 to cause operation of the drive motor at a high speed. The closure of the contacts 227 provides a holding circuit for the home relay 220 shunted around the contacts 325 controlled by the third perforation relay 320. The closure of the contacts 221 forwards ground to an emergency start conductor 247 which extends to the playback control circuit 178 through the cable 240. The opening of the contacts 224a disconnects a conductor 242 from the conductor 241 to mark the adapter circuit 112 as the one requiring an emergency playback operation.

The application of ground to the conductor 247 places the recording facilities 180 and the playback control circuit 178 in operation to search for and seize the adapter 112 which is in an emergency playback condition. Incident to these operations, ground is placed on the conductor 242 by the playback control circuit 178 so that the busy test circuit in the playback control circuit 178 causes the switch 178a to step by all of the adapter circuits except the circuit 112 since the open contacts 224a prevent the extension of ground to only the terminals individual to the circuit 112. In response to seizure of this adapter, ground is again applied to the lead 243 to operate the playback attempt relay 300. The operation of this relay causes the playback of information stored in the trunk recorder 114 substantially as described above in conjunction with a normal playback operation, and, incident to this normal playback operation, the relays 330 and 340 are released in response to the magnetic tape in the trunk recorder 114 being advanced to its home position. The release of the relay 330 removes the busy ground provided at the closed contacts 332, but busy ground is maintained thereat under the control of the home relay 220 or the stepping switch 1400, as described above. Following the completion of the playback operation, the adapter circuit 112 is released, and the playback control circuit 178 returns to a normal condition without seizing other adapter circuits. Also, at the end of the emergency playback operation, the switch 1400 again records the preliminary COE signal on the tape and spaces the tape out, as described above.

The adapter circuit 112 further includes the alarm relay 960 which is operated in the event of abnormal operating conditions being encountered incident to the seizure of the adapter circuit 112. In the event that these abnormal conditions are encountered, ground is forwarded by the playback control circuit 178 over a cable 997 so that, if the clutch switch relay 200 has been operated to close the contacts 974, the alarm relay 960 is operated to open a plurality of contacts 211, 213, and 215 and to close a plurality of contacts 212, 214, 961, and 962. The closure of the contacts 962 completes a holding circuit for the alarm relay extending to a pair of normally closed and grounded contacts 996 on an alarm release key 995. The closure of the contacts 961 applies resistance ground to a conductor 998 which extends through the cable 240 to the playback control circuit 178. If two adapter circuits are placed in an alarm condition incident to a single cycle of operation of the playback control circuit 178 so that two resistance grounds in parallel are applied to the conductor 998, the playback control circuit 178 is taken out of operation. However, the application of only one source of resistance ground to the conductor 998 does not terminate operation of the playback control circuit 178. The closure of the contacts 212 supplies ground through the closed contacts 222 and 331 to render the adapter circuit 112 busy, thereby to prevent seizure thereof.

The closure of the contacts 214 connects ground from the closed contacts 202 to the seizure conductor 241 so that the adapter 112 is marked as busy on the banks of the switch 178a to prevent its seizure. Further, if the playback control circuit 178 is holding over the ground provided on the conductor 241 and the clutch switch relay 200 is operated, the closure of the contacts 214 merely prepares a circuit for marking the adapter 112 as busy and the opening of the contacts 213 removes holding ground so that the switching means 178a is advanced in an attempt to seize the next idle adapter circuit. Incident to the release of the adapter circuit due to the removal of ground by the opening of the contacts 215, the clutch switch relay 200 releases to close the contacts 202 and, thereafter, the adapter 112 is marked as busy to prevent its seizure by the switch means 178a. The alarm relay remains operated until such time as the release key 995 is operated to open the contacts 996.

VERIFYING ADAPTER 144

The verifying adapter 144, which is utilized in extending toll calls from the remote office 50 to other offices, such as the remote office 60 or the local office 40, provides means for repeating digits dialed from a calling substation, such as the substation C, over the two-way trunk circuits 122 and 120 to the recording adapter 146 to permit these digits to be recorded in the trunk recorder 148. However, although information is not stored by the adapter 144, this adapter controls the operation of the verifying connector 152 to determine whether or not the digits dialed comprise the designation of the calling substation.

When a call is extended through the line circuit 136, the line finder 140, and the local selector 142 to the adapter 144, the calling bridge 1820 is operated over a circuit including the closed contacts 1811 and 1813 to close a plurality of contacts 1821 and 1822 and to open a pair of contacts 1823. The closure of the contacts 1821 connects the tip and ring conductors extending to the two-way trunk circuit 122, thereby to indicate to the recording adapter 146 that the verifying adapter 144 has been seized. The closure of the contacts 1822 completes an operating circuit extending through a rectifier for a release delay relay 1830 so that this relay operates to close a plurality of contacts 1831, 1832, 1833, and 1834.

The closure of the contacts 1831 applies ground to the sleeve lead of the local selector 142 through the upper winding of the busy relay 1800 and through a shunting circuit including a plurality of normally closed contacts 1945 and 1954. The provision of the shunting circuit for the upper winding of the busy relay 1800 prevents the operation thereof due to the grounded battery connected to the sleeve lead by the operated switching and relay elements in the extended switch train. The closure of the contacts 1832 provides a source of holding ground for the adapter 144. The closure of the contacts 1833 prepares an operating circuit for a shunt relay 1900, and the closure of the contacts 1834 provides an additional source of holding ground for the adapter 144. The operation of the release delay relay 1830 completes the preparation of the adapter 144 for receiving dialed information from the calling substation C.

The first digit dialed by the subscriber at the station C is the digit "9" representing the first office code character "W." The first line break incident to dialing this digit releases the calling bridge relay so that the contacts 1821 and 1822 are opened and the contacts 1823 closed. The opening of the contacts 1821 transmits the line break to the recording adapter 146. The closure of the contacts 1823 completes an operating circuit for the shunt relay 1900 extending through the closed contacts 1833, 1946, 1817, and 1808. The operation of the shunt relay opens a plurality of contacts 1901, 1902, 1905, and 1907 and closes a plurality of contacts 1903, 1904, 1906, and 1908.

The closure of the contacts 1908 extends ground through a plurality of closed contacts 2105, 2115, and 2123 to the lower operating winding of a two-step first office code relay 2120 so that this relay partially operates to close a pair of preliminary make type contacts 2121. The closure of these contacts extends ground from the closed contacts 1832 to provide a full operating and holding circuit for this relay when the ground shunt provided at the closed contacts 2123 is removed. The closure of the contacts 1903 connects the operating winding of a pulsing relay 1910 to the open contacts 1822 controlled by the calling bridge relay 1820, and the closure of the contacts 1904 extends main ground from the closed contacts 1834 to the open contacts 1902. The closure of the contacts 1906 completes an operating circuit for a slow-to-release verification test relay 1950 so that this relay operates to close a plurality of contacts 1951, 1955, and 1956 and to open a plurality of contacts 1952, 1953, and 1954. The opening of the contacts 1954 removes one of the shunts around the upper winding of the busy relay 1800, but one shunt remains therefor through the closed contacts 1945. The remaining contact operations produced by the operation of the verification test relay 1950 perform no useful function at this time.

When the line is again closed at the end of the first pulse, the calling bridge relay 1820 is again operated to close the contacts 1821 and 1822 and to open the contacts 1823. The opening of the contacts 1823 produces no useful function inasmuch as the shunt relay 1900 is slow-to-release. The closure of the contacts 1821 again closes the circuit including the tip and ring conductors extending to the two-way trunk circuit to terminate the first line break in the adapter 146. The closure of the contacts 1822 completes an operating circuit for the pulsing relay 1910 extending through the closed contacts 1903 so that the relay 1910 operates to open a pair of contacts 1912 and to close a pair of contacts 1911.

The closure of the contacts 1911 extends ground from the closed contacts 1834 through the closed contacts 1955 and a series of contacts controlled by a plurality of counting relays 2000, 2010, and 2020 to energize the operating winding of a first counting relay 2030, thereby operating this relay. The counting relays 2000, 2010, 2020, and 2030 together with a two-step five relay 2040, a two-step nine relay 2050, and a five assist relay 2060 are similar to the relays 530, 540, 550, 560, 640, 650, and 660, the operation of which is described in detail above in conjunction with the description of the operation of the adapter 112. Accordingly, the remaining eight pulses forming the dialed digit "9" representing the office code character "W" operate the relays 2000, 2010, 2020, 2030, 2040, 2050, and 2060 so that, at the end of the ninth pulse, the relays 2030, 2040, 2050, and 2060 are operated to provide a marking condition representing the dialed digit "9," and this digit has been repeated to the adapter 146 for storage in the trunk recorder 148. This path is provided by a pair of closed contacts 2051 and a pair of open contacts 2030 controlled by the nine relay 2050 and the first counting relay 2030, respectively. This marking condition is utilized to determine the accuracy of the dialing of the first office code digit in the designation of the calling substation C.

In the interdigit interval following the dialing of the first office code digit, the shunt relay 1900 releases to restore the contacts controlled thereby to their normal condition. The closure of the contacts 1902 completes a holding circuit for the pulsing relay 1910, which remains operated following the last line break in the group of pulses representing the dialed digit "9," extending through the closed contacts 1955 to ground at the closed contacts 1834. The opening of the contacts 1902 interrupts the above described operating path for the pulsing relay 1910, the contacts 1903 opening following the closing of the contacts 1902. The opening of the contacts 1908 removes the shunting ground from the partially operated first office code digit relay 2120 so that this relay fully operates to close a plurality of contacts 2121a and 2122 and to open the contacts 2123. The closure of the contacts 2122 prepares an operating circuit for a second office code digit relay 2110. The opening of the contacts 1906 interrupts the operating circuit for the verification test relay 1950, but this relay does not release at this time due to the slow-to-release characteristic thereof. The closure of the contacts 1901 prepares a test circuit for determining the accuracy of the dialing of the first office code digit of the designation of the calling substation C.

More specifically, the lower operating winding of the busy relay 1800 is connected through the closed contacts 1951, 1901, 2102, 2112, and 2051 to the contacts 2031. As described above, these contacts are open inasmuch as the first calling office code digit "9" has been correctly dialed. However, if a digit other than "9" had been dialed, the contacts 2031 would be closed, and the operating winding of the busy relay would further be connected through a plurality of closed contacts 1814a, 1922 and 1942 to the ground provided at the closed contacts 1832. This completes an operating circuit for the busy relay 1800 so that this relay operates to close a plurality of contacts 1801, 1803, 1804, and 1805 and to open a plurality of contacts 1802, 1806, 1807, 1808, and 1809.

The closure of the contacts 1801 completes a shunt around the pulsing contacts 1821 to prevent further digits from being repeated over the trunk circuits 122 and 120 to the recording adapter 146. The closure of the contacts 1803 connects a terminal 1841 to the tip conductor of the extended switch train so that busy tone is applied from the terminal 1821 to advise the subscriber at the calling substation C that the connection cannot be completed. The opening of the contacts 1802 releases the calling bridge relay 1820 and, accordingly, causes the release of the adapter 144. The closure of the contacts 1805 completes a holding circuit for the lower operating winding of the busy relay 1800 to maintain this relay operated until the adapter 144 has been released, as indicated by the release of the release delay relay 1830 to open the contacts 1832. The opening of the contacts 1806 prevents operation of the cut-through relay 1810 and, accordingly, prevents cutting through a talking path to the two-way trunk circuit 122. The opening of the contacts 1808 prevents further operation of the shunt relay 1900, and the opening of the contacts 1807 and 1809 prevents operation of the verification connector 152 under the control of the adapter 144. When the connection has been released, the release delay relay opens the contacts 1832 and thus releases the busy relay 1800 to restore the adapter to its normal condition.

However, assuming that the first office code digit of the designation of the calling substation C is correctly dialed so that the busy relay 1800 is not operated, after a suitable time delay, the verification test relay 1950 releases to open the contacts 1951, among others. The opening of the contacts 1951 interrupts the above described test path for the lower winding of the busy relay 1800 and thus ends the first verification test interval. The opening of the contacts 1955 removes holding ground from the pulsing relay 1910 so that this relay releases and further removes holding ground from the operated relays 2030, 2040, 2050, and 2060 in the counting circuit shown in FIG. 20 so that these relays release to condition them for operation under the control of the second calling office code digit.

When the second office code digit of the designation of the calling substation C is dialed, the shunt relay 1900 and the verification test relay 1950 are again operated and the pulsing relay 1910 is again intermittently operated in accordance with the four pulses representing the alphabetical character "I" so that, at the end of this pulsing, the fourth counting relay 2000 is operated to open a pair of contacts 2001. These four line breaks are also transmitted to the adapter circuit 146 for recording in the local office 40. Incident to the first operation of the shunt relay to close the contacts 1908, a preliminary operating circuit for a second office code digit relay 2110 extending through the closed contacts 2105, 2115, and 2122 is completed, and a full operating circuit for this relay is completed when the ground shunt is removed upon release of the shunt relay 1900 to open the contacts 1908. In partially and fully operating, the second office code digit relay 2110 closes a plurality of contacts 2111, 2113, and 2114 and opens a plurality of contacts 2111a, 2112, and 2115. The closure of the contacts 2114 prepares an operating circuit for a third office code digit relay 2100. The closure of the contacts 2113 provides a holding and full operating circuit for the relay 2110, and the opening of the contacts 2112 interrupts the above described path extending to the contacts 2051 and 2031 for checking the accuracy of the dialing of the first office code digit.

The release of the shunt relay 1900, in closing the contacts 1901, again completes the above described verification test path extending to the lower winding of the busy relay 1800. However, since only the fourth counting relay 2000 has been correctly operated to open the contacts 2001 in accordance with the dialed digit "4" representing the second office code character "I," the busy relay 1800 is not operated. At the end of the verification test interval, the verification test relay 1950 releases to remove holding ground from the operated counting relay 2000 so that this relay releases and to open the contacts 1951 to interrupt the above described test path extending to the busy relay 1800.

The subscriber at the calling substation C now dials the digit "3" comprising the third office code digit which intermittently operates and releases the calling bridge relay 1820 so that the shunt relay 1900 and the verification test relay 1950 are again sequentially operated. The intermittent operation of the calling bridge relay 1820 also repeats these pulses over the trunk circuits 122 and 120 to the recording adapter 146 and causes intermittent operation of the pulsing relay 1910, as described above, so that, at the end of the pulsing interval, only the third counting relay 2010 is in an operated condition to open a pair of contacts 2011. The original operation of the shunt relay 1900, in closing the contacts 1908, completes a preliminary operating circuit for the third office code digit relay 2100 extending through the closed contacts 2105 and 2114 so that this relay is operated to open a pair of preliminary break type contacts 2102 and to close a pair of preliminary make type contacts 2103.

The closure of the contacts 2103 prepares a full operating circuit for the relay 2100, and the opening of the contacts 2102 interrupts the previously described test path extending to the contacts 2001. When the shunt relay releases to open the contacts 1908, the relay 2100 fully operates to close a plurality of contacts 2101 and 2104 and to open a pair of contacts 2105. The closure of the contacts 2104 prepares an operating circuit for a station identify relay 1920. The closure of the contacts 2101 extends the above described test path for the lower winding of the busy relay 1800 to the contacts 2111 which are now open to prevent the operation of the busy relay 1800, thus providing an indication that the third office code digit has been correctly dialed by the subscriber at the substation C. After its slow-to-release interval, the verification test relay 1950 releases to open the contacts 1951 to interrupt, at an additional point, the test circuit for the busy relay 1800. Further, in releasing to open the contacts 1955, the relay 1950 releases the operated relay 2010 in the counting relay chain to close the contacts 2011 and to release the pulsing relay 1910.

The next digit dialed by the subscriber at the calling substation C is the thousands digit "4" of his directory number which functionally is a hundreds digit inasmuch as the substation C is on a terminal per line multiparty line so that the units digit of the directory number comprises a ringing digit. This thousands digit is utilized by the adapter 144 to select one of a group of first or second choice verification connectors in accordance with the value of this functional hundreds digit. Accordingly, when the digit "4" is dialed, the shunt relay 1900 and the verification test relay 1950 are again sequentially operated, the calling bridge relay 1820 repeats the dialed digit "4" to the recording adapter 146, and the pulsing relay 1910 selectively operates the counting relay circuit so that, at the end of the pulsing of the fourth digit, the fourth counting relay 2000 is operated to close a pair of contacts 2002. These closed contacts indicate that the verification connector 152 having access to calling lines in the hundreds groups "1"–"4" is to be seized and that a connection is to be completed through the closed contacts 2002 to the wiper of the connector 152 which is adjacent the contacts strapped to the calling line circuits in the "4" hundreds group.

Incident to the operation of the shunt relay 1900 at the beginning of the pulsing of the thousands digit "4" of the directory number, the closure of the contacts 1908 extends ground through the closed contacts 2104, 1956, and 1938 to the operating winding of the station identify relay 1920 so that this relay is operated. The operation of the station identify relay closes a plurality of contacts 1921, 1924, and 1925 and opens a plurality of contacts 1922 and 1923. The closure of the contacts 1921 prepares a circuit for operating the busy relay 1800 in the event that an idle verification connector is not available and that calls are to be blocked if a verification connector cannot be obtained. This circuit extends to a terminal 1878 which is connected to a terminal 1879 and then to the busy relay 1800 if the call is to be blocked. If the call is not to be blocked, the terminal 1878 is connected to a terminal 1881 and thus to the cut-through relay 1810. Either circuit, however, is interrupted at the contacts 1952 which are opened in response to the operation of the verification test relay 1950. The closure of the contacts 1925 completes a holding circuit for the station identify relay extending to the closed and grounded contacts 1834 through a pair of normally closed contacts 1938. The opening of the contacts 1922 prevents the application of ground to the contact field controlled by the counting relays for determining the accuracy of the dialing of the office code digits, and the closure of the contacts 1924 prepares a circuit for operating a switch relay 1930 in series with a connector release relay in a seized and idle verification connector.

More specifically, when the shunt relay 1900 is released in the interdigit interval following the dialing of the digit "4," the contacts 1901 again prepare the above described circuit for checking the office code digit in the designation of the calling substation C, but this circuit is interrupted at the open contacts 1922. The opening of the contacts 1908 interrupts the above described operating circuit for the station identify relay 1920, but this relay remains operated by virtue of the holding circuit extending through the closed contacts 1938, 1925, and 1834. The closure of the contacts 1907 completes an operating circuit for a second choice relay 2070, which serves the same function as the second choice relay 1340 in the adapter 112, this operating circuit extending to ground through the closed contacts 1938, 1925, and 1834. However, the relay 2070 is slow-to-operate and does not operate at this time.

The closure of the contacts 1905, in response to release of the shunt relay 1900, completes the seizure circuit for one of the first choice verification connectors 152 or 152a. Since the dialed thousands digit is "4," thus indicating that the calling line circuit 136 lies within the first four hundreds group to which the verification connector 152 has access, a circuit is completed from ground through the closed contacts 1834, 1905, 1924, the upper winding of the switch relay 1930, the closed contacts 1809, 2052, 2071, and 2061, and the operating winding of a connector release relay similar to the relay 800 in the verification connector 118 to grounded battery. This circuit operates the connector release relay in the verification connector 174 to perform the same functions described above in conjunction with the detailed description of the operation of the verification connector 118. The completion of this circuit also operates the switch relay 1930 so that a plurality of contacts 1932, 1933, 1935, 1936, and 1937 are closed and a plurality of contacts 1931, 1934, and 1938 are opened.

The opening of the contacts 1931 interrupts a path extending through the closed contacts 1921 to the contacts 1952 for applying ground to the terminal 1878. The terminal 1878 is connected to the terminal 1879 in the event that calls are to be blocked if a verifying connector is not available. Alternatively, the terminal 1878 is to be connected to the terminal 1881 in the event that a call can be completed when a verification connector is not available. Assuming that the terminals 1879 and 1878 are connected and that the switch relay 1930 fails to operate to open the contacts 1931, following the slow-to-release interval of the verification test relay 1950, the contacts 1952 are closed so that ground is extended from the closed contacts 1832 to the lower winding of the busy relay 1800, thereby operating this relay as described above to prevent further extension of the call and to prevent dialed digits from being repeated to the recording adapter 146. Alternatively, if there is a failure to obtain an idle connector within the verification test interval determined by the slow-to-release period of the relay 1950 and the terminals 1878 and 1881 are connected together, a circuit is completed for operating the cut-through relay 1810 so that the adapter 144 is effectively bypassed and subsequently dialed digits are repeated directly into the recording adapter 146 through the two-way trunk circuits 120 and 122. However, as described above, the first choice verification connector 152 is seized, and the contacts 1931 are opened within the slow-to-release interval of the verification test relay 1950 so that neither the cut-through relay 1810 or the busy relay 1800 are operated at this time.

The closure of the contacts 1933 provides a shunt around the upper operating winding of the busy relay 1800 in addition to the one provided by the closed contacts 1945. The closure of the contacts 1935 prepares a circuit for using the next two digits dialed at the calling substation C to control the operation of the X and Y magnets of the switch in the verification connector 152. More specifically, this circuit extends from the open contacts 1823 through the closed contacts 1833, 1935, 1816, 1807, and 2002, closed by operation of the fourth counting relay 2000, and a plurality of closed contacts 2062 and 2072 controlled by the released five assist relay 2060 and the released second choice relay 2070 to the verification connector 174. Accordingly, when the calling bridge relay 1820 is next released during the dialing of the hundreds and tens digits of the directory number of the calling substation C, this information is repeated to the verification connector 174 to control the operation of the X and Y magnets therein.

The closure of the contacts 1936 completes a holding circuit for the switch relay 1930 extending to ground at the closed contacts 1834, and the closure of the contacts 1937 completes a holding circuit for the verification test relay 1950. The opening of the contacts 1938 interrupts the above described operating circuit extending through the closed contacts 1907 to the winding of the second choice relay 2070 and thus the opening of the contact 1938 in response to operation of the switch relay 1930 signifies that the first choice verification connector 174 was available. However, if the connector 174 was busy and unavailable for seizure, the failure to open the contacts 1938 within the slow-to-operate period of the relay 2070 permits this relay to operate to transfer the paths prepared by the relays 2000, 2010, 2020, 2030, 2040, 2050, and 2060 from the verification connectors 152 and 152a to a second choice verification connector 2100.

In addition to interrupting the operating circuit for the second choice relay 2070, the opening of the contacts 1938 interrupts the operating circuit for the station identify relay 1920 so that this relay releases to open the contacts 1921, 1924, and 1925 and to close the contacts 1922 and 1923. The opening of the contacts 1921 interrupts an additional point in the circuit for operating the busy relay 1800 or the cut-through relay 1810. The closure of the contacts 1922 performs no useful function at this time, and the closure of the contacts 1923 connects both of the windings of the switch relay 1930 to ground through the closed contacts 1936. The opening of the contacts 1925 interrupts, at an additional point, the holding circuit for the station identify relay 1920.

The closure of the contacts 1932 completes an obvious operating circuit for a switch assist relay 1940 so that this relay operates to close a plurality of contacts 1941, 1943, and 1944 and to open a plurality of contacts 1942, 1945, and 1946. The closure of the contacts 1941 completes a holding circuit for the switch assist relay 1940 extending to ground at the closed contacts 1832. The closure of the contacts 1943 prepares an operating circuit for the cut-through relay 1810. The closure of the contacts 1944 prepares a circuit for extending ground from the closed contacts 1832 to the wiper of the switch in the verification connector 152 which is disposed adjacent the contacts to which are connected the sleeve multiples of the calling line circuits in the "4" hundreds group. The opening of the contacts 1946 interrupts the above described operating circuit for the shunt relay 1900 so that this relay is not operated in response to subsequent digits dialed by the subscriber at the calling substation C. The opening of the contacts 1945 removes one of the shunts around the upper winding of the busy relay 1800, but a shunt therefor is provided at the closed contacts 1933.

The adapter 144 is now conditioned to receive the hundreds and tens digits of the directory number of the calling subscriber C which are repeated to the adapter 146 and over the above described path of the verification connector 152 so that the wipers are advanced to move the wiper designated by the character "4" into engagement with the last or tenth contact in the bank associated therewith, which contact represents the dialed tens directory digit "0." As described above in conjunction with the detailed description of the operation of the verification connector 118, the completion of the transmission of the hundreds and tens digits of the directory number of the calling substation to the verification connector releases the Y delay relay therein so that the operating circuit for the switch relay 1930 and the connector release relay in the connector 152 is opened. The connector release relay, however, is slow-to-release and is not released at this time. The switch relay 1930, however, does release to open the contacts 1932, 1933, 1935, 1936, and 1937 and to close the contacts 1931, 1934, and 1938.

The release of the Y delay relay in the verification connector 152 also connects the wipers of the connector 152 with the paths controlled by the counting relays so that the wiper having access to the bare wire multiples or contacts to which is connected the calling line circuit in the selected hundreds and tens group is connected through the closed contacts 2072, 2062, 2002, 1807, 1816, 1934, and 1944 to ground at the closed contacts 1831. This ground is forwarded over the contact with which the above described wiper is engaged so that, if the hundreds and tens digits of the directory number of the calling substation C have been correctly dialed, this ground is forwarded over the sleeve lead of the extending switch train to the left hand terminal of the upper winding of the busy relay 1800, thereby preventing the operation of this relay. However, if these digits have been incorrectly dialed, this upper winding of the slow-to-operate busy relay 1800 is energized in series with components in the switch train to provide a busy indication to the calling substation C and to prevent further extension of the call. It should be noted that, at this time, the prior release of the switch relay 1930 to open the contacts 1933 and the prior operation of the switch assist relay 1940 to open the contacts 1945 and of the verification test relay 1950 to open the contacts 1954 removes all of the shunts around the upper operating winding of the busy relay so that this relay is capable of operation in series with the components in the switch train. However, assuming that the verification train has been set to the calling line circuit 136, the busy relay 1800 is not operated.

Referring back to the above described release of the switch relay 1930, the opening of the contacts 1937 interrupts the holding circuit for the verification test relay 1950 so that this relay releases after the verification test interval to restore the contacts controlled thereby to their normal condition. Incident to this operation, the contacts 1954 are closed to again provide a shunt around the upper winding of the busy relay 1800. The release of the relay 1950 also releases the counting relay 2000. Further, the release of the verification test relay 1950 closes the contacts 1953 so that ground is forwarded through the closed contacts 1943 and a pair of normally closed contacts 1806 to the operating winding of the cut-through relay 1810 so that this relay operates.

The operation of the cut-through relay closes a plurality of contacts 1812, 1814, and 1815 and opens a plurality of contacts 1811, 1812a, 1813, 1814a, 1816, and 1817. The closure of the contacts 1815 completes a holding circuit for the relay 1810 extending to ground provided on the sleeve lead of the trunk circuit 122 and at the closed contacts 1831. The closure of the contacts 1812 and 1814 cuts through the talking path to the tip and ring conductors extending to the two-way trunk circuit 122, and the opening of the contacts 1812a disconnects the shunt across the tip and ring conductors. The opening of the contacts 1816 interrupts an additional point in the above described vertification test circuit, and the opening of the contacts 1817 opens an additional point in the operating circuit for the shunt relay 1900. The opening of the contacts 1811 and 1813 interrupts the operating circuit for the calling bridge relay 1820.

After a suitable release delay period, the connector release relay in the verification connector 152 is released to restore the switch associated therewith to its normal home position and to again prepare a circuit for permitting seizure of the verification connector 152 by one of the group of adapters to which the connector 152 is common. However, the preparation of the seizure path does not cause reoperation of the connector release relay due to the interruption of the seizure path in the adapter 144.

The above described release of the calling bridge relay 1820 opens the contacts 1821 and 1822 and closes the contacts 1823. The closure of the contacts 1823 does not operate the shunt relay 1900 in view of the prior opening of the contacts 1817. The opening of the contacts 1821 removes the resistive shunt across the tip and ring conductors, and the opening of the contacts 1822 interrupts the operating circuit for the release delay relay 1830 so that, after a suitable time delay, this relay releases to open the contacts 1831, 1832, 1833, and 1834. The opening of the contacts 1832 releases the switch assist relay 1940 so that this relay restores to a normal condition. The opening of the contacts 1832 further releases the operated office code digit relays 2100, 2110, and 2120. Release of these components completes the restoration of the adapter 144 to its normal condition except for the cut-through relay 1810 which is maintained operated by the ground provided on the sleeve conductor of the extended switch train.

The next item of information dialed at the calling substation C is the ringing or units digit of the designation of the calling substation. This is directly repeated to the recording adapter 146 in the local office together with the subsequent digits relating to the designation of the called substation, such as the substation F in the remote office 60 or the substation B in the local office 40. Upon release of the connection, ground is removed from the sleeve lead so as to release the cut-through relay 1810, thereby completing the restoration of the adapter 144 to its normal condition in which it is capable of being seized and utilized in verifying the designation of calling subscribers involved in subsequently placed toll calls.

As indicated above, the verifying adapter 144 and the recording adapter 146 are utilized on toll calls placed to the manual office 70, and, since the items of information pertaining to these calls are not automatically collected and stored by the toll ticketing system, the verifying adapter 144 includes means for rendering the verifying means therein inoperative in response to the dialing of a digit, such as the digit "1," for obtaining access to the manual office. More specifically, assuming that a call is to be extended from the substation C to the manual office 70, the verifying adapter 144 is seized, as described above, and the digit "1" is dialed to cause the verifying adapter 144 to repeat a single pulse over the trunk circuits 120 and 122 to the recording adapter 146, to operate the counting relay 2030 and to partially operate the first office code digit code relay 2120. In the interdigit interval following the dialing of the digit "1," the shunt relay 1900 releases to open the contacts 1908, among others, so that the shunting ground is removed from the relay 2120 to permit this relay to fully operate.

The full operation of the first office code digit relay 2120 closes the contacts 2121a, among others, so that ground is extended from the sleeve lead of the adapter 144 through a plurality of closed contacts 2111a, 2121a, 2052, and 2041 to a pair of contacts 2032. Since the first counting relay 2030 is operated to indicate that the value of the first dialed digit is "1," the ground on the sleeve lead is further extended through the closed contacts 1806 to operate the cut-through relay 1810. The operation of the cut-through relay 1810 extends the connection from the office 50 to the recording adapter 146 in the local office 40 and also releases the calling bridge relay 1820, the counting relay 2030, the first office code digit relay 2120, and the release delay relay 1830 so that further dialed digits cannot operate the verifying adapter 144. The opening of the preliminary break type contacts 1814a interrupts the operating circuit for the busy relay 1800, and the closure of the contacts 1815 completes a holding circuit for the relay 1810 extending to the ground provided on the sleeve lead under the control of the adapter 146. Thus, the dialing of the digit "1" on calls extended to the remote manual office 70 renders the verifying adapter 144 inoperative.

It should be noted that, concurrently with completing the operating path for the cut-through relay 1810, the above described verifying test path is completed through the closed contacts 2121 to the lower operating winding of the busy relay 1810 because the value of the first office code digit of the designation of the calling substation C is "9" and the digit "1" has been stored in the counting relay chain. However, the busy relay 1800 is slightly slow-to-operate and does not operate prior to the opening of the preliminary break type contacts 1814a to break the operating circuit for this relay. Following the completion of the call, the recording adapter 146 removes holding ground from the sleeve lead of the extended switch train, thereby to interrupt the holding circuit for the relay 1810 so that the relay 1810 releases to restore the adapter 144 to a normal condition.

In order to prevent the operation of the cut-through relay 1810 when the first counting relay 2030 is operated in conjunction with either or both of the five and nine relays 2040 and 2050, respectively, in instances when the values of the stored digits are "5" and "9," respectively, the above described operating circuit for the relay 1810 extends through the normally closed contacts 2041 and 2052. Accordingly, if either of the relays 2040 or 2050 is operated, thus representing a stored digit of a value greater than "1," the above described operating circuit is interrupted. Further, to prevent the operation of the cut-through relay 1810 in the event that the value of the second or subsequent calling office code digit is "1," the above described operating circuit for the relay 1810 includes the normally closed contacts 2111a. These contacts are opened in response to the operation of the second office code digit relay 2110 at the initiation of the second test interval, and, accordingly, the above described circuit for operating the cut-through relay 1810 is completed only following the dialing of the first office code digit.

It will be readily appreciated that, although the verifying adapter 144 includes three office code digit relays 2120, 2110, and 2100 for performing the functions described above, a lesser number of these relays are supplied when less than three office code digits are provided in the designation of the calling substation. In the event that a lesser number of office code digits are provided, the operating path for the cut-through relay 1810, described above, is completed by the operation of the first code digit relay and interrupted by the next office code digit relay or other suitable means, such as means operated at the initiation of the transmission of station digits.

THE RECORDING ADAPTER 146

The recording adapter 146, which is located in the local office 40, is seized incident to seizure of the verifying adapter 144 in the remote office 40 and is utilized to record items of information supplied through the verifying adapter 144 and the trunk circuits 122 and 120 so that the items of information pertaining to toll calls extended from the calling substation C in the remote office 50 are stored in the trunk recorder 148 in the local office 40. As described above, the verifying adapter 144 performs the calling line verification operation and, accordingly, the recording adapter 146, although similar to the recording and verifying adapter 112 described above, does not include facilities for verifying the accuracy of the digits dialed as the designation of the calling substation. However, the recording adapter 146 does include control means for permitting access to the manual equipment 134 in the remote manual office 170 and for preventing the recording of items of information on calls placed to the remote office 70 through the local office 40.

*Operation of the Adapter 146 to Record Items of Information Pertaining to a Toll Call*

When the adapter circuit 144 is seized so that the calling bridge relay 1820 is operated to close the contacts 1821, this interconnection of the tip and ring conductors extending to the two-way trunk circuit 122 causes the interconnection of the tip and ring conductors in the recording adapter 146 so that a calling bridge relay 2240 therein is operated to close a pair of contacts 2241 and to open a pair of contacts 2242. The closure of the contacts 2241 completes an obvious operating circuit for a slow-to-release release delay relay 2210. The operation of this relay closes a plurality of contacts 2211, 2213, 2214, and 2215 and opens a plurality of contacts 2212, 2213a, and 2216.

The closure of the contacts 2211 prepares an operating path for a first pulsing relay 2700, and the opening of the contacts 2212 disconnects the lower operating winding of the supervisory relay 2410 from the sleeve conductor of the incoming selector 150. The closure of the contacts 2213 applies ground to the sleeve terminal of the adapter 146, and the closure of the contacts 2214 prepares an energizing circuit for a motor 2370 of a duration timer individual to the recording adapter 146 which preferably is of the type disclosed in the above identified copending Wharton application. The closure of the contacts 2215 completes an obvious operating circuit for a second release delay relay 2220 in addition to providing a source of main holding ground for the recording adapter 146.

The operation of the second release delay relay 2220 closes a plurality of contacts 2221, 2222, 2223, and 2661 and opens a plurality of contacts 2224, 2662, and 2663. The closure of the contacts 2221 and 2222 connects the tip conductor to the ring conductor of the incoming selector 150 through a circuit including a plurality of closed contacts 2203, 2231, 2301, 2532, a wiper 2930 of a stepping switch 2920 in its normal home position, and a plurality of closed contacts 2233 and 2207. It will be noted that this path includes a pair of contacts 2301 controlled by a second pulsing relay 2710 so that the recording adapter 146 is conditioned to repeat a single pulse through the incoming selector 150 in the event that a call is to be extended to the manual remote office 70. This path also includes the contacts 2532 so that, if the first dialed digit received by the recording adapter 146 includes two or more pulses, a first digit over one relay 2530, which corresponds in function and operation with the first digit over one relay 760 in the adapter 112, is operated to open the contacts 2532 and thus prevents additional digits from being repeated to the incoming selector 150. As explained in detail above, the first digit dialed at the calling substation C, in the event that the manual office access digit "1" is not dialed, forms the identification of the calling substation C, and these digits are not repeated to the incoming selector 150. The control circuit, which distinguishes between a first digit "1" and a first digit including two or more pulses, also includes a first digit one relay 2520, which is identical in function and operation with the first digit one relay 750 in the adapter 112. Accordingly, the operation of the circuitry involving the relays 2520 and 2530 is not being repeated in detail in conjunction with the description of the operation of the recording adapter 146.

Referring back to the above described operation of the second release delay relay 2220, the closure of the contacts 2223 connects the upper operating winding of the supervisory relay 2420 to the HS lead of the incoming selector 150. The operation of the second release delay relay 2220 completes the preparation of the recording adapter 146 for receiving items of information from the verifying adapter 144 over the two-way trunk circuits 122 and 120.

The first digit dialed at the calling substation C, as described above, is the digit "9" representing the office code character "W." The first line break transmitted to the calling bridge relay 2240 releases this relay to close the contacts 2242 so that ground is extended through the closed contacts 2211, a wiper 2990 in its normal home position, and a plurality of normally closed contacts 2671 and 2711 to the operating winding of the first pulsing relay 2700. The operation of this relay closes a pair of contacts 2701 to prepare an operating circuit for the second pulsing relay 2710. When the calling bridge relay 2240 is again operated at the end of the first line break to open the contacts 2242, the ground shunt around the second pulsing relay 2710 is removed so that this relay operates to open a plurality of contacts 2301, 2711, and 2712 and to close a plurality of contacts 2302, 2713, and 2714. At the time of removing the ground pulse from the closed contacts 2711, the first pulsing relay 2700 remains operated in series with the operating winding of the second pulsing relay 2710, this path extending through the closed contacts 2712 and 2701. The closure of the contacts 2713, which form a make-before-break contact arrangement with the contacts 2712, completes a holding circuit for the second pulsing relay 2710 extending from the grounded and closed contacts 2701 through the upper winding of the relay 2710, the closed contacts 2713, and the lower winding of the relay 2710 to grounded battery. The opening of the contacts 2711 prevents operation of the first pulsing relay 2700 until the second pulsing relay 2710 is released, and the opening of the contacts 2712 interrupts the holding circuit for the first pulsing relay 2700 so that this relay releases. However, the relay 2700 is slightly slow-to-release and does not release at this time.

The opening of the contacts 2301 transmits a line break to the incoming selector 150, and the closure of the contacts 2714 supplies a pulse to the first digit one relay 2520 so that this relay partially operates. The closure of the contacts 2302 completes an operating circuit for a mark pulse relay 2340 extending through a plurality of normally closed contacts 2373 and 2331. The ground applied to the mark pulse relay 2340 is also extended through a pair of normally closed contacts 2751 controlled by the mark pulse relay 2740, a wiper 2940 of the stepping switch 2920 in its normal position, and a pair of normally closed contacts 2764 to one side of the mark pulse head 2620, thereby to record a mark pulse on the magnetic tape in the trunk recorder 148. The operation of the mark pulse relay 2340 in response to the completion of the above described operating circuit opens the contacts 2751 to remove the energization from the head 2620, thereby to complete the recording of the first mark pulse on the magnetic tape. The operation of the relay 2340 also closes a pair of contacts 2341 so that ground is forwarded to energize the drive magnet 2600 in the trunk recorder 148 to condition this drive mechanism for advancing the magnetic tape a single step.

The closure of the contacts 2714 also completes an operating circuit for a slow-to-release shunt relay 2720. The operation of this relay opens a pair of contacts 2311 and closes a pair of contacts 2721. The opening of the contacts 2311 prepares an operating path for a space pulse relay 2770, and the closure of the contacts 2721 completes an operating circuit for a slow-to-release pulse generator relay 2680. The operation of the pulse generator relay 2680 closes a plurality of contacts 2251, 2252, and 2681. The closure of the contacts 2252 prepares an additional point in the operating circuit for the space pulse relay 2770, which circuit is interrupted at the open contacts 2311. The closure of the contacts 2681 applies ground to the operating winding of a motor magnet 2921 for the stepping switch 2920 to condition the stepping switch 2920 for being advanced to its first stepping position. However, the switch 2920 is of an indirect acting type and does not advance at this time.

The first pulsing relay 2700 then releases to open the contacts 2701 so that the second pulsing relay 2710 releases to restore the contacts controlled thereby to their normal condition. The closing of the contacts 2301 terminates the transmission of a first line break to the incoming selector 150, and the opening of the contacts 2302 removes ground from the mark pulse relay 2340 so that this relay releases to open the contacts 2341 and to close the contacts 2751. Opening the contacts 2341 terminates the energization of the drive magnet 2600 so that the magnetic tape in the trunk recorder 148 is advanced a single step. The opening of the contacts 2714 interrupts the operating circuit for the shunt relay 2720, but this relay remains operated due to the slow-to-release characteristic thereof. The opening of the contacts 2714 further removes shunting ground from the digit one relay 2520 so that this relay fully operates to prepare an operating path for the first digit over one relay 2530, as described above.

When the next line break is transmitted to the calling bridge relay 2240 from the verifying adapter 144, this relay releases to again close the contacts 2242 so that the pulsing relays 2700 and 2710 are operated in sequence. The opening of the contacts 2301 transmits a second line break to the incoming selector 150 through the closed contacts 2532. The closure of the contacts 2302 again operates the mark relay 2340 so that another mark pulse is recorded on the magnetic tape in the trunk recorder 148. This second closure of the contacts 2714 completes a partial operating circuit for the first digit over one relay 2530 so that, when these contacts are opened in response to the release of the second pulsing relay 2710, the relay 2530 operates fully to open the contacts 2531 and 2532, thereby to prevent the further transmission of pulses to the incoming selector 150 and to open a circuit for operating the cut-through relay 2200. In a similar manner, the remaining seven pulses in the group of nine pulses representing the first calling office code digit "9" cause the sequential operation and release of the pulsing relays 2700 and 2710 so that the mark pulse head 2720 is energized seven additional times to record seven mark pulses on the magnetic tape in the trunk recorder 148.

In the interdigit interval following the dialing of the first calling office code digit, the shunt relay 2720 releases to close the contacts 2311 and to open the contacts 2721. The closure of the contacts 2311 completes an operating circuit for the space pulse relay 2770 extending to ground at the closed and grounded contacts 2215 through the closed contacts 2252 and 2311. The ground provided over this circuit is further extended through a pair of contacts 2771 to a wiper 2950 in its normal home position and from the wiper 2950 through a pair of normally closed contacts 2763 to the space pulse head 2610, thereby to record a space pulse on the magnetic tape of the trunk recorder 148 immediately following the group of nine mark pulses representing the first dialed calling office code digit. When the space pulse relay 2770 operates, a pair of contacts 2361 are closed and the contacts 2771 are opened to interrupt the above described energizing circuit for the space pulse head 2610. The closure of the contacts 2361 extends ground to the operating winding of the advance magnet 2600 to condition the magnetic tape in the trunk recorder 148 for a step of movement.

Referring back to the above described release of the shunt relay 2720, the opening of the contacts 2721 interrupts the operating circuit for the pulse generator relay 2680 so that this relay releases after its slow-to-release interval to open the contacts 2251, 2252, and 2681. The opening of the contacts 2252 interrupts the above described operating circuit for the space pulse relay 2770 so that this relay releases to open the contacts 2361 and to close the contacts 2751. The opening of the contacts 2361 interrupts the above described circuit for operating the magnet 2600 so that this magnet releases to advance the magnetic tape to the trunk recorder 148 a single step. The opening of the contacts 2681 terminates the energization of the motor magnet 2921 of the stepping switch 2920 so that a plurality of wipers 2930, 2940, 2950, 2960, 2970, 2980, 2990, and 2995 are advanced a single step into engagement with the contacts forming the first stepping position of the switch 2920. Further, releasing the motor magnet 2921 closes a pair of interrupter springs 2922. In moving off-normal, the wipers of the stepping switch 2920 close a plurality of off-normal contacts 2923 and 2934 and open a pair of off-normal contacts 2925. Referring now to the wipers of the stepping switch 2920, in the first position of the wiper 2930, a circuit is prepared extending to the contacts 2532 for maintaining the circuit for repeating dial pulses to the incoming selector 150 intact. However, this circuit is interrupted at the open contacts 2532 due to the prior operation of the first digit over one relay 2530. The wipers 2940 and 2950, in their first stepping positions, maintain the pulsing paths for the mark and space heads in the trunk recorder 148 intact. Movement of the wiper 2970 to its first stepping position prepares a circuit for operating the cut-through relay 2200 under the control of the manual equipment 134 if the connection is extended to the remote office 70 by dialing an access digit "1." However, as described above, the first dialed digit is larger than "1" and, accordingly, the first digit over one relay 2530 has been operated to open the contacts 2531 and interrupt this circuit. Movement of the wiper 2990 to its first stepping position maintains intact the above described circuit for operating the pulsing relays 2700 and 2710. The movement of the wiper 2995 to its first stepping position prepares an operating circuit for the motor magnet 2921 which is interrupted at the open contacts 2663. However, as described above in conjunction with the description of the operation of the adapter 112, in the event that the connection is prematurely released, the release of the second release delay relay 2220 to close the contacts 2663 completes an operating circuit for advancing the stepping switch 2920 to its second stepping position, ground being applied to the wiper 2995 from the interrupter springs 2922.

The wiper 2995 and the contact bank associated therewith provides a means for controlling sequential operation of the stepping switch 2920 and, more specifically, the first thirteen contacts in the bank are wired to permit the stepping switch 2920 to count calling and called subscriber designations comprising different numbers of digits. The switch 2920 is conditioned for counting different numbers of digits in the calling and called subscriber designations by selectively strapping a pair of terminals 2691 and 2692 to a plurality of terminals 2693 to 2698, inclusive. The terminal 2692 is utilized to provide a self interrupting circuit for the motor magnet 2921 to return the switch 2920 to a normal position only when the adapter circuit 146 is prematurely released and, accordingly, the terminal 2692 is connected to the contacts 2663 controlled by the second release delay relay 2620. The stepping switch 2920 is normally conditioned to count seven digit calling subscriber designations and seven digit called subscriber designations. Since the above call is assumed to be extended between substations, both of which are designated by seven digit designations, the terminal 2692 is strapped to all of the terminals 2693 to 2698, inclusive.

However, in the event that the calling and called offices include only six digits, the terminal 2691, which extends directly to the operating winding of the motor magnet 2921, is strapped to the terminal 2693 and 2696 to selectively advance the stepping switch 2920 over two stepping positions to compensate for the fact that the calling and called designations comprise only a total of twelve digits. In a similiar manner, if the calling and called office designations include only four or five digits, the terminal 2691 is strapped to either or both of the terminals 2694 and 2695 and 2697 and 2698. In those instances where the terminal 2691 is strapped to some but less than all of the terminals 2693 to 2698, inclusive, the terminal 2692 is connected to the remaining terminals so as to provide a means for automatically advancing the switch 2920 in the event of a premature release of the recording adapter 146. Further, it is obvious that the terminals 2691 and 2692 can be selectively strapped to the terminals 2693—2698 in varying combinations in the event, for instance, that the calling office designation includes six digits whereas the called office designation includes only four digits.

Referring back to the operation of the recording adapter 146 under the control of the digits dialed at the calling substation and repeated through the verifying adapter 144, the remaining six digits of the designation of the calling substation C produce intermittent operation of the calling bridge relay 2240 and, accordingly, intermittent operation and release of the pulsing relays 2700 and 2710, the shunt relay 2720, and the pulse generator relay 2680 so that groups of mark pulses are recorded in the trunk recorder 148 in accordance with the values of these digits, the various groups of mark pulses being separated by space pulses. As explained above, following the dialing of the tens digit of the directory number of the calling substation C, the cut-through relay 1810 in the verifying adapter 144 is operated if the digits dialed by the subscriber at the calling substation provide a correct identification of the calling substation C. The operation of the cut-through relay at this time extends the talking path through the trunk circuits 122 and 120 to the recording adapter 146.

During the dialing of the six digits of the directory number of the calling substation C, the wipers of the stepping switch 2920 are advanced in a manner described in detail in the above description of the operation of the recording and verifying adapter 112 so that, at the end of the dialing of the seventh digit, the wipers are in their seventh stepping position. In this seventh stepping position, the wiper 2930 prepares a circuit so that subsequently dialed digits representing the designation of the called substation are repeated to the incoming selector 150. More specifically, this circuit extends from the ring conductor of the incoming selector 150 through the closed contacts 2222, 2207, 2233, the wiper 2930, the contact in the seventh stepping position, the contacts 2301, 2231, 2203, and 2221 to the tip conductor of the incoming selector 150. The above described circuit includes the contacts 2301 controlled by the second pulsing relay 2710 and, accordingly, subsequent operation of the relay 2710 under the control of dialed switch directing digits provides pulses to the incoming selector 150 for controlling the extension of the connection to the called substation.

In their seventh stepping positions, the wipers 2960 and 2980 provide a means for operating a busy relay 2230 in the recording adapter 146 to prevent a further extension of the connection in the event that answering supervisory signals are prematurely received from the extended switch train. More specifically, ground is forwarded from the closed and grounded contacts 2215 through a pair of normally closed contacts 2234 on the busy relay to the wiper 2960. The ground applied to the wiper 2960 is further extended over the contacts in the seventh to fourteenth stepping positions to a pair of normally open contacts 2414 controlled by the supervisory relay 2410. If answering supervisory signals are prematurely received during the dialing of the designation of the called subscriber to operate the supervisory relay 2410, the contacts 2414 are closed to energize a timer clutch 2371 forming a portion of the timing mechanism described in detail in the above identified copending Wharton application. The timer motor 2370 is also energized by the closure of the contacts 2415 in response to the operation of the supervisory relay 2410 so that a pair of cams 2372 and 2375 are placed in rotation. After an interval of between one to two seconds, the cam 2375 closes a pair of contacts 2374 so that ground is forwarded through a pair of normally closed contacts 2333 to be applied to the wiper 2980. When this wiper is in engagement with any of the contacts in the seventh to thirteenth stepping positions of the switch 2920, the ground is forwarded directly to the operating winding of the busy relay 2230 so as to operate this relay.

Operation of the busy relay 2230 opens a plurality of contacts 2231, 2233, 2234, and 2671 and closes a plurality of contacts 2232 and 2235. Closure of the contacts 2235 completes a holding circuit for the busy relay extending to the closed and grounded contacts 2215 controlled by the release delay relay 2210 and, accordingly, the busy relay 2230 cannot be released until the recording adapter 146 is released. The closure of the contacts 2232 connects the tip conductor of the extended switch train to a source of busy tone at a terminal 2277, and the opening of the contacts 2231 and 2233 interrupts the above described pulsing circuit so that digits cannot be repeated from the recording adapter 146 to the incoming selector 150. The opening of the contacts 2671 prevents further operation of the pulsing relays 2700 and 2710 and, accordingly, prevents the recording of additional information in the trunk recorder 148.

Returning now to the operation of the recording adapter 146 under the control of the digits dialed at the calling substation C, the next seven digits dialed represent the designation of the called subscriber, and these digits are simultaneously recorded in the trunk recorder 148 and transmitted to the incoming selector 150 under the control of the calling bridge relay 2240 and the pulsing relays 2700 and 2710, the groups of mark pulses in the trunk recorder 148 being separated by space pulses which are recorded under the control of the shunt relay 2720 and the pulse generator relay 2680, as described above. In the interdigit interval following the recording and repeating of each of these digits, the stepping switch 2920 is advanced a single step so that, following the recording of the last of the seven called subscriber digits, the wipers of the stepping switch are advanced into engagement with the contacts forming the fourteenth stepping position.

In this position, the wiper 2930 interrupts the above described circuit for repeating digits to the incoming selector 150 so that, since a full complement of digits representing the designation of the called substation have been dialed, further digits are not repeated to the selector 150. The movement of the wiper 2970 to its fourteenth stepping position prepares a circuit for operating the cut-through relay 2200. More specifically, the fourteenth contact in the bank engaged by the wiper 2970 is connected to a pair of contacts 2891 controlled by the supervisory relay 2410. When these contacts are closed, the sleeve lead of the incoming selector 150 is connected directly to the operating winding of the cut-through relay 2200. In the fourteenth stepping position of the wiper 2980, a path is prepared for operating a clock relay 2730 to initiate the recording of date and time information in the trunk recorder 148, the recording of this information being dependent upon the receipt of answering supervisory signals from the called substation. The movement of the wiper 2990 to its fourteenth stepping position interrupts the above described circuit for causing intermittent operation of the pulsing relays 2700 and 2710 under the control of the calling bridge relay 2240 and thus prevents the recording of additional information in the trunk recorder 148 under the control of digits dialed from the calling substation C. The movement of the wiper 2995 to its fourteenth stepping position prepares a circuit for energizing the motor magnet 2921 under the control of the clock relay 2730 and a pickup relay 2740.

If a busy signal is received following the completion of the dialing of the digits necessary to extend the connection to the called substation, the supervisory relay 2410 is intermittently operated and released. The closure of the contacts 2414 and 2415 incident to operation of the supervisory relay places the timer in operation so that the cams 2372 and 2375 are rotated. However, the supervisory relay, which is provided with a flashing signal, releases prior to the end of the one-two second interval that the contacts 2374 are closed under the control of the cam 2375 and, accordingly, the adapter circuit 146 remains in this condition until such time as the connection is released by the calling subscriber at the substation C. However, assuming that continuous grounded battery is received over the HS lead of the extended switch train, this battery is forwarded through the closed contacts 2223 to operate the supervisory relay so that a plurality of contacts 2411, 2412, 2414, 2415, and 2801 are closed and a pair of contacts 2413 are opened. The opening of the contacts 2413 removes ground from the HS lead extending to the two-way trunk circuit 120, and the concurrent closure of the contacts 2412 connects grounded battery thereto to provide the two-way trunk circuit 120 with reverse battery supervision indicating the answering of the extended call. The closure of the contacts 2411 extends ground to the sleeve lead of the trunk circuit 120 to provide an additional source of holding ground for the sleeve lead.

The closure of the contacts 2801 completes the above described operating path including the wiper 2970 for operating the cut-through relay 2200 so that this relay operates to close a plurality of contacts 2201, 2204, 2206, and 2208 and to open a plurality of contacts 2202, 2203, 2205, and 2207. The closure of the contacts 2208 completes a holding circuit for the cut-through relay 2200 which extends directly to the sleeve lead of the incoming selector 150 to maintain the cut-through relay 2200 operated when the stepping switch 2920 is advanced beyond the fourteenth stepping position. The closure of the contacts 2201 and 2206 connects the tip and ring conductors of the trunk circuit 120 through the contacts 2221 and 2222 to the incoming selector 150. The closure of the contacts 2204, which are of a preliminary make type, provides a shunt around the operating windings of the calling bridge relay 2240 to maintain this relay operated. The opening of the contacts 2202 and 2205 interrupts the above described circuits for maintaining the calling bridge relay 2240 operated and disconnects this relay from the tip and ring conductors. The opening of the contacts 2203 and 2207 opens, at an additional point, the shunt provided across the tip and ring conductors.

Referring back to the preceding operation of the supervisory relay 2410, the closure of the contacts 2415 completes an energizing circuit for the timer motor, and the closure of the contacts 2414 energizes the timer clutch 2371 so that rotation of the cams 2372 and 2375 is initiated. At the end of the busy test interval of from one to two seconds, the contacts 2374 are closed and ground is forwarded through the closed contacts 2333 to the wiper 2980 which is in engagement with the contact to which is connected the operating winding of the clock relay 2370. The completion of this circuit operates the relay 2730 to close a plurality of contacts 2321, 2323, and 2731 and to open a plurality of contacts 2322 and 2732. The closure of the contacts 2321 connects an alternative source of ground to the contacts 2333 in the event that the contacts 2374 are opened. The opening of the contacts 2322 interrupts an operating circuit for the mark pulse relay 2340 which is controlled by a pair of contacts 2375 actuated by the cam 2372 to prevent the recording of duration information at this time. The closure of the contacts 2323 provides a circuit for maintaining the timer clutch 2371 operated in the event that the supervisory relay 2410 is released subsequent to the initiation of the transmission of the date and time information so as to insure that this information is fully recorded in the trunk recorder 148. The opening of the contacts 2732 prepares a portion of an operating circuit for the motor magnet 2921.

The closure of the contacts 2731 interconnects the operating winding of the pickup relay 2740 with a lead extending through a cable 2278 to the common clock-calendar circuit 130. In the event that the clock-calendar circuit 130 is idle, ground is supplied to this conductor to operate the pickup relay 2740. Operation of the pickup relay 2740 closes a plurality of contacts 2332, 2334, 2335, 2741, 2742, and 2744 and opens a plurality of contacts 2331, 2333, 2743, and 2745. Opening the contacts 2331 interrupts a point in the above described operating circuit for the mark pulse relay 2340. The closure of the contacts 2334 completes a holding circuit shunted across the closed contacts 2323 and 2414 for maintaining the timer clutch 2371 energized. The closure of the contacts 2332 and 2335 connects the mark pulse relay 2340 and the space pulse relay 2770 with conductors extending through the cable 2378 to the common clock-calendar circuit 130 so that these relays are intermittently operated by this circuit to record date and time information on the magnetic tape in the trunk recorder 148. The closure of the contacts 2741 completes a holding circuit for the pickup relay extending to the common clock-calendar circuit 130 through the cable 2278, and the closure of the contacts 2742 similarly extends ground to the circuit 130 so that the transmission of the date and time information is initiated. The closure of the contacts 2744 prepares a portion of an operating circuit for the motor magnet 2921.

The opening of the contacts 2333 interrupts the above described operating circuit for the clock relay 2730 so that this relay releases to restore the contacts controlled thereby to their normal position. The opening of the contacts 2731, however, does not release the pickup relay 2740 due to the prior closure of the contacts 2741 to complete a holding circuit for this relay extending to the common clock and calendar circuit 130. The closure of the contacts 2732 completes an operating circuit for the motor magnet 2921 of the stepping switch 2920, which circuit extends from the closed interrupter springs 2922 through the wiper 2995 and the closed contacts 2732 and 2744. Energization of the motor magnet 2921 operates this relay to open the interrupter springs 2922, and the opening of these springs interrupts the above described operating circuit so that the magnet 2921 releases to advance the wipers of the switch 2920 to their fifteenth stepping position. In moving to its fifteenth stepping position, the wiper 2960 extends ground directly to the winding of the timer clutch 2371 from the closed and grounded contacts 2215 so as to maintain the timer clutch energized and thus insure continuous rotation of the timer cam 2372, which provides the duration information. In its fifteenth stepping position, the wiper 2995 prepares an additional operating circuit for the motor magnet 2921.

The clock-calendar circuit 130 transmits the date and time information to the recording adapter 146 in the form of pulses for intermittently operating and releasing the mark pulse relay 2340 and the space pulse relay 2770 so that these two relays record a plurality of groups of mark pulses on the magnetic tape in the trunk recorder 148 separated by space pulses. Following the completion of the transmission of this information, holding ground is removed by the clock-calendar circuit 130 from the contacts 2741 so that the pickup relay 2740 releases to restore the contacts controlled thereby to their normal position. The closure of the contacts 2331 connects the mark pulse relay 2340 with the contacts 2375 controlled by the timer cam 2372 so that the mark pulse relay is conditioned to record duration information on the tape in the trunk recorder 148. The opening of the contacts 2335 terminates operation of the space pulse 2770 under the control of information supplied by the clock-calendar circuit 130.

To record duration information in the trunk recorder 148, the timer cam 2372 closes the contacts 2375 at one minute intervals, except for the first interval which is slightly longer than one minute to cover the release time of the connection. This intermittent operation of the mark pulse relay 2340 continues until such time as the connection is released, as indicated by the release of the supervisory relay 2410. The release of the relay 2410 removes reverse battery supervision from the HS sleeve of the trunk circuit 1220 so that the verifying adapter 144 is also advised of the release of the connection. Further, incident to release of the connection, the cut-through relay 2200, the calling bridge relay 2240, the release delay relay 2210, and the second release delay relay 2220 are released to partially restore the recording adapter 146 to its normal condition. The release of the second release delay relay 2220, in closing the contacts 2663, completes an operating circuit for the motor magnet 2921 of the stepping switch 2920, thereby to initiate the movement of the switch to its normal home position. This operating circuit extends from the closed and grounded interrupter springs 2922 through the wiper 2995, the contact in the fifteenth stepping position, and the closed contacts 2743 and 2663. In moving to the sixteenth stepping position, the wiper 2950 applies ground directly to the space head 2610 to record a space pulse on the magnetic tape in the recorder 148 immediately following the group of mark pulses representing the duration of the connection. The stepping switch 2920 then operates, as described above in conjunction with the description of the operation of the stepping switch 1400, to return the wipers to their normal home position. During this movement, an end-of-call or COE signal is recorded on the tape to indicate that all of the items have been stored thereon and the magnetic tape is spaced out through five steps to separate the COE signal from the first item of information to be recorded on the tape pertaining to the next call. When the stepping switch 2920 is restored to its normal home position, the off-normal contacts 2923 and 2924 are restored to normal to remove busy ground from the sleeve lead of the adapter 146. The restoration of the stepping switch 2920 completes a cycle of recording operation of the recording adapter 146.

*Operation of the Recording Adapter 146 During a Playback Operation*

During a playback operation, the items of information stored in the trunk recorder 148 are transmitted through the playback control circuit 178 to the recording facilities 180 to control the production of permanent records. The operation of the recording adapter 146 during a playback operation utilizes a tape contact relay 2400, a first perforation relay 2420, a second perforation relay 2430, a third perforation relay 2440, a playback attempt relay 2450, a clutch switch relay 2760, a clutch switch slave relay 2460, a home relay 2470, and a playback relay 2900, together with the stepping switch 2920. However, the operation of the recording adapter 146 during a playback operation is substantially identical to that described above in conjunction with the description of the operation of the recording and verifying adapter 112, and, accordingly, a detailed description of the operation of the adapter 146 during playback is not set forth. It should be understood that the similarly designated relays in the adapters 112 and 146 operate in substantially the same manner during both normal, delayed, and emergency playback operations. Further, the recording adapter 146 includes an alarm relay 2510 which corresponds in function and operation with the similarly identified alarm relay 960 in the adapter 112.

One respect in which the operation of the adapter 146 differs from that of the adapter 112 during a playback operation is in the provision of means for busying both the remote verifying adapter 144 in the office 50 and the local recording adapter 146. When the off-normal contacts 2923 are closed to extend ground through a plurality of contacts 2471, 2511, and 2421 to the contacts 2212 or when a pair of contacts 2422 controlled by the relay 2420, a pair of contacts 2472 controlled by the home relay 2470, or a pair of contacts 2512 controlled by the alarm relay 2510 are closed to extend ground to the contacts 2212, an obvious operating circuit for the supervisory relay 2410 is completed so that this relay operates to close a pair of contacts 2411. The closure of the contacts 2411 applies ground to the sleeve lead of the trunk circuit 120 to busy the adapter 144 in the remote office 50. The relay 2410 is released when the operating circuits described above are opened.

PLAYBACK CONTROL CIRCUIT 178

The playback control circuit 178 (FIGS. 15-17) is normally placed in operation under the control of the recording facilities 180 at a selected time of day so that the switching device 178a, which is shown as a stepping switch 1500 in FIG. 15 of the drawings, is started to sequentially seize each of the adapter circuits such as the adapters 112, 146 and 168. The seizure of the adapter circuits conditions the trunk recorders 114, 148, and 170 associated therewith for transmitting the stored items of information through the playback control circuit 178 to the recording facilities 180. Incident to seizure, the adapters 112, 146, and 168 are placed in a busy condition to prevent their use in recording items of information pertaining to toll calls during the playback operation. The playback control circuit 178 includes further means which operate in the event that a seized recording adapter is engaged in recording items of information pertaining to a toll call to cause the playback control circuit 178 to wait for an interval of between six and eight minutes for the seized adapter to become idle so that the playback operation can be initiated. If the adapter is not released during the timing interval, the playback control circuit 178 steps on to the next adapter circuit. The playback control circuit 178 is also placed in operation under the control of a manually actuated key in each of the adapter circuits 112, 146, and 168 to initiate an emergency playback operation in which a trunk recorder which has been filled with items of information is played back.

*Operation of the Playback Control Circuit 178 During a Normal Playback Operation*

As indicated above, the playback control circuit 178 is normally placed in operation at a selected time of day under the control of the recording facilities 180. These facilities operate switching means to search for and seize the playback control circuit 178 by performing a busy test for the absence of ground on a conductor 1797. The conductor 1797 extends through a pair of normally closed contacts 1782 on a busy key 1780 to a pair of normally closed contacts 1663. The contacts 1663 are connected to a conductor 1798 which returns to the recording facilities 180 and which normally is not provided with ground. The absence of ground on this circuit stops the switching means in the recording facilities 180 with the wipers thereof in engagement with the contacts individual to the playback control circuits 178. It should be noted that in the event that the playback control circuit 178 has been manually rendered busy by the operation of the busy key 1780 to close a pair of contacts 1783, ground is applied to the conductor 1797 to prevent the seizure of the playback control circuit 178.

When the recording facilities 180 are originally placed in operation, circuits are completed for preheating a group of tubes utilized for control functions and pulse amplification. After a suitable time delay sufficient to insure that the hot cathode tubes are conditioned for operation, ground is applied by the recording facilities 180 to a conductor 1796, which extends to the operating winding of a clutch relay 1650, thereby causing the operation of this relay to close a plurality of contacts 1651 and 1653 and to open a plurality of contacts 1652, 1654, 1655, and 1656.

The opening of the contacts 1656 interrupts a point in an open operating circuit for an emergency start relay 1660 to prevent initiation of an emergency playback operation at this time. The closure of the contacts 1653 prepares an operating circuit for a clutch hold relay 1620, and the opening of the contacts 1655 opens an additional point in a circuit for applying ground to the alarm conductor 997. The closure of the contacts 1651 completes an operating circuit for a start relay 1570. This circuit extends from ground through either of a pair of closed contacts 1621 or 1601 and a plurality of closed contacts 1561, 1651, and 1612 to a thermistor 1580 which is connected in series with the operating winding of the slow-to-release start relay 5170.

After a suitable time delay determined by the characteristic of the thermistor 1580, the start relay 1570 operates to close a plurality of contacts 1572, 1573, 1574, 1575, and 1576 and to open a plurality of contacts 1571 and 1577. The closure of the contacts 1574 provides a shunt around the thermistor 1580 to maintain the start relay 1570 operated. The opening of the contacts 1571 interrupts an open holding circuit for an alarm relay 1600, and the concurrent closure of the contacts 1572 connects ground to one side of the operating winding of a switch relay 1550. The closure of the contacts 1575 prepares an operating circuit for an end-of-ticketing relay 1610, and the closure of the contacts 1576 prepares an operating circuit for a relay 1700. The opening of the contacts 1577 interrupts an additional point in the operating circuit for the emergency start relay 1660.

The closure of the contacts 1573 completes a circuit for providing a ground shunt for the left terminal of the winding of the switch relay 1550 and for completing an operating circuit for a hunt assist relay 1540. This circuit extends from a pair of closed and grounded contacts 1559 through the home position contact of the switch 1500 engaged by a wiper 1510 and a plurality of closed contacts 1732, 1553, 1573, and 1502 to the operating winding of the hunt assist relay 1540. Operation of this relay opens a pair of contacts 1541 and closes a plurality of contacts 1542 and 1543. The closure of the contacts 1542 provides an additional source of ground for holding the hunt assits relay 1540 operated and for providing a ground shunt around the operating winding of the switch relay 1550. The closure of the contacts 1543 completes an obvious operating circuit for a motor magnet 1501 of the stepping switch 1500.

Operation of the motor magnet 1501 opens the interrupter springs 1502 and conditions a plurality of wipers 1510, 1510a, 1520, 1520a, 1530, and 1530a in the stepping switch 1500 for movement into engagement with the contacts forming the first stepping position thereof. Opening the contacts 1502 interrupts the above described operating circuit for the hunt assist relay 1540 so that this relay releases to interrupt the above described operating circuit for the motor magnet 1501. The release of the magnet 1501 advances the wipers into engagement with the contacts forming their first stepping position and also closes a plurality of off-normal contacts 1503 and 1504. The closure of the off-normal contacts 1503 energizes a monitor lamp 1686 to indicate that the stepping switch 1500 has been moved off-normal.

The playback control circuit 178 now performs a busy test to determine whether the adapter circuit connected to the contacts in the first stepping position of the switch 1500 is in an idle or a busy condition. The recording adapter 146 is connected to the contacts forming the first stepping position of the switch 1500 and, assuming that this circuit is in a busy condition, ground is applied to the wiper 1510 so as to complete the above described circuit for again operating the hunt assist relay 1540 and to provide a ground shunt for preventing operation of the switch relay 1550. The operation and release of the hunt assist relay 1540 and, accordingly, of the motor magnet 1501 advances the wipers 1510, 1510a, 1520, 1520a, 1530, and 1530a to the contacts forming the second stepping position. In this second stepping position, the wipers of the switch 1500 are connected to the adapter circuit 112. Assuming that the adapter circuit 112 is in an idle condition, ground is not applied to the conductor 241 and, accordingly, the above described operating circuit for the hunt assist relay 1540 is not provided. However, the failure to provide ground on the conductor 241 further removes the ground shunt from around the switch relay 1550 so that this relay operates in series with the operating winding of the hunt assist relay 1540, the current flow through the hunt assist relay being insufficient to actuate this relay. The operating circuit for the switch relay 1550 extends from the closed and grounded contacts 1572 through the winding of the relay 1550 and the closed interrupter springs 1502 to grounded battery through the windings of the hunt assist relay 1540.

The operation of the switch relay 1550 closes a plurality of contacts 1551, 1552, 1554, 1555, 1556, and 1558 and opens a plurality of contacts 1553, 1559, and 1551a.

The closure of the contacts 1557 applies ground to a terminal 1591, which is connected to a motor high speed terminal in a motor speed control circuit of the type disclosed in the above identified copending Morris et al. application. The application of ground to the terminal 1591 causes the common drive motor for the plurality of trunk recorders 114, 148, and 170 to be operated at a high speed so that, incident to seizure of the adapter circuit associated with one of these trunk recorders, the tape is moved at high speed to its home position. The closure of the contacts 1555 prepares an operating circuit for relay 1740, and the closure of the contacts 1556 prepares a circuit for applying ground to a motor low speed terminal 1592. The opening of the contacts 1559 removes ground from the home position contact associated with the wiper 1510a, and the closure of the contacts 1552 prepares a path for maintaining the switch relay 1550 operated on a holding ground provided on the conductor 1241 by the adapter circuit 112. This circuit extends from the wiper 1510 through the contacts 1732 and 1552. The closure of the contacts 1551 prepares a circuit for extending ground over a hold conductor to the recording facilities 180.

The closure of the contacts 1554 completes an operating circuit for a clutch hold relay 1620 which extends from the relay 1620 through the closed contacts 1554 and 1653 to the closed off-normal contacts 1504. The operation of the clutch hold relay 1620 closes a plurality of contacts 1622 and 1624 and opens a plurality of contacts 1621, 1623, and 1626. The closure of the contacts 1625 completes a holding circuit for the clutch hold relay 1620 extending directly to the closed off-normal contacts 1504, thereby to maintain the clutch hold relay 1620 operated until such time as the stepping switch 1500 is restored to its normal position. The opening of the contacts 1626 interrupts an additional point in the operating circuit for the emergency start relay 1660. The closure of the contacts 1622 forwards ground through the closed contacts 1601, 1622, 1611, and 1551 to a pair of normally closed contacts 1781 on a busy key 1780. This ground is further extended over a hold conductor 1795 to the recording facilities 180 to advise these facilities that an adapter circuit has been seized.

Referring back to the preceding operation of the switch relay 1550, the closure of the contacts 1558 completes an obvious operating circuit for a switch assist relay 1560 so that this relay operates to close a plurality of contacts 1562, 1565, 1566, and 1567 and to open a plurality of contacts 1561, 1563, 1564, and 1568. The closure of the contacts 1562 provides an alternative path for extending ground to the hold conductor 1795, and the opening of the contacts 1563 interrupts a point in this circuit which is shunted by the closed contacts 1551. The opening of the contacts 1564 disconnects the alarm conductor 993 from an operating circuit for an alarm relay 1600 in the playback control circuit 178. The closure of the contacts 1565 prepares an operating and holding circuit for an erase slave relay 1640, and the closure of the contacts 1567 prepares an operating circuit for the motor magnet 1501 of the stepping switch 1500. The opening of the contacts 1568 interrupts an additional point in the operating circuit for the emergency start relay 1660. The opening of the contacts 1561 interrupts the above described operating circuit for the start relay 1570 so that this relay releases. The opening of the contacts 1572 interrupts the holding circuit for the switch relay 1550, but this relay is maintained operated by the ground supplied by the wiper 1510.

The closure of the contacts 1566 applies ground to the wipers 1530 and 1530a. As described in detail in the above identified and later filed copending Morris et al. application, the wipers 1530 and 1530a provide either a rate marking circuit or a cost computer with information pertaining to the office in which the calling party is located or the route utilized for the toll calls since the seized adapter circuit generally is used in conjunction with toll calls placed from only a given area. Further, the closure of the contacts 1566 extends ground over the wiper 1520 to the conductor 243 so as to operate the playback attempt relay 300 in the adapter 112, as described in detail hereinabove. The operation of the playback attempt relay 300 in the adapter 112 supplies holding ground to the conductor 241 to maintain the switch relay 1550 operated over the above described circuit.

As described in detail above in conjunction with the operation of the adapter 112, if the adapter 112 is not engaged in recording the items of information pertaining to a toll call when the playback attempt relay 300 is operated, the clutch switch relay 200 and the home relay 220 are operated to initiate movement of the magnetic tape in the trunk recorder 114 to its normal home position, as indicated by the sequential operation of the perforation relays 320, 330, and 340. Further, incident to operation of the clutch switch relay 200, the transducing heads 910, 920, and 930 are interconnected with the playback control circuit 178, and, more specifically, the mark and space heads 920 and 910 are connected with the input to a preamplifier circuit 1790 associated with the circuit 178. The input of the circuit 1790 is also connected in common with the remainder of the adapter circuits 146 and 168 to which the switching means 1500 has access, but, since the clutch switch relay has been operated in only the adapter circuit 112, the preamplifier circuit 1790 is effective to receive signals only from the trunk recorder 114.

When the magnetic tape is returned to its normal home position, as described above, the home relay 220 is released and the clutch switch slave relay 230 and the playback relay 1000 are operated to transfer control over the movement of the magnetic tape in the trunk recorder 114 to the clutch lead 245 which extends to a pair of open contacts 1712 on a playback start relay 1710 in the playback control circuit 178. Further, to inform the playback control circuit 178 that the magnetic tape in the trunk recorder 114 has been moved to its home position under the control of the adapter circuit 112, the operation of the playback relay 1000 applies ground to the playback start conductor 244 which extends through the cable 240 to the operating winding of a playback begin relay 1670 in the playback control circuit 178.

The playback begin relay 1670 is slow-to-operate so that, after a suitable time delay, this relay operates to close a plurality of contacts 1671–1677. The closure of the contacts 1674–1677 connects the output of the preamplifier circuit 1790 to the recording facilities 180 through a cable 1685, thereby to prepare a path for transmitting mark and space information from the trunk recorder 114 through the preamplifier circuit 1790 to the recording facilities 180. The closure of the contacts 1673 applies ground through a pair of normally closed contacts 1643 to the terminal 1592 so as to cause the trunk recorder drive motor to operate at a slow speed suitable for transducing operations. The closure of the contacts 1672 prepares an operating circuit for an erase relay 1630 and also prepares a path for extending ground over the erase conductor 999 for energizing the erase head 930 in the trunk recorder 114. The closure of the contacts 1671 completes an operating circuit for the playback start relay 1710. This operating circuit, however, includes a thermistor 1785 to provide a time delay between the closure of the contacts 1671 and the operation of the relay 1710.

After a suitable time delay determined by the thermistor 1785, the playback start relay 1710 operates to close a plurality of contacts 1711, 1712, and 1714 and to open a plurality of contacts 1713 and 1715. The closure of the contacts 1711 provides a shunt around the thermistor 1785, and the closure of the contacts 1712 connects the clutch conductor 245 to the clutch conductor 1796 extending to the recording facilities 180 so that the circuit 180 now controls the movement of the magnetic tape in the trunk recorder 114. The ground extended through the closed contacts 1712 to the conductor 245 initiates movement of the magnetic tape in the trunk recorder 114 so that the preliminary COE signal, which is the first item stored on the tape, is transmitted through the preamplifier circuit 1790 to a control circuit in the recording facilities 180. The receipt of this signal indicates that the transmission channels for both the space and the mark pulses are complete inasmuch as the COE signal comprises simultaneous mark and space pulses. The receipt of this signal in the recording facilities 180 causes the removal of ground from the conductor 1796 so that movement of the magnetic tape in the trunk recorder 114 is terminated.

The removal of ground from the conductor 1796 also interrupts the operating circuit for the clutch relay 1650 so that this relay releases to open the contacts 1651 and 1653 and to close the contacts 1652, 1654, 1655, and 1656. The opening of the contacts 1653 interrupts the above described operating circuit for the clutch hold relay 1620, but this relay remains operated over the holding path including the closed contacts 1625. The closure of the contacts 1654 completes an operating circuit for the erase relay 1630 extending through the closed contacts 1672, the operating winding of the erase relay, and the erase conductor 999 to grounded battery through the operating winding of the erase head 930 in the trunk recorder 114. Accordingly, the erase head 930 is now energized to permit it to erase information from the magnetic tape and the erase relay 1630 is operated.

The operation of the erase relay closes a pair of contacts 1631 and opens a pair of contacts 1632. The opening of the contacts 1632 interrupts a point in a circuit for applying ground to the alarm conductor 997, and the closure of the contacts 1631 completes an operating circuit for an erase slave relay 1640 extending to the closed and grounded contacts 1565. Operation of the erase slave relay closes a plurality of contacts 1641, 1642, 1644, and 1645 and opens a plurality of contacts 1643, 1646, and 1647.

The closure of the contacts 1641 completes a holding circuit for the relay 1640 shunted around the contacts 1631. The closure of the contacts 1642 provides an additional source of ground for maintaining the erase relay 1630 operated and for maintaining the energization of the erase head 930 in the trunk recorder 114. The opening of the contacts 1643 removes ground from the motor high speed terminal 1592, and the closure of the contacts 1644 connects this terminal through the closed contacts 1556 to a conductor 1593 which extends to the recording facilities 180 and which is selectively provided with ground when low speed operation of the drive motor is desired.

In response to the completion of the resetting operation of the recording facilities 180 occasioned by the receipt of the preliminary COE signal, the circuit 180 again applies ground to the clutch conductor 1796 so that movement of the magnetic tape in the trunk recorder 114 is initiated and the clutch relay 1650 is operated. In operating, the clutch relay 1650 opens the contacts 1654, but the erase relay 1630 remains operated by the ground provided at the closed contacts 1641. Ground is maintained on the clutch conductor 1796 to cause the transmission of all of the items of information pertaining to a single toll call, and, in response to the transmission of a COE signal following the items pertaining to the first call, the recording facilities 180 again removes ground from the clutch conductor 1796. This intermittent operation continues until such time as all of the items of information stored in the trunk recorder 114 have been transmitted to the recording facilities 180. At this time, the recording facilities 180 remove ground from the conductor 1593 so that the drive motor is operated at a high speed to return the magnetic tape to its normal home position.

As described above, when the magnetic tape in the trunk recorder 114 is returned to its normal home position following the transmission and erasure of all of the items of information stored thereon, the operation of the third perforation relay 320 removes ground from the conductor 242 so that the holding circuit for the switch relay 1550 is interrupted. This permits this relay to release to open the contacts 1551, 1552, 1554, 1555, 1556, 1557, and 1558 and to close the contacts 1553, 1559, and 1551a. The opening of the contacts 1551 removes ground from the hold conductor 1795 to advise the recording facilities 180 that the playback of the first trunk recorder has been completed and that the playback control circuit 178 is being conditioned to release the seized adapter and to search for the next idle adapter. The closure of the contacts 1559 completes an operating circuit for the motor magnet 1501 extending through the closed contacts 1567. The energization of the motor magnet 1501 conditions the stepping switch 1500 for a step of advancement. The opening of the contacts 1558 concurrently with the closure of the contacts 1559 interrupts the operating circuit for the switch assist relay 1560 so that, after a suitable time interval, this relay releases to close the contacts 1561, 1563, 1564, and 1568 and to open the contacts 1562, 1565, 1566, and 1567.

The closure of the contacts 1563 again applies ground to the hold conductor 1795, and the closure of the contacts 1561 again completes the operating circuit for the start relay 1570 so that this relay is operated to close the contacts controlled thereby. The opening of the contacts 1566 removes ground from the conductor 243 so as to release the playback attempt relay 300 in the adapter circuit 112. The release of the relay 300, together with the release of the adapter 112 described above, removes ground from the playback start conductor 244 and opens the connection through the winding of the erase relay 1630 and the erase conductor 999 to the erase head 930. The release of the erase relay 1630, together with the release of the switch assist relay 1560, releases the erase slave relay 1640 so that the contacts controlled thereby are restored to their normal condition. The removal of ground from the conductor 244 releases the playback begin relay 1670, and the release of this relay opens the operating circuit for the playback start relay 1710 so that all of these relays are restored to their normal condition to prepare these relays for reoperation upon seizure of the next idle adapter and its associated trunk recorder.

The opening of the contacts 1567 also interrupts the above described operating circuit for the motor magnet 1501 so that the wipers 1510, 1510a, 1520, 1520a, 1530, and 1530a are advanced into engagement with the contacts forming the third stepping position of the switch 1500. In the event that the next adapter circuit is in a busy condition, ground is applied to the wiper 1510 and extended through the closed contacts 1732, 1553, and 1573 to shunt down the switch relay 1550 and to operate the hunt assist relay 1540 so that the stepping switch 1500 is advanced to its next stepping position. Alternatively, if ground is not provided on the wiper 1510, the seizure of the next adapter circuit and its related trunk recorder is completed. In this manner, the stepping switch 1500 is advanced step-by-step to control the transmission of the items of information stored in all of the trunk recorders to which the switch 1500 has access.

Incident to the completion of the playback of the last trunk recorder to which the switch 1500 has access, the wipers of this switch are advanced into engagement with their next to last stepping position in which the wiper 1520 engages a contact connected to the operating winding of the end-of-ticketing relay 1610 through the closed contacts 1575. Since the wiper 1510a in the next to last stepping position does not encounter ground, an artificial condition is established representing an idle adapter so that the switch relay 1550 and the switch assist relay 1560 again sequentially operate. When the relay 1560 operates to close the contacts 1566, ground is applied through the wiper 1528 to operate the end-of-ticketing relay 1610. Operation of this relay opens a plurality of contacts 1611, 1612, 1613, and 1614. The opening of the contacts 1613 and 1614 disables the emergency start relay 1660. The opening of the contacts 1612 interrupts the operating circuit for the start relay 1570 so that, after its slow-to-release interval, this relay releases. The opening of the contacts 1611 interrupts the above described path for extending ground to the hold conductor 1795, thereby to advise the recording facilities 180 that the playback control circuit 178 is to be released inasmuch as all of the trunk recorders to which this circuit has access have been played back.

When the start relay 1570 releases to open the contacts 1572, ground is removed from the operating winding of the switch relay 1550 to release this relay. The release of the switch relay 1550 completes the operating circuit for the motor magnet 1501 extending through the closed contacts 1559 and 1567 and, in opening the contacts 1558, interrupts the operating circuit for the switch assist relay 1560 so that this relay releases. The release of the relay 1560 opens the contacts 1567 and thus opens the energizing circuit for the motor magnet 1501. The release of the motor magnet 1501 advances the wipers to their normal home position in which the closed contacts 1559 provide ground to the contact engaged by the wiper 1510. However, this ground is not effective to cause operation of the hunt assist relay 1540 inasmuch as the release of the start relay 1570 opens the contacts 1573 to prevent the extension of the ground provided at the wiper 1510 through the interrupter springs 1502 to the operating winding of the hunt assist relay 1540. The release of the start relay 1570, in opening the contacts 1575, also interrupts the operating circuit for the end-of-ticketing relay 1610 so that the contacts controlled by this relay are restored to their normal condition. Further, in moving to their home position, the wipers of the switch 1500 open the off-normal contacts 1503 and 1504 so that the holding circuit for the clutch hold relay 1620 is opened to permit this relay to release and, accordingly, to restore the contacts controlled thereby to their normal positions. The opening of the off-normal springs 1503 terminates energization of the monitor lamp 1686 and thus provides a visible indication of the release of the playback control circuit 178. The removal of ground from the hold conductor 1795 for a prolonged period of time advises the recording facilities 180 that the cycle of operation of the playback control circuit 178 has been completed, and the recording facilities 180 remove ground from the clutch lead 1796 so that the clutch relay 1650 is maintained in a released condition. Further, incident to releasing the last adapter circuit, the erase relay 1630, the erase slave relay 1640, the playback begin relay 1670, and the playback start relay 1710 are released so that the playback control circuit 178 is now in its normal released condition in which it is capable of being seized and utilized in playing back the items of information when the recording facilities 180 are next placed in operation.

*Operation of the Playback Control Circuit 178 During a Delayed Playback Operation*

In a delayed playback operation, hte playback control circuit 178 is placed in operation by the recording facilities 180 in the same manner described above in conjunction with a normal playback operation except that, following the seizure of the adapter circuit 112, the operation of the playback attempt relay 300 applies ground to the playback delay conductor 246 to indicate that the adapter 112 cannot be immediately played back since this adapter is being utilized in recording items of information pertaining to a toll call. The application of ground to the playback delay conductor 246 completes an operating circuit for a playback delay relay 1750 in the playback control circuit 178.

The operation of the relay 1750 closes a plurality of contacts 1751, 1752, and 1755, and opens a plurality of contacts 1753 and 1754. The opening of the contacts 1754 interrupts an open holding circuit for a relay 1740, and the closure of the contacts 1755 prepares a holding circuit for a second timing relay 1730. The closure of the contacts 1752 prepares an operating circuit for a first timing relay 1720, and the opening of the contacts 1753 interrupts a point in an open operating circuit for the relay 1740. The closure of the contacts 1751 prepares a holding circuit for a first timing relay 1720.

The operation of the playback control circuit 178 to wait for the adapter 112 to become idle during a time delay playback operation is controlled by pulses supplied from supervisory equipment. The supervisory equipment, in sequence, momentarily removes holding ground from a terminal 1764, momentarily removes holding ground 1763, applies a momentary ground to a terminal 1761, and then applies a momentary ground pulse to a terminal 1762. This cycle of operations, involving the removal of ground from the terminals 1763 and 1764 and the application of ground to the terminals 1761 and 1762, occurs at two minute intervals. Accordingly, at the end of a time interval not more than two minutes following the operation of the playback delay relay 1750, the supervisory circuit provides the above described signals on the terminals 1761–1764, but these signals produce no useful functions except for the momentary application of ground to the terminal 1762. This ground is extended through a plurality of closed contacts 1752, 1735, and 1723 to operate the first timing relay 1720.

The operation of the first timing relay 1720 closes a plurality of contacts 1721, 1724, and 1725 and opens the contacts 1722 and 1723. The contacts 1723 and 1724 form a make-before-break contact arrangement so that holding ground for the first timing relay 1720 is provided by the closure of the contacts 1724 through a plurality of closed contacts 1734 and 1751 prior to the opening of the contacts 1723 to interrupt the above described operating path. The closure of the contacts 1725 prepares an operating circuit for the second timing relay 1730, and the closure of the contacts 1721 prepares a circuit for applying ground to a holding circuit for the switch relay 1550. The opening of the contacts 1722 produces no useful function at this time.

At the end of the next two minute interval, the supervisory circuit again applies the series of signals described above to the terminals 1761–1764, and these signals produce no useful functions except for the application of the ground pulse to the terminal 1761, which completes an operating circuit for the second timing relay 1730 extending through the closed contacts 1725 and 1736. The operation of the second timing relay 1730 opens a plurality of contacts 1732, 1734, 1735, and 1736 and closes a plurality of contacts 1731, 1733, and 1737. The closure of the contacts 1737, which form a make-before-break contact arrangement with the contacts 1736, completes a holding circuit for the second timing relay 1730 extending to the closed contacts 1755 prior to the opening of the contacts 1736.

The closure of the contacts 1731 prior to the opening of the contacts 1732 in the make-before-break contact including these two pairs of contacts extends ground from the closed contacts 1721 through the closed contacts 1731 for maintaining the switch relay 1550 operated, whereas the opening of the contacts 1732 disconnects the operating winding of the switch relay 1550 from the ground provided on the wiper 1510. The closure of the contacts 1733 in the make-before-break contact arrangement including the contacts 1733 and 1734 transfers the holding circuit for the first timing relay 1720 to the ground provided by the supervisory circuit at the terminal 1763 prior to the opening of the contacts 1734 to remove the previous source of holding ground. The opening of the contacts 1735 interrupts an additional point in the above described operating circuit for the first timing relay 1720. Accordingly, at the end of an average time interval of approximately three minutes, control over the switch relay 1550 has been transferred to the holding ground provided at the closed contacts 1721, and the first and second timing relays 1720 and 1730 are held in an operated condition.

When the next sequence of signals is provided by the supervisory equipment, the removal of ground from the terminal 1764 produces no useful function, but the following removal of ground from the terminal 1763 interrupts the holding circuit for the first timing relay 1720 so that this relay releases to open the contacts 1721, 1724, and 1725 and to close the contacts 1722 and 1723. The opening of the contacts 1721 removes holding ground from the winding of the switch relay 1550, but the prior closure of the contacts 1722 transfers the holding circuit for this relay to the ground provided at the terminal 1764. The opening of the contacts 1724 interrupts, at an additional point, the above described holding circuit for the first timing relay 1720, and the closure of the contacts 1723 prepares an operating circuit for this relay, which circuit is interrupted at the open contacts 1735. The opening of the contacts 1725 opens an additional point in the operating circuit for the second timing relay 1730. Therefore, at the end of the second full two minute interval, or an average time of five minutes, the holding ground for the switch relay 1550 has been transferred to the terminal 1764 and the first timing relay 1720 has been released.

Following the expiration of an additional two minute interval, the supervisory circuit again applies the signal sequence to the terminals 1761–1764. The first signal is the removal of ground from the terminal 1764. The removal of ground therefrom releases the switch relay 1550 and, consequently, the switch assist relay 1560 so that these two relays operate to advance the stepping switch 1500 to its next stepping position, thereby effectively interrupting the connection between the playback control circuit 178 and the seized adapter, such as the adapter 112. Incident to this operation, ground is removed from the conductor 243 to release the playback attempt relay 300 and the clutch switch relay 200 in the adapter 112 to restore this circuit to its normal condition.

The removal of ground from the conductor 246 in response to the release of the playback attempt relay in the seized adapter releases the playback delay relay 1750 so that this relay restores the contacts controlled thereby to their normal condition. This opens the contacts 1755 to interrupt the holding circuit for the second timing relay 1730 so that this relay releases. The restoration of the second timing relay 1730 to its normal condition permits reoperation of the playback control circuit 178 incident to the attempted seizure of the adapter connected to the contacts in the next stepping position of the switch 1500, as described above. Since the series of signals provided by the supervisory circuit which removes holding ground from the terminal 1764 occurs at the end of the third full two minute interval, it is apparent that the playback control circuit 178 is capable of waiting for an adapter circuit for an interval of between six to eight minutes or an average of seven minutes to become idle to permit the playback of the items of information stored therein.

In the event that the adapter circuit completes the recording of the items of information pertaining to the toll call during the delay interval, the stepping switch in the adapter circuit is returned to home and the off-normal contacts are opened to permit the operation of the clutch switch relay in the seized adapter circuit and to remove ground from the conductor 246. The operation of the clutch switch relay conditions the adapter circuit for the transmission of the data stored in its associated trunk recorder. The removal of ground from the conductor 246 releases the relay 1750 and any of the operated relays 1720 and 1730 to permit a normal cycle of playback operation of the circuit 178, as described above.

Operation of the Playback Control Circuit 178 During an Emergency Playback Operation As set forth above, an emergency playback operation is initiated in the adapter 112 by the manual operation of the playback key 250 so that the home relay 220 is operated. The operation of this relay serves to return the magnetic tape to its home position and thereafter to arrest further tape movement. Further, the operation of the home relay applies ground to the emergency start conductor 247 which is extended through the cable 240 and a plurality of normally closed contacts 1626, 1613, 1568, 1577, and 1656 to the operating winding of the emergency start relay 1660 in the playback control circuit 178. The operation of the emergency start relay 1660 closes a plurality of contacts 1661, 1662, 1664, and 1665 and opens the contacts 1663. The closure of the contacts 1662 illuminates the monitor lamp 1686 to indicate the seizure of the playback control circuit 178. The closure of the contacts 1665 completes a holding circuit for the emergency start relay 1660 extending to the grounded and normally closed contacts 1614. The closure of the contacts 1664 applies ground through a pair of normally closed contacts 1551a to the emergency playback conductor 242 which extends through the cable 240 to the adapter circuit 112. This ground is extended through the contact paths described above to all of the conductors similar to the conductor 241 in the adapter circuit 112 to mark all of the adapter circuits other than the circuit 112 as busy.

To place the recording facilities 180 in operation, the closure of the contacts 1661 forwards the ground normally provided on a conductor 1791 through the closed contacts 1611, 1563, and 1781 to the hold conductor 1795. The application of ground to the conductor 1795 operates an emergency start relay in the recording facilities 180 so that the stepping switch therein is placed in operation to search for and seize only the playback control circuit 178 having access to the adapter 112 which requires an emergency playback operation. In order to mark the playback control circuit 178 as requiring seizure, the operation of the emergency start relay in the recording facilities 180 applies ground to a conductor 1798, which is common to all of the playback control circuits to which the recording facilities 180 have access. The opening of the contacts 1663, upon operation of the emergency start relay 1660, interrupts the path for extending the ground on the conductor 1798 to the test lead 1797 which is individual to the playback control circuit 178. Accordingly, the switching means in the recording facilities 180 will encounter ground on the busy test terminals individual to all of the playback control circuits except the circuit 178 and, accordingly, only this circuit is seized by the recording facilities 180 during the emergency playback operation.

In response to seizure of the circuit 178, the clutch relay 1650 and the start relay 1570 are again operated to place the stepping switch 1500 in operation, but, as contrasted with a normal operation of the circuit 178, the stepping switch 1500 is to seize only the adapter 112 which requires an emergency playback. As described above, the closure of the contacts 1664 applies ground through the closed contacts 1551a to the conductor 242 which is common to all of the adapters to which the switch 1500 has access. This ground, therefore is extended to all of the leads similar to the lead 241 in the adapter 112, and this ground thus effectively marks these adapters as busy. However, due to the operation of the home relay 220 in the adapter 112, the contacts 224a are open and thus the lead 241 is the only lead which is encountered by the wipers 1510 and 1510a which is not supplied with busy ground. Therefore, the switch 1500 steps, as described above, until such time as the adapter 112, which requires the emergency playback, is seized.

Incident to this seizure, the switch relay 1550 operates as described above and opens the contacts 1551a to remove ground from the conductor 2421.

Following the playback of the seized adapter 112, which takes place as described above in conjunction with a normal playback operation, the switch relay 1550 is released to again close the contacts 1551a so that the stepping switch 1500 then steps to its normal home position to terminate its cycle of operation as described above. Incident to the termination of its cycle of operation, the end-of-ticketing relay 1610 is operated, as described above, so that the contacts 1614 are opened to interrupt the holding circuit for the emergency start relay 1660. Accordingly, the relay 1660 releases, together with the remainder of the relays in the playback control circuit 178, to restore this circuit to its normal condition. As described above, incident to the completion of the emergency playback of the trunk recorder 114, ground is removed from the emergency start lead 247 so that the emergency start relay 1660 is not again operated following the release of the circuit 178.

Alarm Facilities in the Playback Control Circuit 178

The playback control circuit 178 includes detecting means for establishing an alarm condition in the event that, following the seizure of an adapter, the trunk recorder is not prepared for data transmission within a predetermined time interval or that the path for energizing the erase head is interrupted during the transmission of the information to the recording facilities 180.

More specifically, assuming that the adapter circuit 112 has been seized so that the switch relay 1550 and the switch assist relay 1560 are operated, the operation of the switch assist relay closes the contacts 1566 to provide ground to the wiper 1520, thereby to operate the playback attempt relay 300. If the adapter 112 is idle, the operation of the relay 300 initiates movement of the magnetic tape in the trunk recorder 114 to its normal home position so as to condition the recorder 114 for transmitting items of information to the recording facilities 180. In addition, the closure of the contacts 1556 applies ground to the operating winding of a relay 1700 through the closed contacts 1576 so that the relay 1700 operates to close a pair of contacts 1702 and to open a pair of contacts 1701. The closure of the contacts 1702 completes a circuit extending from the winding of the relay 1700 through the closed contacts 1713 and 1702 to the ground provided at the closed contacts 1566.

The operation of the switch relay 1550 incident to the seizure of the adapter 112 closes the contacts 1555 to prepare an operating circuit for the relay 1740 so that, when ground is applied to the terminal 1762 by the common supervisory equipment, as described above, this ground is forwarded through the closed contacts 1753, 1555, and 1742 to operate the relay 1740. Operation of the relay 1740 opens the contacts 1742 and closes a plurality of contacts 1741 and 1743. The contacts 1741 and 1742 form a make-before-break contact arrangement so that the closure of the contacts 1741 completes a holding circuit through the closed contacts 1754 to ground at the closed contacts 1566 prior to the opening of the contacts 1742 to interrupt the operating circuit for the relay 1740. It should be noted that the operating circuit for the relay 1740 and the holding circuit therefor extend through normally closed contacts controlled by the playback delay relay 1750 so that the relay 1740 is not operated or maintained operated in the event that the delay in returning the tape in the trunk recorder 114 to its normal home position is due to a playback delay operation rather than a failure in the equipment provided in either the playback control circuit 178 or in the seized adapter.

The closure of the contacts 1743 prepares a circuit for extending ground to the alarm conductor 997 from the terminal 1761. However, ground is not provided at the terminal 1761 during the first sequence of signals applied by the common supervisory circuit to the playback control circuit 178 inasmuch as, as set forth above, ground is applied to the terminal 1762 following the application of ground to the terminal 1761 in the signal sequence.

Accordingly, after a time delay of two minutes, the common supervisory circuit again applies ground to the terminals 1761–1764. The ground applied to the terminal 1761 is extended through the closed contacts 1647, 1743, 1715, and 1646 to the alarm conductor 997 to provide an indication in the adapter 112 that an alarm condition has arisen due to the failure of the magnetic tape in the trunk recorder 114 to be returned to its home position in condition for transmitting items of information to the recording facilities 180 within the time interval provided by the common supervisory circuit which is equal to at least two minutes. It should be noted that, in the event that the tape in the trunk recorder is returned to its normal home position, the playback begin relay 1670 and the playback start relay 1710 are operated to open the contacts 1715 to interrupt the above described circuit for applying ground to the alarm conductor 997.

The playback control circuit 178 further includes means for providing an alarm condition in the event that, following the return of the magnetic tape in the seized trunk recorder to its normal home position, the preliminary COE signal is not transmitted to the recording facilities 180 within a selected time interval. More specifically, with the playback control circuit 178 in the condition described above, the receipt of ground on the conductor 244, which represents the movement of the magnetic tape in the trunk recorder 114 to its normal home position, causes the sequential operation of the playback begin relay 1670 and the playback start relay 1710. The operation of the playback start relay 1710 closes the contacts 1714 and opens the contacts 1715, among others. The opening of the contacts 1715 interrupts the above described circuit for applying ground to the alarm conductor 997 and thus indicates that the tape has been homed. The operation of the playback start relay 1710 also opens the contacts 1713 to interrupt the above described holding circuit for the relay 1700 which is slow-to-release.

As described above, the operation of the switch assist relay 1560 opens the contacts 1561 to interrupt the operating circuit for the start relay 1570 so that, after the slow-to-release interval thereof, this relay releases to open the contacts 1576, among others. The opening of the contacts 1576 interrupts the above described operating circuit for the slow-to-release relay 1700 so that this relay is maintained operated only over the holding circuit including the normally closed contacts 1713. However, as described above, these contacts are opened incident to the operation of the playback start relay 1710 which indicates the homing of the magnetic tape in the trunk 114. Following the slow-to-release interval of the relay 1700, ground is extended from the closed contacts 1566 through the closed contacts 1701, 1714, and 1646 to the alarm conductor 997 to provide an alarm indication in the adapter 112. The establishment of the alarm condition at this time indicates that the preliminary COE signal has not been received by the recording facilities 180.

However, assuming that the preliminary COE signal has been received by the recording facilities 180, ground is removed from the clutch conductor 1796 so that the clutch relay 1650 releases. As described above, the release of the relay 1650 completes the operating circuit for the erase relay 1630 and the erase slave relay 1640 so that these relays operate to open the contacts 1632 and 1646 and to close the contacts 1645, among others. The opening of the contacts 1632 prevents the application of ground to the conductor 997 through the closed contacts 1645, and the opening of the contacts 1646 prevents the application of ground to the alarm conductor 997 when the relay 1700 releases to close the contacts 1701. Thus, the operation of the erase relay 1630 and of the erase slave relay 1640, which represents the receipt of the preliminary COE signal by the recording facilities 180, prevents the application of ground to the alarm conductor 997.

The playback control circuit 178 also includes means for providing an alarm indication in the event that the erase signal disappears during the transmission of data from the magnetic tape in the trunk recorder 114 to the recording facilities 180. More specifically, the loss of this erase signal releases the erase relay 1630 to close the contacts 1632, the erase slave relay 1640 remaining operated over the holding circuit including the closed contacts 1641. At the end of the transmission of the items of information during which the erase signal is lost, the clutch relay 1650 is released by the removal of ground from the clutch conductor 1796, as described above. The release of the clutch relay closes the contacts 1655, among others. Inasmuch as the erase slave relay 1640 remains operated at this time, ground is forwarded through the closed contacts 1632, 1655, and 1645 to the alarm conductor 997, thereby to provide an alarm indication in the seized adapter circuit representing the loss of the erase signal. It is desirable to provide an indication that the erase signal has been lost during the transmission of data from a seized trunk recorder to the recording facilities 180 because, if the playback operation is continued without erasing data from the trunk recorder, the data remaining in the trunk recorder distorts the data which is subsequently recorded on the tape.

As described above, the application of ground to the alarm conductor 997 causes the operation of an alarm relay, such as the alarm relay 960 in the adapter circuit 112. The operation of this relay terminates the seizure of the adapter circuit by removing holding ground from the conductor 241 to cause the playback control circuit 178 to search for and seize the next idle adapter. In addition, the operation of the alarm relay in the seized adapter circuit closes a pair of contacts similar to the contacts 961 to apply resistance ground to the alarm conductor 998. The alarm conductor 998 extends to a pair of contacts 1564 in the playback control circuit 178 which are maintained open by the switch assist relay 1560 during the interval in which the playback control circuit 178 is interconnected with an adapter circuit. However, as described above, the establishment of the alarm condition in the seized adapter circuit actuates the playback control circuit 178 to search for and seize another adapter circuit, and, incident to this release, the switch assist relay 1560 is released to close the contacts 1564. This extends the resistance ground provided in the adapter which is in an alarm condition to the operating winding of the alarm relay 1600 in the playback control system 178 through a pair of normally closed contacts 1602. However, the provision of a single source of resistance ground is not sufficient to operate the alarm relay 1600.

However, if two adapter circuits are placed in an alarm condition following the release of the second adapter circuit in an alarm condition, a second source of resistance ground is connected to the alarm conductor 998. The parallel resistance provided by these two resistance ground sources permits a sufficient flow of current through the alarm relay 1600 so that this relay operates to close a plurality of contacts 1603 and 1604 and to open the contacts 1601 and 1602. The closure of the contacts 1603, which form a make-before-break contact arrangement with the contacts 1602, completes a holding circuit for the alarm relay 1600 extending to ground at the closed contacts 1571 through a pair of normally closed contacts 1584 on an alarm release key 1583 prior to the opening of the contacts 1602 to interrupt the above described operating circuit for the relay 1600. The opening of the contacts 1601 prevents the operation of the start relay 1570 by removing ground from the operating circuit therefor, the contacts 1621 being open due to the operated condition of the clutch hold relay 1620. The closure of the contacts 1604 completes a circuit extending through the closed contacts 1624 on the operated clutch hold relay 1620 and the closed contacts 1652 on the released clutch relay 1650 for extending ground from the closed off-normal contacts 1504 through the interrupter springs 1502 on the motor magnet 1501 to the hunt assist relay 1540. The completion of this circuit causes the intermittent operation and release of the motor magnet 1501, as described above, so that the stepping switch 1500 is advanced to its normal home position. At this time, the off-normal contacts 1503 and 1504 are opened. The opening of the contacts 1504 interrupts the above described self interrupting circuit for the stepping switch 1500 and also opens the holding circuit for the clutch hold relay 1620 so that this relay releases. The above described circuit over which the stepping switch 1500 is advanced to its home position includes the contacts 1652 controlled by the clutch relay 1650, as described above. The clutch relay 1650 is released following the operation of the alarm relay 1600 inasmuch as the opening of the contacts 1601 removes ground from the hold conductor 1795 extending to the recording facilities 180 to advise the recording facilities that the playback control circuit 178 is to be released, much in the same manner that the above described opening of the contacts 1611 by the end-of-ticketing relay 1600 removes ground from the hold conductor 1795 to advise the recording facilities 180 that the playback control circuit 178 is to be released.

Since the alarm relay 1600 is maintained operated over the holding circuit extending through the contacts 1584, the playback control circuit 178 remains out of operation until such time as the key 1583 is manually actuated to release the alarm relay 1600. The release of the relay 1600 restores the playback control circuit 178 to its normal condition.

Although the operation of the automatic toll ticketing system of the present invention is described above in conjunction with particular means for extending calls and storing and recording data pertaining to calls, it should be understood that many other modifications and embodiments may be provided by those skilled in the art which will fall within the spirit and scope of the principles of the present invention.

What is claimed as new and desired to be secured by Letters Patent of the United States is:

1. A telephone system comprising a subscriber line having a designation including at least two office code digits, checking means responsive to each successive office code dialed digit transmitted over said line for determining whether that dialed digit is identical to the corresponding office code digit in said designation, said checking means including means for initiating operation of the checking means following the receipt of each office code dialed digit and prior to the receipt of the next subsequent dialed digit, and means operated by said checking means when any single office code dialed digit is not identical to the corresponding office code digit in said designation for blocking the progress of a call.

2. A telephone system comprising a subscriber line having a designation including a group of digits, line extending means for extending a connection from said line and for receiving dialed digits from said line, a digit register, means responsive to said dialed digits for successively storing each of said dialed digits in said register, means controlled by said register for successively comparing each of the digits stored in said register with one of the digits in said designation, and means for blocking progress of the call when said stored digits do not correspond to the digits in said designation.

3. A telephone system comprising a subscriber line having a designation including a group of digits, line extending means for extending a connection from said line and for receiving dialed digits from said line, a digit register, means connected to said line extending means for storing a dialed digit in said register, means operative following the storage of said digit for comparing said stored digit with one of the digits in said designation, and means operative following the comparison of said stored digit for releasing said digit register to condition the register for receiving another dialed digit.

4. A telephone system comprising a subscriber line having a designation including a group of digits, line extending means for extending a connection from said line and for receiving dialed digits from said line, a digit register, means connected to said line extending means for successively operating said digit register in accordance with each of said dialed digits, a plurality of circuit means representing the digits in said designation, switching means operated incident to the storage of each digit in said digit register for connecting said circuit means to said digit register, and means operated following the connection of said register to said circuit means for comparing each of the stored digits with one of the digits in said designation.

5. The telephone system set forth in claim 4 including means operated by said comparing means for preventing the progress of the call when one of said stored digits does not correspond to the related digit in said designation.

6. A telephone system comprising a subscriber line having a plural digit designation including a first digit and a plurality of other digits, means responsive to the dialing of said first digit for checking the value thereof, and means controlled by said checking means when the value of the first digit is correct and operated by the subsequent dialing of said other digits for determining whether the dialed other digits correspond to the said other digits in the designation of said line.

7. A telephone system comprising a subscriber line having an individual designation, line extending means for extending a connection from said line and adapted to receive a plurality of dialed digits representing said designation, and verification means including control means operated by a first group of said digits to check the values thereof and switching means operated by another group of said digits for extending a connection to said line when said digits comprise the designation of said line, said control means including means for preventing operation of said switching means when the value of one of said first group of digits is incorrect.

8. The telephone system set forth in claim 7 including means controlled by said verification means for preventing further operation of said line extending means when said plurality of dialed digits do not comprise the designation of said line.

9. A telephone system comprising a subscriber line having a plural digit designation, line verifying means connected to said line and operated by dialed digits representing said designation, means for blocking progress of a call from said line, and means controlled by said verifying means for operating said blocking means following the dialing of each of some of said dialed digits and for operating said blocking means following the dialing of a group of other of said dialed digits.

10. A telephone system comprising a plurality of subscriber lines each having an individual designation including common office code digits and different station digits, line extending means for extending a connection from a calling one of said lines and for receiving dialed digits from said calling line, and verifying means connected to said line extending means including means operated by dialed office code digits for establishing control paths common to all of said line to check the office code digits of the designation of said calling line and means operated by dialed station digits for establshing a control path individual to said calling line to check the station digits of the designation of said calling line.

11. A telephone system comprising a subscriber line having a designation including office code digits and station digits, line extending means for extending a connection from said line and for receiving dialed digits from said line, a digit register, means connected to said line extending means for operating said digit register in accordance with said dialed digits, first control means including said digit register for determining whether a group of said dialed digits corresponds to said office code digits, a plurality of verification switch trains, and second control means including said register for selecting one of said verification switch trains for operation under the control of dialed station digits in accordance with the value of a station digit stored in said register.

12. The telephone system set forth in claim 11 including means operated by the failure of said second control means to select one of said verification switch trains for preventing further progress of a call.

13. A telephone system comprising a subscriber line having a plural digit designation, digit counting means, calling line verifying means for determining whether dialed digits correspond to said plural digit designation, line extending means, control means responsive to dialed digits from said line for operating said counting means and said line verifying means, means controlled by said counting means and said verifying means for conditioning said line extending means for operation in accordance with subsequent dialed digits from said line when said dialed digits correspond to said plural digit designation, and means controlled by said verifying means and operable in response to the dialing of an incorrect digit and prior to the dialing of a subsequent digit of the designation for preventing operation of said line extending means.

14. In an automatic toll ticketing system, a first office including subscriber lines each having an individual plural digit designation, a second office including data storing means for storing items of information pertaining to a telephone call, means controlled from a calling subscriber line in said first office for extending a connection from said calling line through said first office to said data storing means in said second office, means in said second office controlled by the extension of a connection to said first office for conditioning said data storing means for storing items of information pertaining to a call placed over said connection, means in said first office controlled by dialed digits representing the designation of said calling line for checking the accuracy of said dialed digits, control means included in said last mentioned means for checking at least one of said dialed digits as said one digit is dialed, and means operated by said control means for preventing the storage of items of information in said data storing means in the second office.

15. An automatic toll ticketing system comprising a first office, a subscriber line in said first office having a plural digit designation, a second office remote from said first office and including a register, a transmission channel connecting said first and second offices, calling line verifying means in said first office operable in accordance with dialed digits representing said designation, a control circuit in said first office connected to said line to receive dialed digits representing said designation for repeating said dialed digits over said channel to said register and for operating said verifying means in accordance with said dialed digits, check means included in said verifying means for checking at least two of said digits as each is dialed to determine whether it corresponds with the corresponding digit in said designation, and means controlled by said checking means for rendering said controlled circuit ineffective.

16. An automatic toll ticketing system comprising a first office, a subscriber line in a first office having a plural digit designation, a second office remote from said first office, line extending means for extending a connection from said first office to said second office, a register in said second office connected to said line extending means, a calling line verifying means in said first office connected to said line extending means, means for supplying dialed digits from said line to said line extending means in accordance with said designation for operating said verifying means to determine if said line designation has been correctly dialed and for operating said register to store said designation in said register, and means operable in response to the dialing of any single incorrect digit of said plural digit designation for preventing operation of said register to store any dialed digit which is dialed subsequent to said single incorrect digit.

17. An automatic toll ticketing system comprising a first office, a subscriber line in said first office having a designation, a second office remote from said first office, line extending means for extending a connection from said line to said second office, a data storing control circuit in said second office connected to said line extending means, a register controlled by said control circuit, line designation verifying means in said first office connected to said line extending means, means for supplying dialed digits representing said designation to said line extending means, pulsing means in said first office for repeating said dialed digits over said line extending means to said control circuit to store said designation in said register and for operating said verifying means in accordance with said dialed digits, and means in said first office controlled by said verifying means if the dialed digits correspond to said designation for rendering said pulsing means ineffective and for conditioning said control circuit for direct operation under the control of dialed digits subsequently applied to said line extending means to permit these subsequent dialed digits to be stored in said register.

18. A telephone system comprising a subscriber line having a plural digit designation, line extending means for extending a connection from said line and for receiving dialed digits from said line, line verifying means connected to said line extending means and operated by said dialed digits to determine whether said dialed digits correspond to said designation, an operator position, and means operated by the extension of a connection to said operator position for rendering said line verifying means ineffective.

19. A telephone system comprising a subscriber line having a plural digit designation, line extending means for extending a connection from said line and for receiving dialed digits from said line, calling line verifying means connected to said line extending means and responsive to said dialed digits to determine whether said dialed digits correspond to said designation, and control means connected to said line extending means and responsive to the values of the dialed digits for rendering said line verifying means ineffective.

20. The telephone system set forth in claim 19, in which the control means comprises means responsive to the first dialed digit for rendering said line verifying means ineffective if said first dialed digit has a predetermined value.

21. An automatic toll ticketing system comprising a subscriber line having a plural digit designation, first line extending means, second line extending means for extending a connection from said line to said first line extending means, calling line verifying means connected to said second line extending means and operated by dialed digits from said line to determine whether the dialed digits correspond to said designation, and means normally preventing said dialed digits from operating said first line extending means and including means for repeating digits of only a predetermined value to said first line extending means.

22. An automatic toll ticketing system comprising a plurality of offices, a trunk circuit, a register connected to and controlled by said trunk circuit for storing data pertaining to a call extended through said trunk circuit, switching means in one of said offices for seizing said trunk circuit incident to placing a call to another of said offices, first means in said trunk circuit operated incident to the seizure of said trunk circuit for repeating dialed digits to said another office and for supplying digit representing signals to said register, second means controlled by the value of the first dialed digit supplied to said trunk circuit from said one office for controlling the effectiveness of said first means, said second means operating to render said first means effective to repeat a group of dialed digits to said another office and to supply a plurality of digit representing signals to said register when said first applied digit is of one value so that said register automatically collects data pertaining to the call, said second means operating to render said first means ineffective after the application of said first dialed digit to said trunk circuit when said first dialed digit is of another value, and means operated in response to the release of said trunk circuit to apply signals to said register representing the end of a call when said first dialed digit is of either said one or said another value.

23. A telephone system comprising first means including a toll ticketing circuit for extending a connection between a calling and called subscriber in response to a predetermined number of directive signals applied thereto and a data storage means associated with said toll ticketing circuit; said toll ticketing circuit including a stepping switch having a normal home position and a plurality of step positions, second means for deriving at least one additional signal manifesting billing information, third means coupled to said switch, said second means and said data storage means for selectively applying a separate individual one of said directive and additional signals to said data storage means in accordance with each particular position of said switch, and fourth means coupled to said third means for stepping said switch to its next position in response to the termination of the signal then being applied.

24. The telephone system defined in claim 23, wherein said second means includes means for deriving two additional signals manifesting the time and date of a call and the duration of a call, respectively.

25. The telephone system defined in claim 24, wherein said third means is coupled to said switch to apply said additional signals to said data storage means after said predetermined number of directive signals have been applied thereto.

26. The telephone system defined in claim 25, wherein said first means includes fifth means for returning to said toll ticketing circuit an answer supervision signal, and wherein said third means includes sixth means coupled to said first means for applying said additional signals to said data storage means only after the return of an answer supervision signal.

27. The telephone system defined in claim 26, wherein said toll ticketing circuit further includes seventh means for restoring said switch to its normal home position in response to the release of said extended connection.

28. The telephone system defined in claim 27, wherein said third means is coupled to said switch to apply the additional signal manifesting the duration of a call after the application of the additional signals manifesting the time and date of a call, and wherein said toll ticketing circuit further includes eighth means coupled to said sixth and seventh means and responsive to the return of an answer supervision signal for preventing the restoring of said switch to its normal home position in response to the release of said extended connection until after the application of said additional signals manifesting the time and date of the call to said data storage means.

29. The telephone system defined in claim 28, wherein a first group of said predetermined number of directive signals manifests the designation of the calling subscriber, and wherein said toll ticketing means further includes ninth means responsive to said switch being in a first group of its step positions for preventing the first group of said predetermined number of directive signals from being effective in extending the connection to the called subscriber.

30. The telephone system defined in claim 24, wherein said toll ticketing circuit further includes restoring means for restoring said switch to its normal home position in response to the release of said extended connection.

References Cited in the file of this patent

UNITED STATES PATENTS

| | | |
|---|---|---|
| 2,369,868 | Taylor et al. | Feb. 20, 1945 |
| 2,581,287 | Ostline | Jan. 1, 1952 |
| 2,782,257 | Blashfield | Feb. 19, 1957 |
| 2,886,642 | Morris et al. | May 12, 1959 |
| 2,886,643 | Harris | May 12, 1959 |